(12) United States Patent
Yagi

(10) Patent No.: US 7,185,007 B2
(45) Date of Patent: Feb. 27, 2007

(54) INFORMATION PROCESSING APPARATUS, INFORMATION PROCESSING METHOD, INFORMATION PROCESSING PROGRAM SERVICE PROVIDING APPARATUS, SERVICE PROVIDING METHOD, SERVICE PROVIDING PROGRAM AND RECORDING MEDIUM

(75) Inventor: Atsuko Yagi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 492 days.

(21) Appl. No.: 10/666,249

(22) Filed: Sep. 22, 2003

(65) Prior Publication Data

US 2004/0205163 A1 Oct. 14, 2004

(30) Foreign Application Priority Data

Sep. 20, 2002 (JP) ............................ 2002-275986
Sep. 19, 2003 (JP) ............................ 2003-328198

(51) Int. Cl.
*G06F 17/30* (2006.01)

(52) U.S. Cl. ...................................................... 707/4

(58) Field of Classification Search .................... 707/1, 707/2, 9, 10, 4; 709/246; 399/9
See application file for complete search history.

(56) References Cited

U.S. PATENT DOCUMENTS

2002/0136559 A1* 9/2002 Simpson et al. ................ 399/9
2003/0033432 A1* 2/2003 Simpson et al. ............ 709/246

* cited by examiner

*Primary Examiner*—Etienne P. LeRoux
(74) *Attorney, Agent, or Firm*—Oblon, Spivak, McClelland, Maier & Neustadt, P.C.

(57) ABSTRACT

An information processing apparatus includes a responding part which makes a response to a terminal without waiting for a completion of processing which is caused to be executed by a service providing apparatus; a processing state obtaining part which obtains a state of the processing concerning the service providing request, from the service providing part; and a Web page generating part which, in response to a Web page display request made by the terminal, generates a Web page to display the state of processing which is obtained via the processing state obtaining part, and transmits the thus-produced Web page to the terminal.

49 Claims, 44 Drawing Sheets

FIG.12

- CREATE FOLDER   ■ DELETE DOC   ■ PRINT DOC   ■ SELECT ALL

CURRENT PLACE : XXXXXXX

GO UP   DETAIL DISPLAY   THUMBNAIL DISPLAY

TOTAL 6 ITEMS (FOLDER: 0, DOCUMENT: 6)

| | NAME | CREATOR | REGISTER-ED DATE | UPDATED DATE | STORAGE TIME LIMIT | DOCUMENT STATE | DOCUMENT SIZE |
|---|---|---|---|---|---|---|---|
| ☐ | AAA | ...... | 2002/08/05 | | | | |
| ☐ | BBBBBB | ...... | 2002/0505 | | | | |
| ☐ | CCCCCC | ...... | 2002/08/05 | | | | |
| ☐ | DDDDDD | ...... | 2002/08/05 | | | | |
| ☐ | EEEEEE | ...... | 2002/08/05 | | | | |
| ☐ | FFFFFFFF | ...... | 2002/08/05 | | | | |

FIG.13

| STATE ACQUIRING METHOD NAME | COMPLETION STATUS |
|---|---|
| getPrintStatus | Complete |

```
<?xml version="1.0" encoding="UTF-8" ?>
<soapenv:Envelope
  xmlns:soapenv="http://schemas.xmlsoap.org/soap/envelope/"
  xmlns:xsd="http://www.w3.org/2001/XMLSchema"
  xmlns:xsi="http://www.w3.org/2001/XMLSchema-instance">
<soapenv:Body>
  <printResponse
    soapenv:encodingStyle="http://schemas.xmlsoap.org/soap/encoding/"
    xmlns:ns1="http://xxxxxxxxxxxxxxx">
    <returnValue xsi:type="xsd:string">OK</returnValue>
    <methodName xsi:type="xsd:string">getprintStatus</methodName>       ~411
    <completeSign xsi:type="xsd:string">Complete</completeSign>          ~412
    <jobID xsi:type="xsd:string">001</jobID>                             ~413
  </printResponse>
</soapenv:Body>
</soapenv:Envelope>
```

| REQUEST USER ID | JOB ID | SERVICE REQUESTED URL | STATE ACQUIRING METHOD | COMPLETION STATUS |
|---|---|---|---|---|
| ABC | 001 | <URL OF PRINTER SERVER> | getPrintStatus | Complete |
| ABC | 002 | ······ | ······ | ······ |
| | | | | |
| | | | | |

| REQUEST USER ID | JOB ID | SERVICE REQUESTED URL | STATE ACQUIRING METHOD | COMPLETION STATUS | DISPLAY FLAG | DETAILED INFORMATION |
|---|---|---|---|---|---|---|
| ABC | 001 | <URL OF PRINTER SERVER> | getPrintStatus | Complete | ON | |
| ABC | 002 | ......... | ......... | ......... | | |
| | | | | | | |
| | | | | | | |

■ JOB LIST (PUT CHECK MARK FOR UNDISPLAY OR DELETE)

☐ ☐ YYY IS ON XXX.

DISPLAY ALL — 2063

PRINTING PRINTER: XXX

DOCUMENT NAME: AAA

NUMBER OF PRINTING: 20

SIZE OF PRINTING: A4

STATUS: NORMAL END

FIG.30

| REQUEST USER ID | REQUEST ID | JOB ID | SERVICE REQUESTED URL | STATE ACQUIRING METHOD | COMPLETION STATUS | DISPLAY FLAG | DETAILED INFORMATION |
|---|---|---|---|---|---|---|---|
| ABC | 1 | 001 | \<URL OF DOCUMENT MANAGEMENT SERVER 30c\> | getSearchStatus | Complete | ON | |
| ABC | 1 | 002 | \<URL OF DOCUMENT MANAGEMENT SERVER 30d\> | getSearchStatus | Complete | ON | |
| ABC | 1 | 003 | \<URL OF DOCUMENT MANAGEMENT SERVER 30e\> | getSearchStatus | Complete | ON | |
| | | | | | | | |

■ JOB LIST (PUT CHECK MARK FOR UNDISPLAY OR DELETE)

□ UNDER SEARCH FOR DOCUMENT DATA CDE (1/3 COMPLETION)

□ 2064

2063

206

DISPLAY ALL

FIG.39

| JOB ID | STATE NOTIFICATION URL | STATE NOTIFICATION METHOD |
|---|---|---|
| 001 | \<URL OF WEB SERVER\> | putStatus |
| 002 | ……… | ……… |
| | | |
| | | |

| COMPLETION STATUS | ⌐ 33 |
|---|---|
| Complete | |

| REQUEST USER ID | JOB ID | COMPLETION STATUS | STATE INFORMATION |
|---|---|---|---|
| ABC | 001 | Complete | ······ |
| ······ | 002 | ······ | ······ |
| | | | |
| | | | |

INFORMATION PROCESSING APPARATUS, INFORMATION PROCESSING METHOD, INFORMATION PROCESSING PROGRAM SERVICE PROVIDING APPARATUS, SERVICE PROVIDING METHOD, SERVICE PROVIDING PROGRAM AND RECORDING MEDIUM

BACKGROUND OF THE INVENTION

1. Field of the Invention

The present invention relates to an information processing apparatus which transmits a Web page in response to a request sent from a terminal, and, in particular, to information processing apparatus which provides information concerning a state of processing requested from the terminal.

Moreover, the present invention relates to a service providing apparatus which provides a predetermined service based on a request sent from the above-mentioned information processing apparatus.

2. Description of the Related Art

By development of the Internet technology, a Web page provided by a Web browser acts not only as an information providing part but also as an application providing part in recent years. As main technology for operating a Web page as an application providing part, there are an ASP (Active Server Pages: registered trademark), a JSP (Java (registered trademark) Server Pages), a servlet, a CGI (Common Gateway Interface), etc. Although these have various differences in details, each executes a program in response to a request given by a Web browser, and they are common as being a technology for generating a processing result in a form of a Web page.

The program performed in such a case can also transmits a processing request to another server which also provides a service to the network, and can generate a Web page also based on information obtained therefrom in response to the processing request. Such a Web server can acts as a relay part, and, thus, can provide via a Web page not only services which the relevant server originally have but also services which are provided by various other servers.

However, in some case, a time is required for completing requested processing, and, in such a case, a Web server cannot make a response to the Web browser until the processing is completed. Then, until then, the Web browser should wait for a response from the Web server. Then, a user cannot perform any other operation with the same Web browser, and, thus, inconvenience may occur. In order to solve this problem, there is a method in which, for a program for which a time is expected to be taken, a setting is made previously such that a response is made to a Web browser even before the processing is completed, in other words, a response is made asynchronously. By this method, it becomes possible to solve a problem that a long time is taken until a user receives a response. However, the user may not obtain a result of the processing in this case.

SUMMARY OF THE INVENTION

The present invention has been devised in response to solve the above-mentioned problem, and, an object of the present invention is to provide an information processing apparatus which, in case of receiving a request from a terminal for processing which should be executed asynchronously in response to a request, and can provide information concerning a state of the processing to the terminal, and a service providing apparatus which, in response to a request from the above-mentioned information processing apparatus, executes processing according to the request asynchronously.

According to the present invention, an information processing apparatus which causes a predetermined service providing apparatus which provides a predetermined service to execute processing concerning a service providing request given by a terminal via a network, includes a responding part which makes a response to the terminal without waiting for a completion of the processing which is caused to be executed by the service providing apparatus; a processing state obtaining part which obtains a state of the processing concerning the service providing request from the service providing part; and a Web page generating part which, in response to a Web page display request given by the terminal, generates a Web page to display the state of processing which is obtained by the processing state obtaining part, and transmits the thus-produced Web page to the terminal.

Such an information processing apparatus can execute asynchronous processing in response to a request given by the terminal, and, also, can generate a Web page displaying a state of the asynchronous processing. Thus, when receiving an execution request from the terminal for asynchronous processing, the information processing apparatus can provide a state of the processing to the terminal. Specifically, the information processing apparatus can make a response to the terminal for the requested processing without waiting for a completion of the processing, in other words, make a response for the requested processing asynchronously with respect to the completion of the processing.

According to a second aspect of the present invention, the above-mentioned information processing apparatus further includes a processing information managing part which manages identification information of the processing concerning the service providing request, and the responding part registers the identification information of the processing in the processing information managing part, and the processing state obtaining part obtains a state of the processing for which the identification information is registered in the processing information managing part.

Thereby, the information processing apparatus can identify the processing which is not yet completed via the processing information managing part, and thus, it is easy to identify the processing which is not yet completed, and thus, to obtain a state of the processing.

According to a third aspect of the present invention, the above-mentioned processing information managing part further manages information concerning a position of the service providing apparatus which is caused to execute the processing concerning the service providing request, and also manages information concerning a method for obtaining information concerning a state of the processing.

According to a fourth aspect of the present invention, the above-mentioned processing state obtaining part obtains a processing state from the service providing apparatus based on information managed by the processing information managing part in response to a Web page display request from the terminal.

In this configuration, it becomes possible for the information processing apparatus to obtain (information of) the processing state based on information managed in the processing information managing part.

According to a fifth aspect of the present invention, the responding part can cause the service providing apparatus to execute processing by transmitting an execution request concerning the service providing request to the service providing apparatus.

According to a sixth aspect of the present invention, the responding part obtains information concerning a method for obtaining a processing state on the processing from the service providing apparatus as a response to the execution request concerning the service providing request, and the processing state obtaining part obtains the processing state based on the information concerning the method for obtaining the processing state obtained by the responding part.

In this configuration, the information processing apparatus obtains the processing state based on the information received from the service providing apparatus, and, thus, it is possible to properly respond to a case where the method for obtaining the processing state is dynamically changed.

According to a seventh aspect of the present invention, in case a plurality of methods for obtaining a processing state obtained by the responding part are managed in the processing information managing part, the processing state obtaining part obtains a plurality of processing states based on the respective ones of the plurality of methods for obtaining a processing state.

Thereby, even asynchronous processing is requested, a processing state can be obtained for each thereof.

According to an eighth aspect of the present invention, the processing state obtaining part transmits a processing state sending request to a processing state providing apparatus which provides a processing state of processing which the service providing apparatus is caused to execute, and receives the processing state which is sent by the processing state providing apparatus in response to the processing state sending request. Thereby, the processing state obtaining part can positively obtain the processing state.

Thereby, it is not necessary to inquire the service providing apparatus for a state of the asynchronous processing, and, thus, it is possible to reduce a load of communications between the information processing apparatus and service providing apparatus.

According to a ninth aspect of the present invention, the information processing apparatus further includes a processing state receiving part receiving the processing state from the service providing apparatus, and the Web page generating part generates a Web page displaying the processing state received via the processing state receiving part.

In this configuration, since communications are made from the service providing apparatus to the information processing apparatus only when a state of the asynchronous processing changes, it is possible to reduce a load of communications between the information processing apparatus and service providing apparatus.

According to a tenth aspect of the present invention, the processing state obtaining part transmits a processing state sending request to the service providing apparatus, and receives the processing sent state from the service providing apparatus in response to the sending request. Thereby, the processing state obtaining part can obtain the processing state.

Thereby, since the service providing apparatus which executes asynchronous processing is inquired for the processing state by the information processing apparatus, the information processing apparatus can obtain precise information of the processing state from the service providing apparatus which actually executes the asynchronous processing.

According to an eleventh aspect of the present invention, the information concerning the method for obtaining a processing state includes information concerning a position of the processing state providing apparatus which provides the processing state, and the processing state obtaining part transmits a processing state sending request to the processing state providing apparatus specified by the position information. Then, the processing state obtaining part receives the processing state send by the processing state providing apparatus in response to the sending request, and thus, obtains the processing state.

In this configuration, a target of inquiry for the state of the asynchronous processing is specified by the information sent from the service providing apparatus. Accordingly, even in case where the asynchronous processing is inherited or taken over by another service providing apparatus, the information processing apparatus can inquire to the other service providing apparatus for the processing state properly.

According to a twelfth aspect of the present invention, the responding part causes the service providing apparatus to execute a plurality of processing units based on a single service providing request given by a terminal, and provides a response to the terminal without waiting for respective completions of the plurality of processing units; the processing state obtaining part obtains respective processing states on the plurality of processing units; and the Web page generating part generates a Web page displaying the states of the plurality of processing units obtained by the processing state obtaining part.

According to a thirteenth aspect of the present invention, the processing information managing part manages information concerning a position of a service providing apparatus which is caused to execute each of the plurality of processing units, manages information concerning a method of obtaining a processing state for each of the plurality of processing units, and also, manages request identification information assigning a common value for the plurality of processing units to be executed based on a common service providing request made by the terminal.

According to a fourteenth aspect of the present invention, the processing state obtaining part identifies the processing based on the common service providing request made from the terminal based on the above-mentioned request identification information, and, thus, obtains the respective processing states of the plurality of processing units based on the common service providing request based in the information managed by the processing information managing part.

Thereby, the information processing apparatus can provide information concerning states of the plurality of processing units executed in response to the common processing request made by the terminal.

According to a fifteenth aspect of the present invention, the responding part causes a plurality of respective service providing apparatuses to execute the respective ones of the processing units.

Thereby, since the plurality of respective service providing apparatuses are caused to execute respective ones of a plurality of asynchronous processing units in response to a common service providing request made by a terminal, it is possible to provide, as a single service, respective results of the plurality of asynchronous processing units shared by the plurality of service providing apparatuses.

According to a sixteenth aspect of the present invention, the Web page generating part generates a Web page displaying in an integration manner the processing states of the processing units based on the common providing request obtained by the processing state obtaining part.

In this configuration, as the processing states of the plurality of asynchronous processing units are displayed in the integration manner, it is possible to show the user of the terminal the states of the processing in an easily understandable manner.

According to a seventeenth aspect of the present invention, the Web page generating part generates a Web page in which the processing state is not displayed according to a request of the terminal.

In this configuration, in case a user of the terminal does not wish that a Web page has an indication of the state of asynchronous processing, the Web page is displayed in a manner in which the state of asynchronous processing is not shown according to a request of the terminal.

According to an eighth aspect of the present invention, the information processing apparatus further includes a detailed information page generating part which generates a Web page displaying detailed information of the processing state in response to a request of the terminal.

In this configuration, as the Web page showing the detailed information of the state of the asynchronous processing is generated, it is possible to provide a user of the terminal the detailed information of the state of the asynchronous processing.

According to a ninth aspect of the present invention, the Web page generating part obtains predetermined information from a plurality of service providing apparatuses based on a request sent from the terminal, and generates a Web page displaying the obtained information in a plurality of divisional areas of the page.

In this configuration, it is possible to provide the Web page displaying the information obtained from the plurality of service providing apparatuses in a single page.

According to a twentieth aspect of the present invention, the information processing apparatus further includes a page information managing part which manages structures respectively defining display contents for respective ones of the plurality of divisional areas of the Web page, and the Web page generating part generates the Web page based on the structures.

In this configuration, since the information processing apparatus generates the Web page based on information managed by the page information managing part, it is possible to easily change a manner of displaying the Web page thus generated by editing the information managed by the page information managing part or so.

According to a twenty-first aspect of the present invention, the Web page generating part generates the Web page in a manner such that the processing state of the processing concerning the service providing request is displayed in one divisional area of the plurality of divisional areas.

In this configuration, it is possible to provide the Web page displaying the state of the asynchronous processing in one of the plurality of divisional areas.

According to a twenty-second aspect of the present invention, a service providing apparatus which executes processing concerning the service providing request made from the information processing apparatus according to one of the above-mentioned first through twenty-first aspect of the present invention includes a processing state obtaining information sending part sending, to the information processing apparatus, processing state obtaining information for enabling acquisition of a completion notification and processing state of the processing, before the completion of the processing. Then, in response to a request of the information processing apparatus requesting the processing state of the processing concerning the service providing request based on the processing state obtaining information, the service providing apparatus sends the processing state of the processing to the information processing apparatus.

In this configuration, in case of receiving a request for execution of asynchronous processing from the information processing apparatus, the service providing apparatus provides information with which the processing state of the processing can be obtained for the information processing apparatus.

Furthermore, for the purpose of solving the above-mentioned problem, the present invention may also be embodied in a form of an information processing method for the above-mentioned information processing apparatus, an information processing program which causes a computer to execute the information processing method, or a recording medium storing the information processing program.

Furthermore, for the purpose of solving the above-mentioned problem, the present invention may also be embodied in a form of a service providing method for the above-mentioned service providing apparatus, a service providing program which causes a computer to execute the service providing method, or a recording medium storing the service providing program.

Thus, according to the present invention, it is possible to provide an information processing apparatus which can, in case of receiving a request for execution of processing to be executed asynchronously in response to the request, and provide a state of the processing to the terminal; and to provide a service providing apparatus which executes the processing asynchronously based on the request made from the terminal in response to the request made from the information processing apparatus.

BRIEF DESCRIPTION OF THE DRAWINGS

Other objects and further features of the present invention will become more apparent from the following detailed description when read in conjunction with the following accompanying drawings:

FIG. 12 shows an example of a document management page according to the embodiment of the present invention;

FIG. 13 shows an example of job check information according to the embodiment of the present invention;

FIG. 14 shows an example of a SOAP message transmitted by a printer server as a response to the printing request according to the embodiment of the present invention;

FIG. 15 shows an example of a job management table according to the embodiment of the present invention;

FIG. 19 shows an example of a job management table according to the second embodiment;

FIG. 23 shows an example of the job list area at a time of setting non-display of a processing state message according to the embodiment of the present invention;

FIG. 25 shows an example of a detailed information page according to the embodiment of the present invention;

FIG. 30 shows an example of a job management table according to the embodiment of the present invention;

FIG. 32 shows an example of a job list area where a search processing state is displayed according to the embodiment of the present invention;

FIG. 39 shows an example of notice information of a processing state managed table according to the present invention;

FIG. 40 shows an example of functional configuration of jog check information in the fourth interaction;

FIG. 41 shows an example of a jog management table in the fourth interaction;

DETAILED DESCRIPTION OF THE PREFERRED EMBODIMENTS

Hereafter, embodiments of the present invention will be described with reference to figures.

Figure 1:
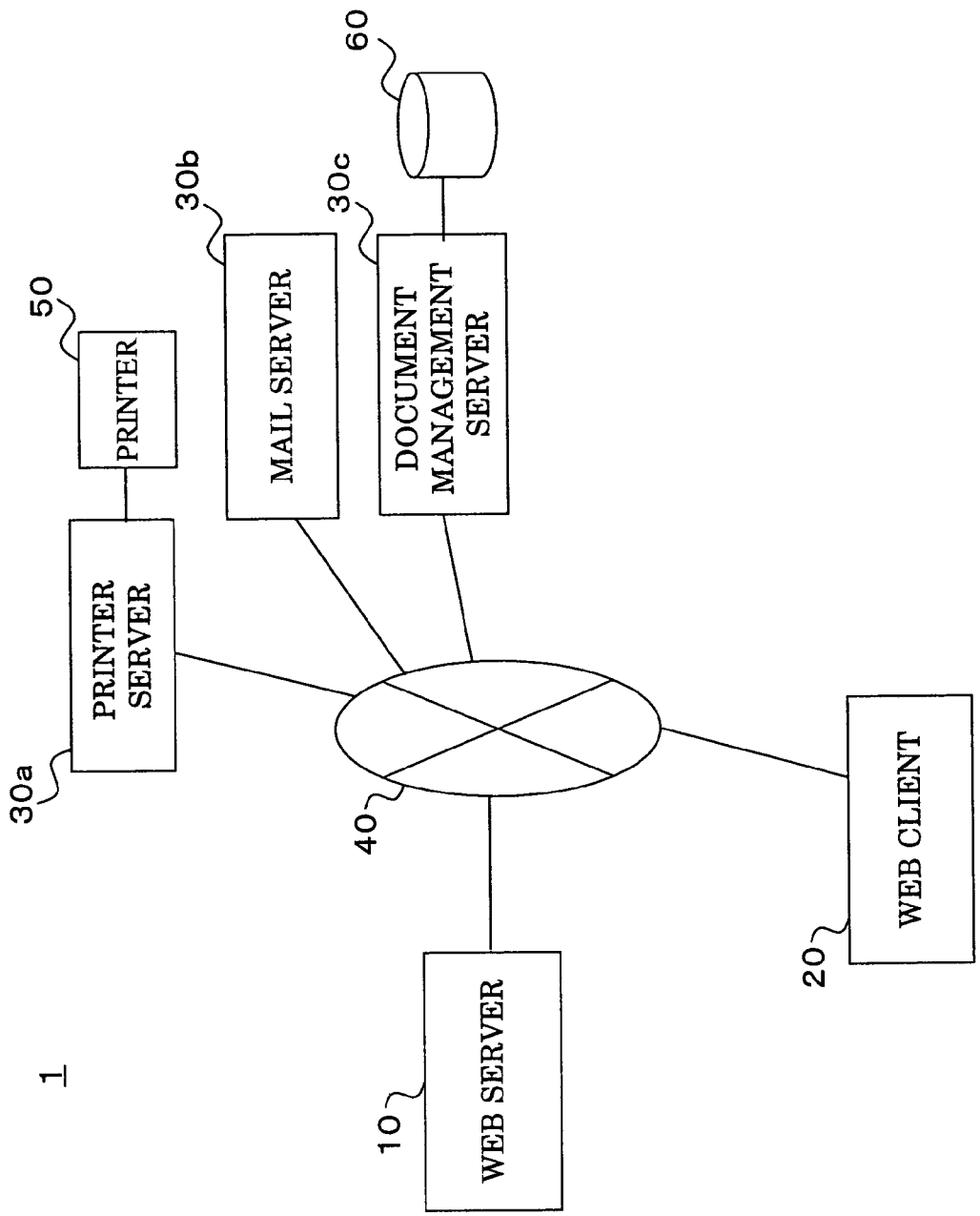
FIG. 1 shows a general configuration of a Web system according to a first embodiment of the present invention.

FIG. 1 shows a general configuration of an example of a Web system according to a first embodiment of the present invention. As for the Web system 1 of FIG. 1, a Web server 10, a Web client 20, a printer server 30*a*, a mail server 30*b*, and a document management server 30*c* are connected via a network 40, such as LAN or the Internet.

The Web client 20 is a terminal in which a Web browser is installed, for example, in a specific form of a PC (Personal Computer), a PDA (Personal Digital Assistant), a cellular phone, or so, for example.

The printer server 30*a* is a computer providing a printing service concerning a printer 50 to the network 40 as a Web service. Thus, the function of the printer server 30*a* may be called by an RPC of SOAP. For example, the printer server 30*a* has a "printing request method" which makes the printer 50 prints out specified document data, and provides the relevant method to the network 40.

The document management server 30*c* is a computer which provides, to the network 40, a document management service concerning document data stored in a document DB (Data Base) 60, as a Web service. That is, the function of document management server 30*c* may also be called by an RPC of SOAP. For example, the document management server 30*c* has a "document list acquisition method" for enabling acquisition of list information on the document data stored in the document DB 60, and provides the relevant method to the network 40.

The mail server 30*b* is also a computer which provides, to the network 40, a mail service as a Web service. A matter that a function of the mail server 30*b* may be called by an RPC of SOAP is the same as for the printer server 30*a* mentioned above. The mail server 30*b* provides a "mail list acquisition method" or so for enabling acquisition of a list of received mails. Such a server for which a relevant function may be called by an RPC of SOAP, i.e., the printer server 30*a*, mail server 30*b*, document management server 30*c* or so, may be generally referred to as a 'SOAP server', hereinafter.

The Web server 10 generates a Web page which displays information requested from the Web client 20, and is a computer which provides the generated Web page to the Web client 20. By calling various functions of other SOAP servers not shown, in addition to the above-mentioned printer server 30 or so, by an RPC of SOAP, the Web server 10 collects information required for generation of the Web page, and generates the Web page based on the collected information. That is, the Web server 10 by itself originally does not necessary have a function of executing a predetermined service nor have contents to be used for the Web page, but has a function of generating the Web page based on information collected from other servers through the network 40. However, it is also possible to mount a function onto the Web server 10 itself, as in the SOAP server, for providing a predetermined service by itself via the Web page.

Figure 2:
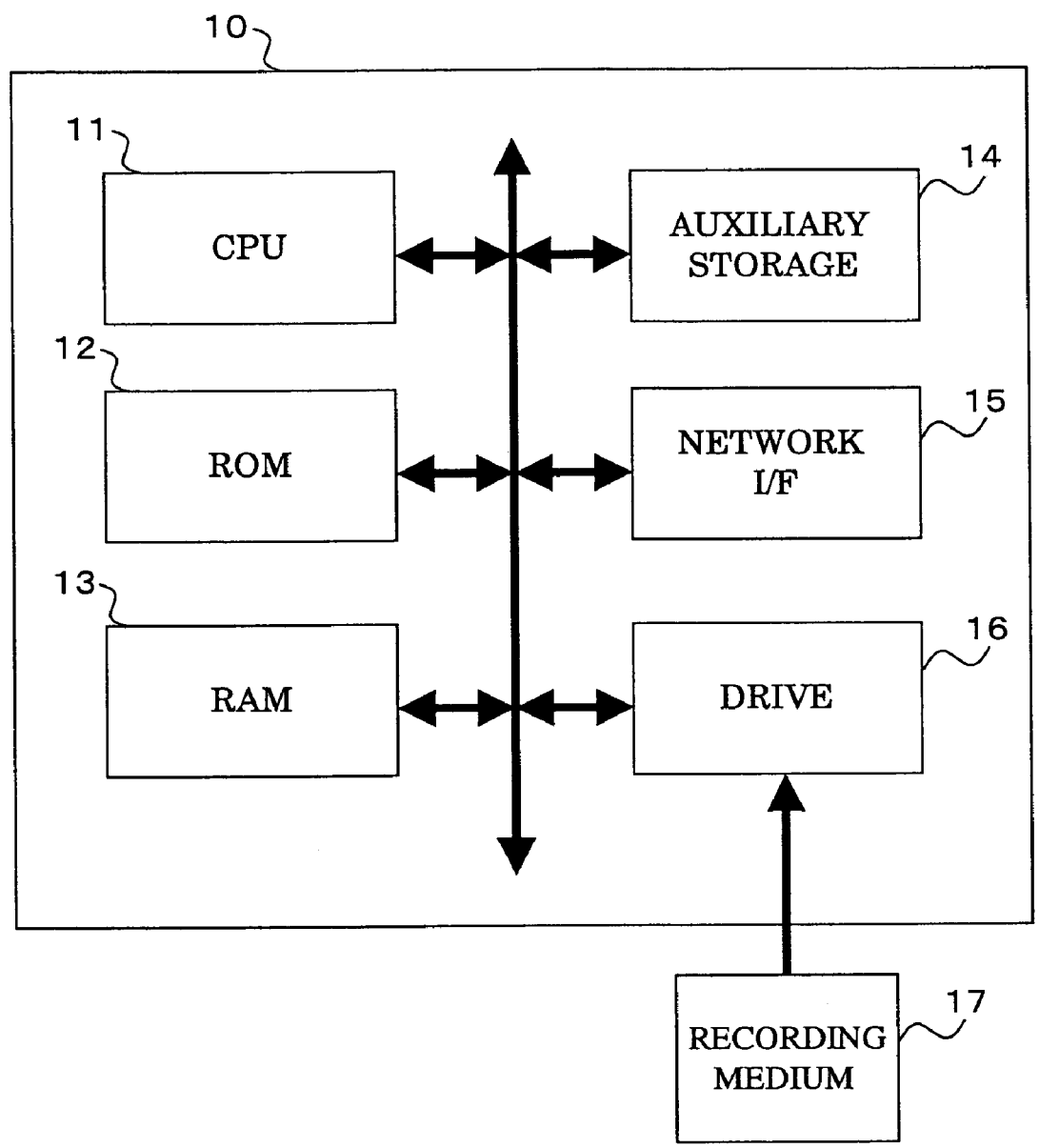
FIG. 2 shows a hardware configuration of a Web server shown in FIG. 1.

Next, details of the Web server 10 will be described. FIG. 2 shows a hardware configuration of the Web server. As shown in FIG. 2, the Web server 10 includes a CPU 11, a ROM 12, a RAM 13, an auxiliary storage device 14, a network interface (I/F) 15, a drive 16, and so forth.

The CPU 11 is a control part which controls the Web server 10 entirely, executes various control programs and application programs stored in the ROM 12 or the auxiliary storage device 14, and performs operations of controlling devices, controlling communications, data acquisition, editing, etc.

The ROM 12 is a storage device to mainly store the control programs for the devices, and the RAM 13 is a storage device to be used as a work memory for the CPU 11, a memory for a temporary data, and so forth. The auxiliary storage device 14 is a storage device to store various application programs and data, and can store table data mentioned later, as is necessary.

The network I/F 15 is an interface for connecting the Web server 10 to the network 40.

The drive 16 is a device for reading a recording medium 17, such as a CD-ROM, in which programs for executing functions according to the present invention may be stored.

Although neither any operation part nor a display part is shown in FIG. 2 particularly, the Web server 10 may be provided with a display part such as a liquid crystal device, a cathode-ray tube (CRT) or so, together with an operation part such as a keyboard, a mouse, etc. such that an operator can input data thereto, or an operator can confirm a result of operation/processing via the display part.

Figure 3:
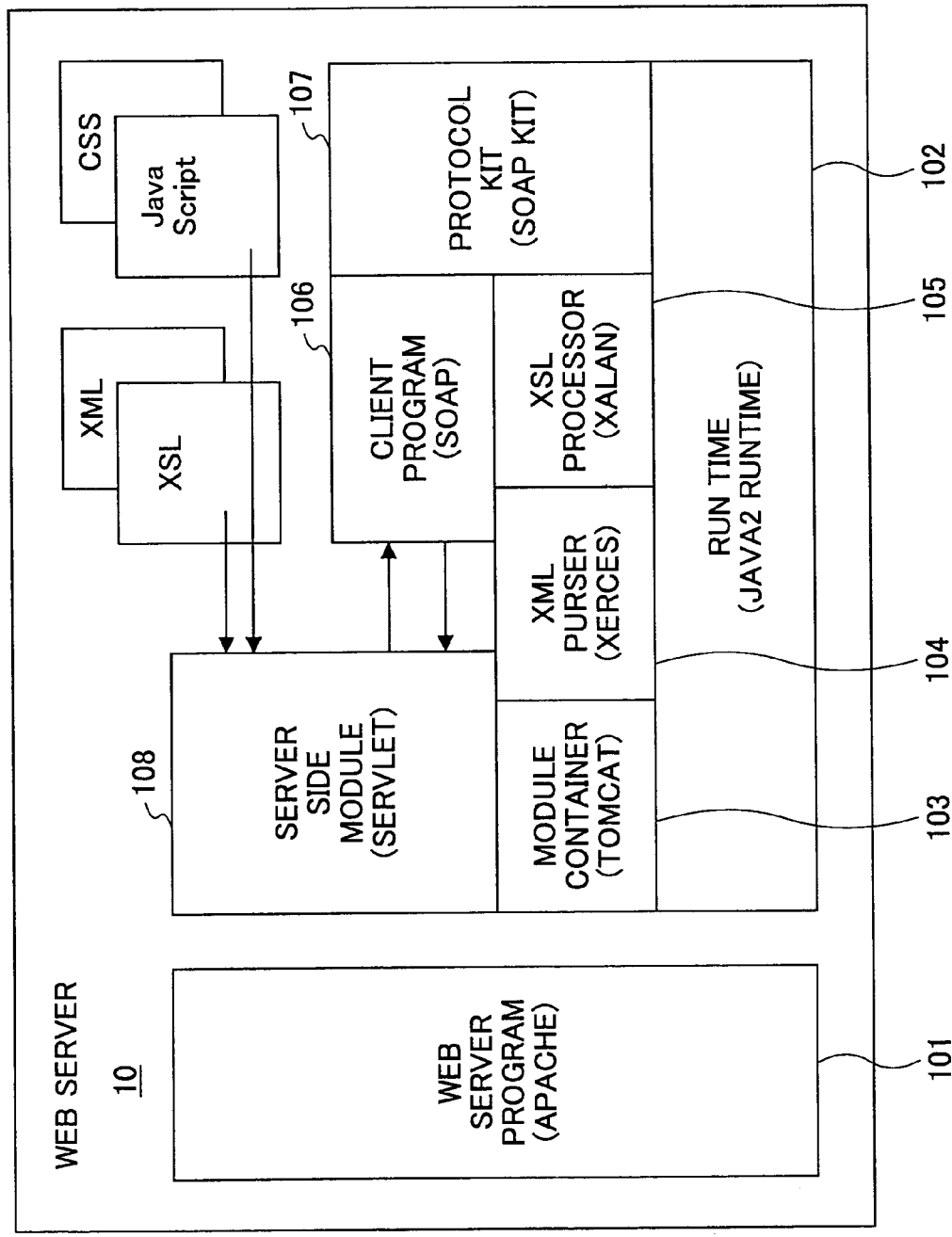
FIG. 3 shows an example of software configuration of the Web server.

Next, an example of software configuration of the Web server 10 will be described. FIG. 3 shows an example of software configuration of the Web server.

As shown in FIG. 3, the Web server 10 includes software of a Web server program 101, a run time 102, a module container 103, an XML purser 104, an XSL processor 105, a client program 106, a protocol kit 107, a server side program module 108 and so forth. And such software is stored in the auxiliary storage device 14 or ROM 12, and when the CPU 11 requires, it is read and performed thereby accordingly. It is also possible for the Web server 10 to acquire such software from the exterior through the network I/F 15.

The Web server program 101 is software for transmitting a Web page etc. according to a request from the Web client 20 and so forth in a World Wide Web (WWW) system, and, for this purpose, for example, 'Apache' provided by Apache Software Foundation may be applied.

The run time 102 is a software module required in case application software is performed, and a 'Java (registered trademark) 2' run time for performing application software created by a program language called 'Java (registered trademark) 2' which Sun Microsystems provides may be used therefor.

The module container 103 is software which provides an execution environment for performing the server side program module 108, and, for example, 'Tomcat' provided by Apache Software Foundation may be used for this purpose.

The XML (extensible Markup Language) purser 104 extracts in a memory XML data described in text by a tree structure, is software for making it easy to handles other applications, and, for example, 'Xerces' provided by Apache Software Foundation may be used therefor.

The XSL (extensible Stylesheet Language) processor 105 is software for changing XML data according to XSL data, for example, and Xalan provided by Apache Software Foundation may be used therefor.

The client program 106 is software for requesting processing to a SOAP server, such as the printer server 30a, for example, and software which performs communication by SOAP may be used therefor. The protocol kit 107 is software for actually performing communications according to the request.

The server side program module 108 is a program in a form of a module which is performed by the Web server 10, and servlet created using Java (registered trademark) 2 is used therefor in this case. And many of processing units used as features of the embodiment of the present invention in the Web server 10 are realized as a result of the CPU11 operating as various parts with this server side program module 108. That is, the server side program module 108 acts as a program which performs calling functions of the printer server 30a or so, generates a Web page, and so forth, according to a request of the Web client 20.

In addition, in case of changing XML data according to XSL data and generating HTML data as in the Web server 10, it is possible to further use cascading style sheet (CSS) data defining a method for display which cannot be handled by HTML and XSL specification, code in Java (registered trademark) Script defining operation of pop-upping of an error message, or so. Required CSS data and required Java (registered trademark) Script code may be directly described in XSL data, reference information for these data and code may be described in XSL data, or so, and thus, may be included in the XSL data which is converted data.

Figure 4:
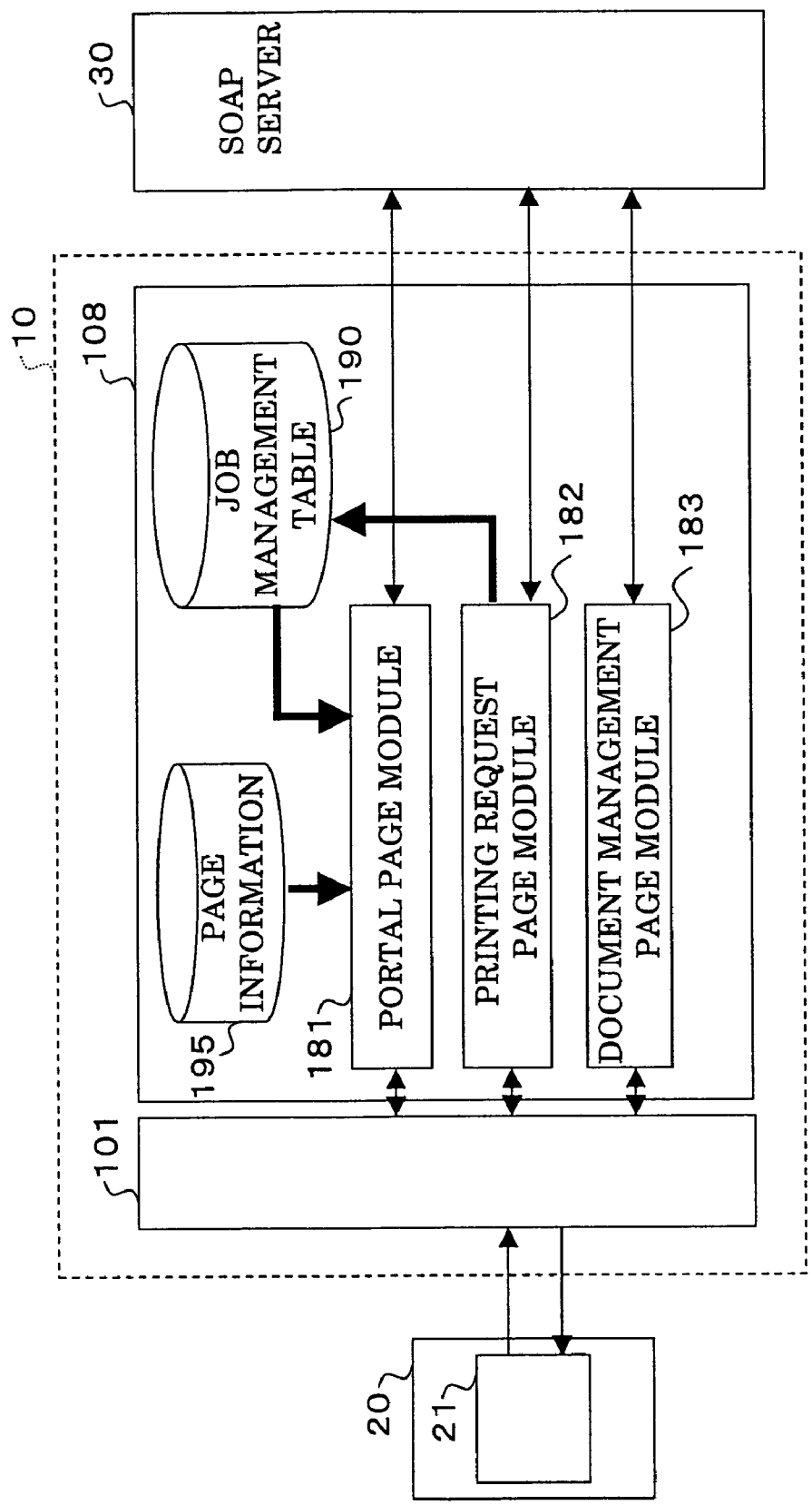
FIG. 4 shows an example of functional configuration of the Web server.

Next, an example of functional configuration of functions to execute processing used as the features in the embodiment of the present invention realized by the server side program module 108 will be described. FIG. 4 shows an example of functional configuration of the Web server according to the first embodiment of the present invention. In FIG. 4, the Web server 10 has a portal page module 181, a printing request page module 182, a document management page module 183, and so forth, as functions of the server side program module 108. According to a transmitting request for a Web page made from the Web client 20, these various modules are started by the Web server program 101, and generate a Web page. Although not shown, modules for various requests made from the Web client 10 are mounted besides the portal page module 181. The portal page module 181 is started by the Web server program 101 according to the transmitting request for a portal page from the Web browser 21 of the Web client 10, collects information from the SOAP servers 30, such as the document management server 30b, and generates the portal page which displays thus-collected information, other HTML data, etc. The portal page integrates various types of information in a single Web page, and a user of the Web client 20 can use it as an entrances for the Internet, intranet, or so, using the Web browser.

The printing request page module 182 is started by the Web server program 101 according to a printing request for document data made from the Web browser 21, requires printing of the document data from the printer server 30a, and generates a Web page indicating that the printing request is accepted.

The document management page module 183 is started by the Web server program 101 according to a transmitting request for a document management page made from the Web browser 21, acquires list information for document data, etc. from the document management server 30c, and generates a Web page (document management page) which displays list information, etc. Hereafter, the portal page module 181, the printing page module 182, the document management page module 183 or so may be generally referred to as a "page module".

A job management table 190 manages respective ones of identification information or so of various units of processing which are jobs requested to various types of page modules, for each of which execution thereof is not yet completed at a time when a response to the request is made by the SOAP server 30 (simply referred to as 'job on request', hereinafter), in other words, are processing units which are executed asynchronously in response to the request in the SOAP servers 30. The job management table 190 also manages information concerning a method for checking a processing state of each job on request later. According to the first embodiment, printing processing of document data of the printer server 30a corresponds to an asynchronous job, and a printing request made to the printer server 30a from the printing request page module 182 is registered in the job management table 190 as a job on request. In case the portal page module 181 generates a portal page, it acquires current states of the jobs on request from the SOAP servers 30 to which the requests are made, according to the contents of the job management table 190, and uses the thus-acquires job states to be displayed on the portal page.

The page information file 195 defines portal page layout information and information which should be displayed in each area allocated in the page, and is referred to by the portal page module 181 when it generates the portal page.

Figure 5:
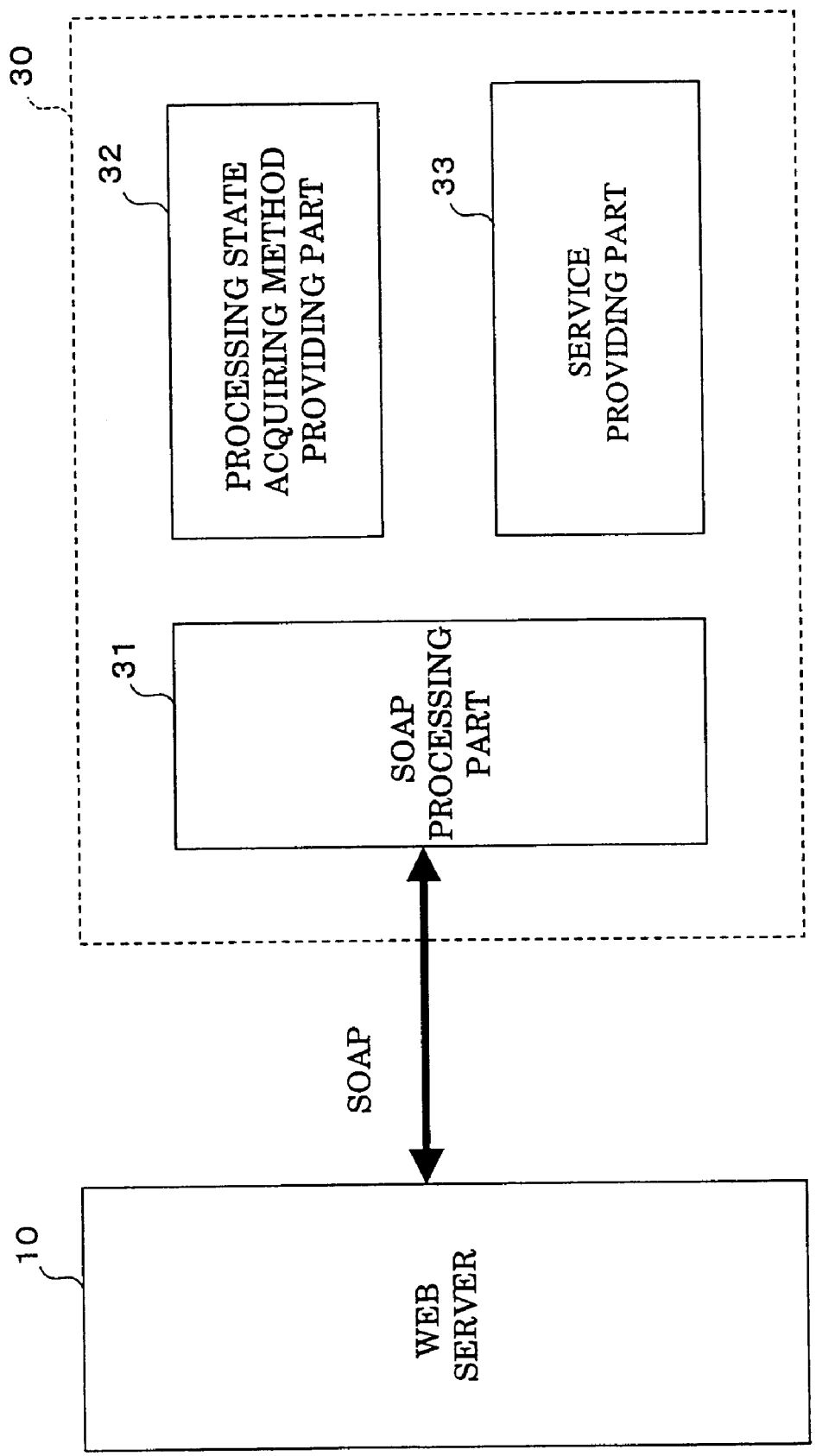
FIG. 5 shows an example of a fictional configuration of a SOAP server in the embodiment of the present invention.

Next, a functional configuration of the SOAP server 30 will be described. FIG. 5 shows one example of functional configuration the SOAP server according to the embodiment of the present invention. As shown in FIG. 5, the SOAP server 30 includes a SOAP processing part 31, a processing state acquisition method providing part 32, and a service providing part 33, and so forth.

The SOAP processing part 31 is a module interprets a SOAP message transmitted from the Web server 10, and calls the processing state acquisition method providing part 32 or the service providing part 33 according to the contents of description in the SOAP message.

The SOAP processing part 31 changes, into a SOAP message again, information which the processing state acquisition method providing part 32 or the service providing part 33 provides, as a processing result, and transmits the SOAP message to the Web server 10.

The processing state acquisition method providing part 33 responds to the Web server 10 according to an execution request for processing concerning a Web service, made by the Web server 10, without waiting for the completion of the relevant processing.

The processing state acquisition method providing part 33 makes a response to the Web server 10 with information indicating a method for acquiring a state of the processing requested by the Web server 10.

The service providing part 33 performs the processing concerning the Web service. Therefore, a function mounted in the service providing part 33 is different for each SOAP server 30. That is, in the printer server 30a, the function concerning printing service is mounted, and, in the mail server 30b or in the document management server 30c, the function concerning mail service or document management service is mounted.

Figure 6:
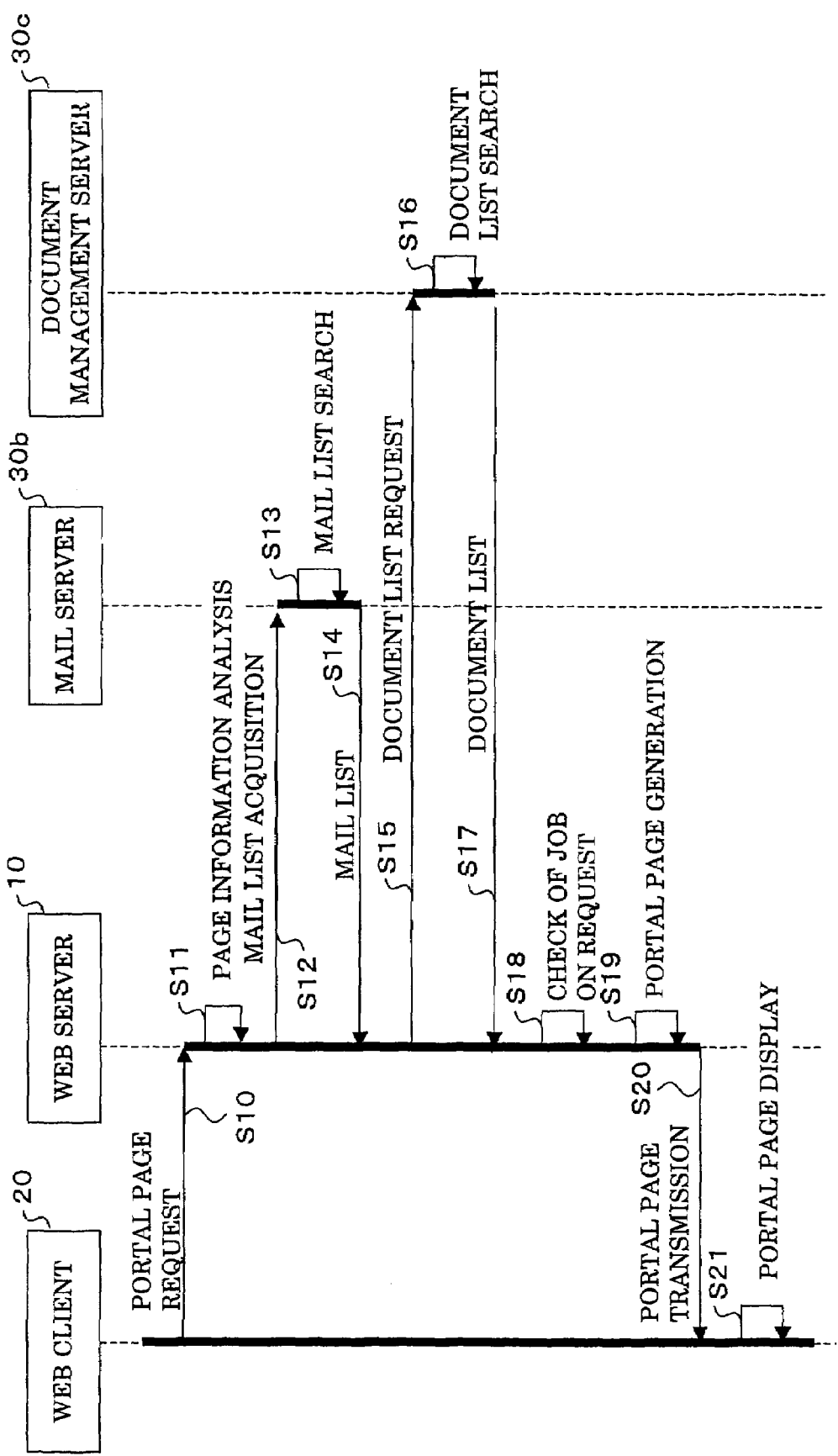
FIG. 6 shows a sequence diagram illustrating processing performed at a time of displaying a portal page according to the embodiment of the present invention.

Hereafter, referring to FIG. 4 and so forth, a processing procedure of the Web system 1 shown in FIG. 1 will be described. First, a processing procedure until a portal page is displayed by the Web browser 21 of the Web client 20 will be described. FIG. 6 shows a sequence diagram for illustrating processing executed at a time of displaying a portal page.

In Step S10, if a user of the Web client 20 makes an instruction to display of a portal page by inputting an URL of the portal page into the Web browser 21 or so, the Web client 20 transmits a transmitting request for the portal page to the Web server 10. The Web client 20 also transmits together information from which Web server 10 can identify the user of the Web client 20 uniquely. A user ID and a password, for example, may be used for this purpose. In such a case, the user may be requested to input them to the Web browser 21 where the password may be previously set for the portal page in that case as information which can identify the user in a case the transmitting request for the portal page occurs. Alternatively, a user may be requested to previously register the user ID, and, at this time, it is also registered into a cookie of the Web client 20. Then, the Web browser is caused to send it in a case where the transmitting request for the portal page occurs.

In Step S11 following Step S10, the portal page module 181 of the Web server 10 identifies the user of the Web client 20 based on the identification information transmitted with the transmitting request for the portal page, and analyzes a page information file 195 of the portal page defined for the user.

Figure 7:
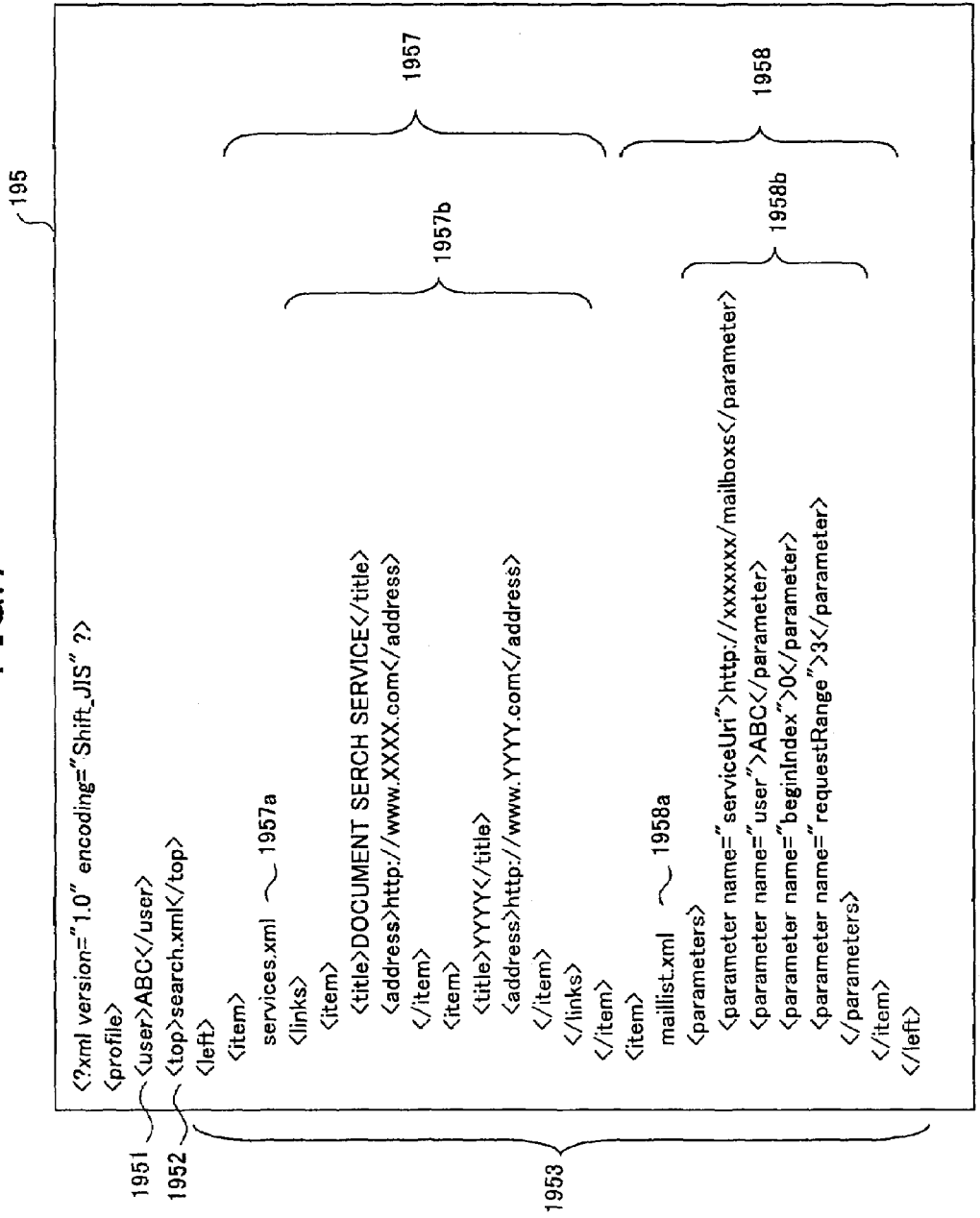
FIG. 7 shows an example of a definition of a page information file according to the embodiment of the present invention.
Figure 8:
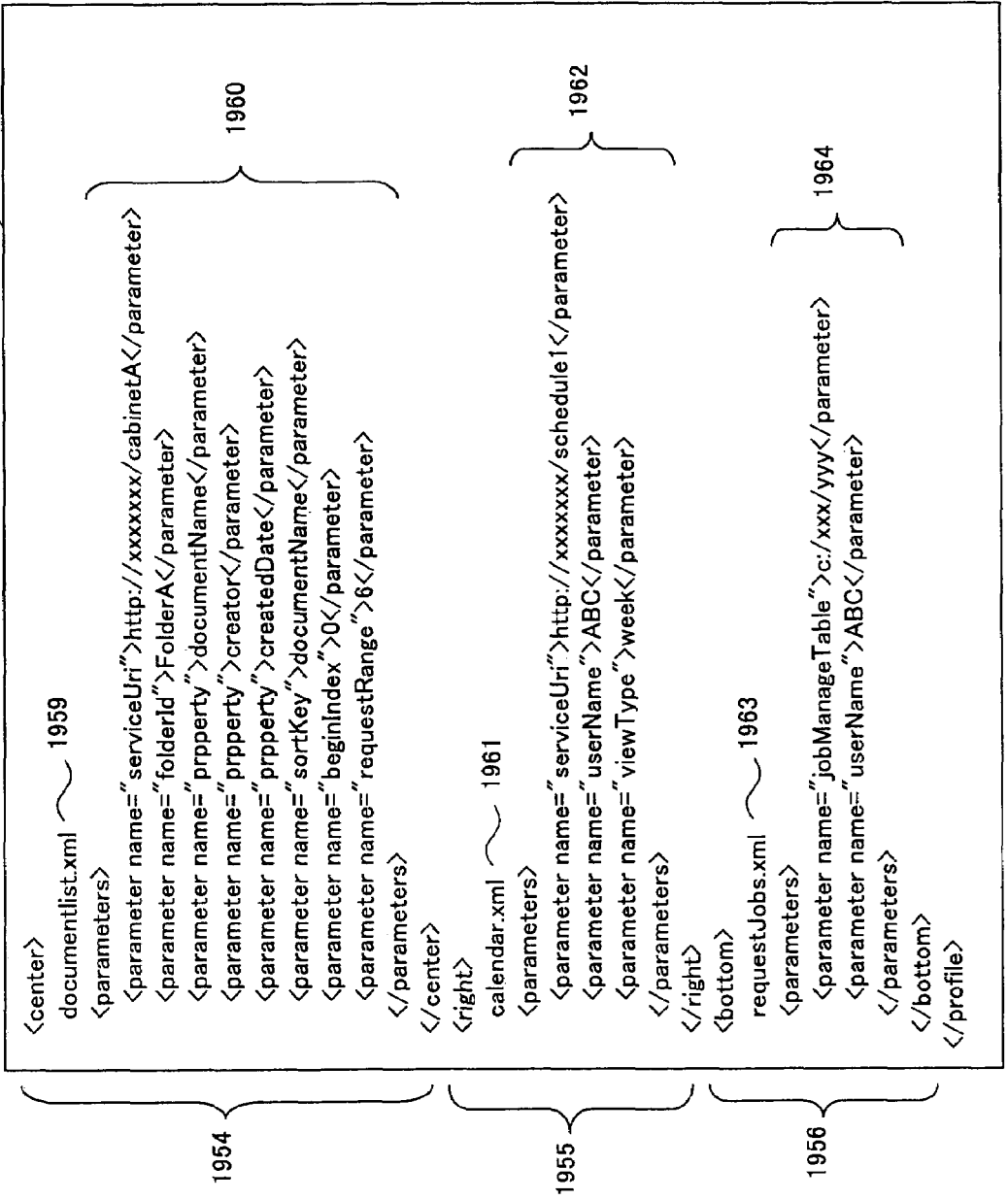
FIG. 8 shows another example of a definition of a page information file according to the embodiment of the present invention.

FIG. 7 and FIG. 8 show an example of a definition in the page information file. FIGS. 7 and 8 express one page definition file 195. The page definition file 195 is described by XML according to the present embodiment.

In the page definition file 195 of FIG. 7 and FIG. 8, descriptions 1952, 1953, 1954, 1955, and 1966 are definitions for the contents displayed on respective divisional areas formed in the portal page. Referring to each area as a "block", the description 1952 enclosed by <top> tags defines a top block; the description 1953 enclosed by <left> tags defines a left block; the description 1954 enclosed by <center> tags defines a center block; the description 1955 enclosed by <right> tags defines a right block; and the description 1956 enclosed by <bottom> tags defines a bottom block.

Figure 9:
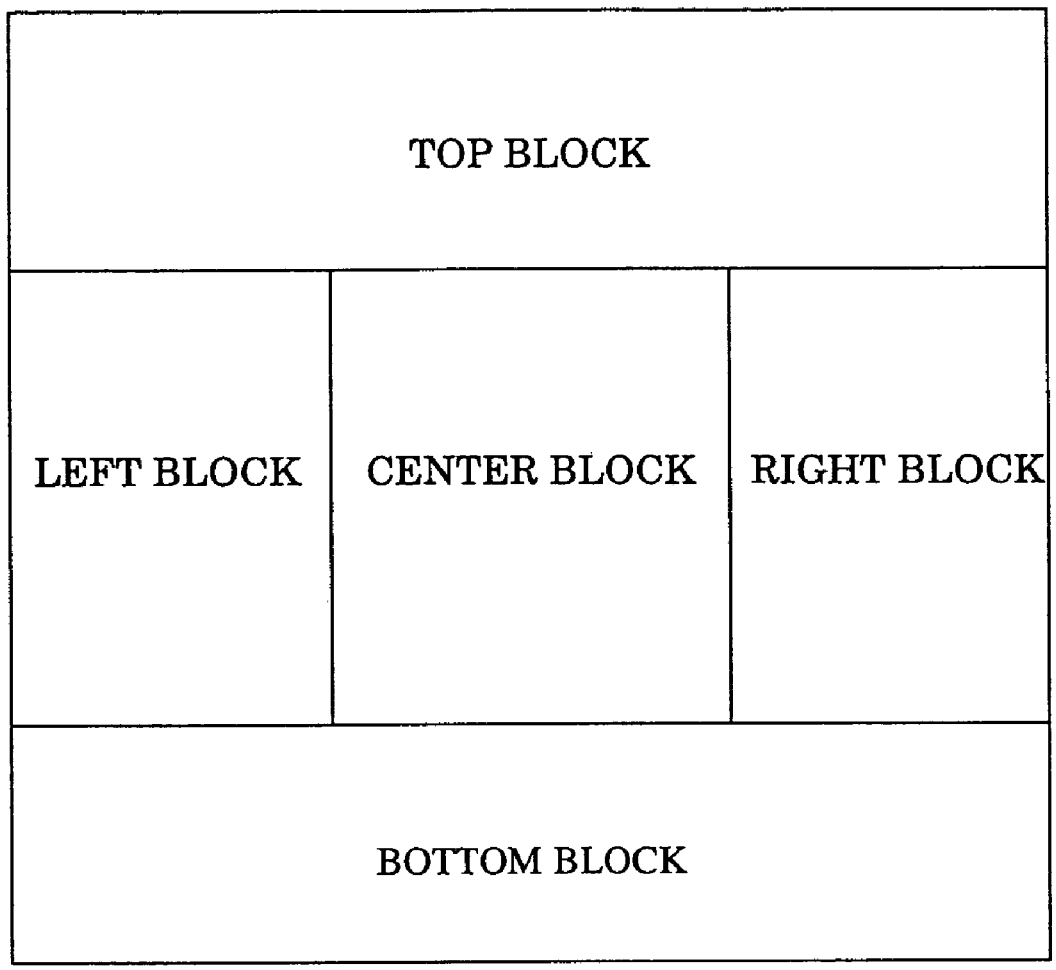
FIG. 9 illustrates an arrangement of each block on the portal page according to the embodiment of the present invention.

FIG. 9 shows an arrangement of each block in the portal page. As shown in FIG. 9, the top block and bottom block are located in a top row and in a bottom row, respectively, in case the portal page is divided into total three rows (a top row, a middle row, and a bottom row) vertically. The left block, center block, and right block are located at a left side, a center and a right side, respectively, in case the middle row of the portal page is divided into total three divisions horizontally.

Returning to FIG. 7, the definition for each block includes a file name of a file (henceforth referred to as "a display content definition file") which includes a definition for the contents of display of the relevant block, and parameter information indicating a value of parameter defined as a variable in the definition in the display content definition file if needed.

For example, for the top block, the description 1952 shows that the file name of the display content definition file is "search.xml", as shown.

To further divide the left block longitudinally into two areas (a top area and a bottom area) is defined by the description 1957 and description 1958 which are defined by <item> tags, respectively. Thereby, it is seen that the display content definition file for the top area is 'services.xml' according to a description 1957*a*, and the parameter information thereof is a description 1957*b*.

The display content definition file for the top block is 'maillist.xml' according to a description 1958*a*, and the parameter information thereof is a description 1958*b*. The file names (descriptions 1959, 1961, and 1963) and parameter information (descriptions 1960, 1962, and 1964) of each display content definition file are described also for the center block, the right block, and the bottom block.

The definitions for the contents of display described in the display content definition file mainly include a definition of a method (referred to as a "display information acquiring method") for acquiring information (display information) to be displayed on the relevant block, and a definition of a method (referred to as a "form information acquisition method" hereafter) for acquiring form (or style) information for determining an arrangement of the display information in the block.

For example, when display information is static one, as an example of the display information acquisition method, a path name or a URL of a XML file or a HTML file, etc. in which display information is stored may be applied. A path name or a URL for a XSL file applied to an XML file in which the display information is stored may be applied as an example of the form information acquisition method.

On the other hand, when information displayed in the block is dynamic one, as an example of the display information acquisition method, interface information of a method which should be called in order to acquire the display information from the SOAP server 30 and so forth etc. may be applied. When the display information acquired by calling the method as an example of the form information acquisition method, for example is XML data, a path name or a URL of an XSL file applied to an XML data concerned may be applied.

The description 1951 shown in FIG. 7 is information for identifying the owner of the page definition file 195. That is, "ABC" enclosed with <user> tags shows that the owner of the page definition file 195 shown in FIG. 7 and FIG. 8 is a user identified by a user ID or a user name of "ABC." Thus, the page definition file 195 in the embodiment of the present invention is defined for each user. By defining the page definition file 195 for each user, the portal page customized for each user can be provided.

By analyzing the page information file 195 as shown in FIG. 7 and FIG. 8, the portal page module 181 can acquire an acquisition method for information to be displayed in each block of the portal page for a current user etc. The portal page module 181 executes processing for acquiring the display information, etc. based on the page information file 195 following Step S11. For example, in Step S12, for the purpose that information to be displayed in the bottom area of the left block should be acquired, the portal page module 181 generates call information for the mail list acquisition method of the mail server 30*b* in XML data, and transmits the XML data concerned to the mail server 30*b* by SOAP.

The portal page module 181 calls the mail list acquisition method because interface information for the mail list acquisition method is described as the display information acquisition method by the display content definition file for the bottom area of the left block (maillist.xml). The information (i.e., an URL of a relevant mail box, a user name, an index of top mail of the mails to acquire, and the number of the mails to acquire) described by the description 1958*b* as argument information is specified for the method concerned, in the calling information for the mail list acquisition method.

Such operation of method calling for a SOAP server such as the mail server 30*b* by the Web server 10 will be simply referred to as "SOAP calling".

In Step S13 following Step S12, the mail server 30*b* which has the mail list acquisition method called searches a received mail list for the relevant user, creates a search result as XML data, and transmits it to the Web server 10 by SOAP (S14).

In Step S15 following Step S14, the portal page module 181 carries out SOAP calling for the document list acquisition method of document management server 30*c* in the procedure same as in the case of the mail server 30*b* mentioned above, based on the description 1954 of the page information file 195. Namely, the portal page module 181 acquires, from the display content definition file (documentlist.xml) for the center block, interface information for the document list acquisition method and specifies information (a URL of a relevant cabinet for searching, a name of relevant folder and an indication that a type of property of a search object includes a document name (documentName), a creator (creator) and a created date (ceatedDate), a sort key, an index at which the search starts, the number of search items) described in the description 1960 as argument information for the document list acquisition method The document management server 30*c* for which the document list acquisition method is called searches a document data list from the document DB 60 (S16), creates a search result as XML data, and transmits it to the Web server 10 (S17).

Further, although not shown in FIG. 6, the Web server 10 also acquires display information and form (style) information for the other blocks according to the relevant definitions of the page information file 195.

Step S18 is performed, in parallel to, as a thread other than those of Steps S11 through S17 and so forth. In Step S18, the portal page module 181 determines whether any other job on request is registered in the job management table 190. The details of processing thereof including the contents of the job management table 190 will be described later.

In case no other job on request is registered in the job management table 190, the portal page which is a set in HTML data is generated by the Web server 10 with performing XSLT conversion based on the display information such as XML data or HTML data and form (style) information such as XSL data acquired for each block based on the page information file 195, with merging the HTML data thus obtained for each block by the XSLT conversion, in Step S19.

Then, in Step S20 following Step S19, the Web server 10 transmits the portal page thus generated to the Web client 20, the Web browser 21 of the Web client 20 then displays the portal page which is thus received (S21).

Figure 10:
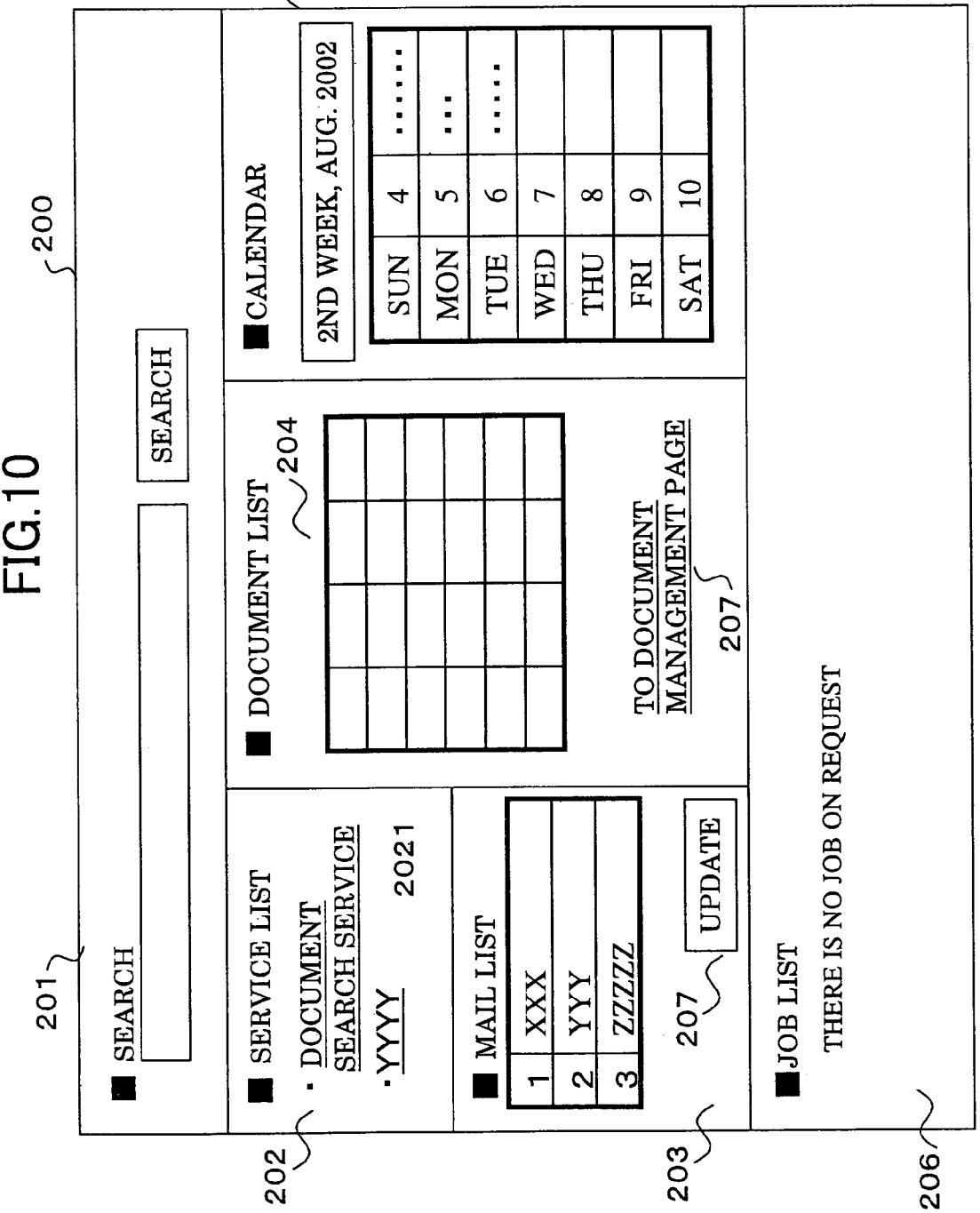
FIG. 10 shows an example of the portal page according to the embodiment of the present invention.

FIG. 10 shows an example of the portal page. The portal page 200 of FIG. 10 has a search area 201 providing a Web site search service; a service list area 202 where a list of services (links) which the portal page 200 provides is indicated; a mail list area 203 where a list of received mails is displayed, a document list area 204 for a user to display a list of documents stored in the document DB 60; a calendar area 205 where a calendar is displayed; and a job list area 206 displaying a list of messages (referred to as "processing state message" hereinafter) concerning states of jobs on request. It is noted that while the portal page 200 is displayed by the Web browser, indication of user interface of the Web browser is omitted for the purpose of simplification. The same manner is also applied for all the other figures showing Web pages.

The information currently displayed in each area of the Web page is one collected by the Web server 10 based on the definition (FIG. 7) of the page information file 195 from the SOAP servers 30, such as the mail server 30b, HTML files stored, or so. For example, the information of the mail list area 203 is acquired from the mail server 30b; and the information of the document list area 204 is acquired from the document management server 30c. For the job list area 206, since it corresponds to processing of Step S18 of FIG. 6, and no job on request is registered in the job management table 190 as mentioned above, this matter is displayed in this case.

Figure 11:
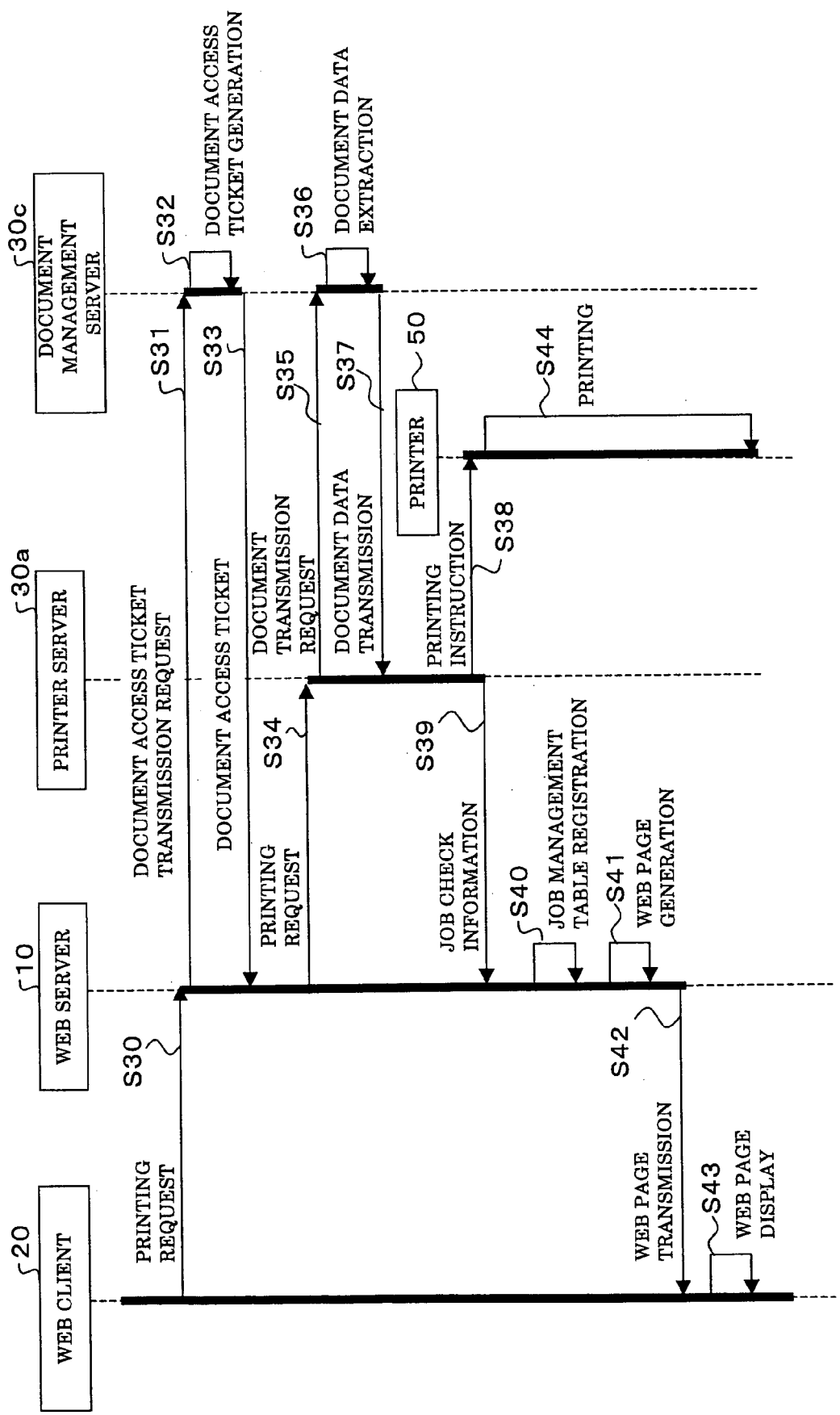
FIG. 11 shows a sequence diagram illustrating processing performed in a case of occurrence of a printing request according to the embodiment of the present invention.

Next, processing executed at a time of printing document data currently displayed in the document list area 204 will be described. FIG. 11 is a sequence diagram illustrating processing in a case of occurrence of a printing request. Hereinafter, same as in the case of FIG. 6, communications are performed between the Web server 10 and SOAP server such as the printer server 30a, document management server 30c or so, and are achieved by SOAP with exchange of XML data.

In Step S30, the Web client 20 specifies document data to be printed to the Web server 10, and transmits a printing request for the document data. Execution of the printing request made by the Web client 20 may be achieved in a manner such that a user selects a document to be printed from the document list area 204 of the portal page 200, or a user clicks a printing button not shown, or such an action is performed after a document management page is caused to be displayed with clicking a link description 207 in the document list area 204.

FIG. 12 shows an example of the document management page. Via the document management page 210 of FIG. 12, a user can perform various operations for the document data currently displayed on a document list table 211. There, it is necessary to just click 'a document printing link' 213, for making a printing request, for example, after putting a check mark in a check button 212 of document data, such as document data "AAA", to be printed.

In Step S31 following Step S30, a printing request page module 182 of the Web server 10 transmits a transmitting request for an access ticket of the document data "AAA" to the document management server 30c. The access ticket is like a permit which enables actual access to the document data, and includes identification information, authentication information, or so for the relevant document data.

In Step S32 following Step S31, the document management server 30c generates the access ticket for the document data "AAA", and transmits it to the Web server 10 (S33).

In Step S34 following Step S33, the printing request page module 182 transmits a printing request for the document data "AAA" to the printer server 30a with the access ticket for the document data "AAA."

In Step S35 following Step S34, the printer server 30a transmits a transmitting request for the document data "AAA" to the document management server 30c with the access ticket for the document data "AAA." The printer server 30a assigns a job ID to the printing request, makes a relation of the job ID for the relevant printing processing job, and manages it.

In Step S36 following Step S35, the document management server 30c which has received the transmitting request for the document data extracts the document data "AAA" from the document DB 60, and transmits it to the printer server 30a (S37).

In Step S38 following Step S37, the printer server 30a starts an application corresponding to the document data "AAA" and a printing instruction for the document data "AAA" is sent to the printer 50, a SOAP message as a response to the printing request is then transmitted by the printer server 30a to the Web server 10, without waiting for the completion of the relevant printing processing (S39). The printer server 30a includes, in the SOAP message to transmit, interface information or so (a name of method or so; henceforth referred to as "job check information") for enabling an inquiry for a relevant processing state to the printer server 30a later on from the Web server 10, together with the job ID for identifying the relevant printing processing job.

FIG. 13 shows an example of the job check information. As shown in FIG. 13, the job check information 31 includes "method name for state acquisition" which is a method name of a method for asking a processing state, and "completion status" which is a value showing a completion of the processing as a return value of the state acquisition method. In case a state of the printing request is asked in use of the job check information 31, it is necessary to just call a 'getPrintStatus' method from the printer server 30a. When "Complete" is returned as a return value to this method calling, it can be determined that the printing processing is completed.

FIG. 14 shows an example of the SOAP message transmitted by the printer server as a response to the printing request. In the SOAP message 410 of FIG. 14, the job check information is included in description 411 and description 412, and a job ID is contained in description 413. Specifically, in the description 411, enclosed by <methodName> tags, a method name (getPrintStatus) for state acquisition is described. Also, in the description 412, enclosed <CompleteSign> tags, a completion status (Complete) is described. Also, in the description 413, enclosed by <jobID> tags, a job ID (001) is described. The job check information, etc. is contained in such a structure, and is transmitted to the Web server 10.

The above-mentioned operation of responding by the printer server 30a without waiting for the completion of printing processing should be performed for the purpose of solving a problem occurring due to a time may be taken for the completion generally in some case depending on the number of other printing requests waiting, the data size of document data to be processed, or so. Namely, the Web server 10 which has made a printing request then enters a state of waiting for a response from the printer server 30a. Therefore, also the Web browser 21 which has made the printing request to the Web server 10 enters in a state of waiting for a response from the Web server 10. Thus, if the printer server 30*a* made a response after completing the printing processing, the Web browser 21 would have been left waiting for the response through the Web server 10 for a long time. Then, according to the present invention, the printer server 30*a* returns a response to the Web browser 21 at an early stage without waiting for the completion of printing processing so as to cancel the waiting state, so as to cancel the waiting state, so that a user can do other work at an early stage using the Web browser 21.

In Step S40 following Step S39, the printing request page module 182 registers the printing request made to the printer server 30*a* in Step S34, in the job management table 190 as a job on request.

FIG. 15 shows an example of the job management table. In the job management table 190, a "request user ID" identifies a user who originally requested the job, a "job ID" identifies a processing unit (or job) requested to the SOAP server 30, a "service requested URL" is a URL of the SOAP server 30 which receives the request, a "state acquisition method" is interface information which enables an inquiry for a processing state, and a "completion status" is a value which shows a completion of processing in a return value from the method for a state acquisition. The information items of "job ID", "state acquisition method", and "completion status" are received from the SOAP server 30, and are registered in the job management table. There, the portal page module 181 registers in the job management table 190, for the printing request made to the printer server 30*a*, "ABC" as the request user ID, "001" as the job ID, the URL of the printer server 30*a* as "the service request place URL", "getPrintStatus" as the state acquisition method, and "Complete" as the completion status, in this case.

In Step S41 following Step S40 of FIG. 11, the printing request page module 182 generates a Web page as a response to the printing request from the Web client 20. In this case, the Web server 10 generates the Web page in which a message of "printing request accepted" is displayed.

In Step S42 following Step S41, the Web server 10 transmits the generated Web page to the Web client 20.

In Step S43 following Step S42, the Web browser 21 of the Web client 20 displays the Web page thus received from the Web server 10 to the user.

On the other hand, the printer 50 which has received the printing instruction for the document data "AAA" from the printer server 30*a* in Step S38 performs printing processing for the document data "AAA" in Step S44, and holds information indicating this processing state.

By the above-mentioned processing, the printing request of the Web client 20 is managed by the Web server 10 as a job on request.

Figure 16:
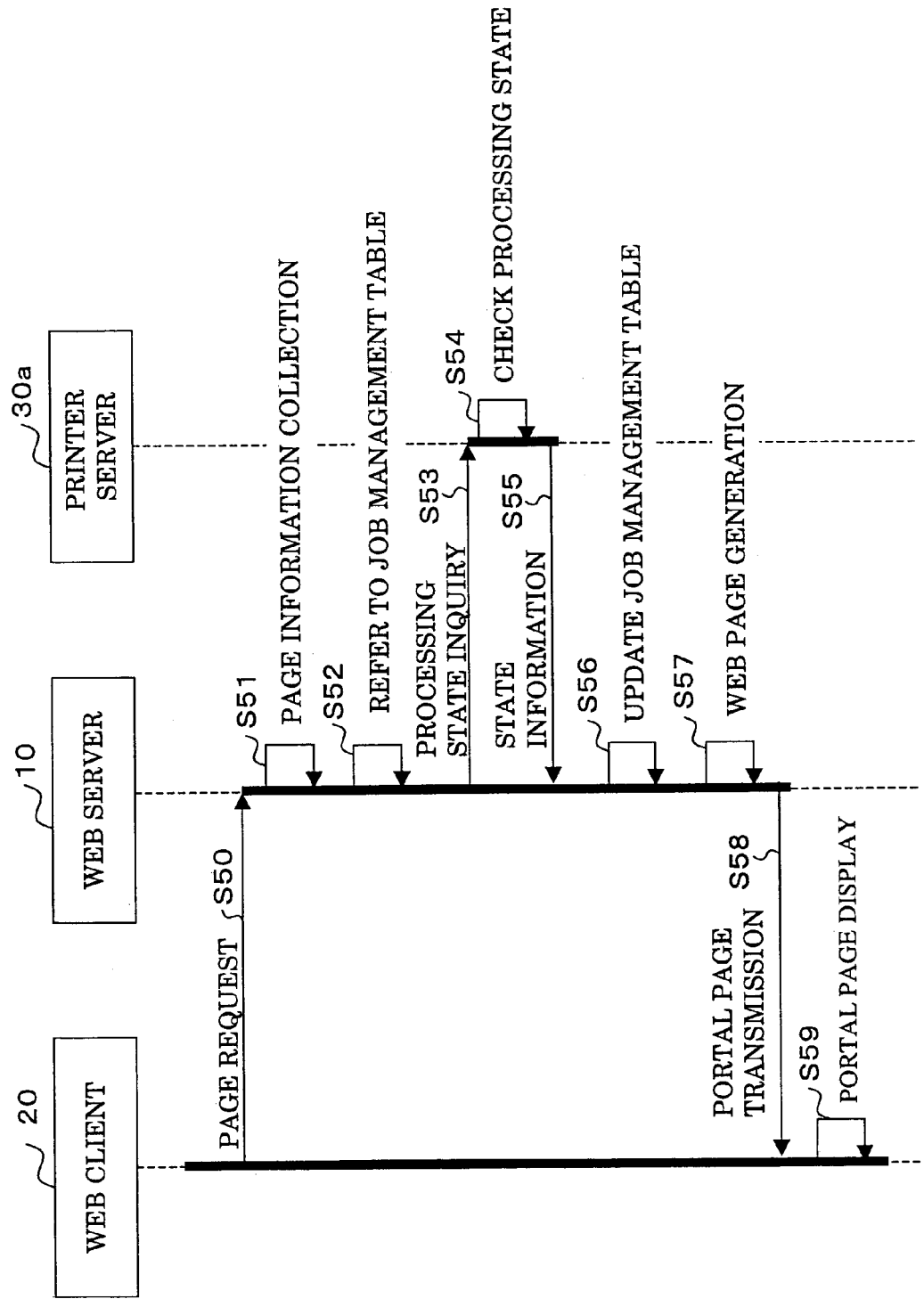
FIG. 16 shows a sequence diagram illustrating inquiry processing for a state of a job request according to the embodiment of the present invention.

Next, processing for a user of the Web client 20 to acquire a state of printing processing for which execution is requested beforehand, i.e., a processing state of a job on request, will be described. FIG. 16 shows a sequence diagram illustrating the inquiry processing for the state of a job on request.

In Step S50, the Web browser 21 of the Web client 20 transmits a transmitting request for a portal page to the Web server 10 according to an input from a user. This situation may correspond to one occurring when, for example, a portal page 200 is newly displayed from the document management page 210; the Web browser 21 is re-started and thus the portal page is made displayed; the portal page 200 currently displayed is updated; the update button 207 of FIG. 10 is clicked for updating the mail list on the portal page, or so. It is the same as that in the case of Step S10 of FIG. 6, and, thus, a user ID for identifying the user is also transmitted.

In Step S51 following Step S50, the portal page module 181 of the Web server 10 collects information to be displayed on the portal page from various SOAP servers 30 in the procedure same as that in Steps S11–S17 of FIG. 6 described above.

In Step S52 following Step S51, the portal page module 181 searches for a job on request with reference to the job management table 190, which job has the user ID specified by the relevant transmitting request for the portal page, as the request user ID. For example, when the relevant user ID is "ABC", the record on the first line of the job management table 190 of FIG. 15, i.e., the record for the printing request to the printer server 30*a*, the record on the second line, etc. are taken out.

In parallel to Steps S51 and S52, Step S53 is performed in another thread. In Step S53, based on the job on request thus extracted from the job management table 190, the portal page module 181 inquires the printer server 30*a* for the state of the job having the job ID of "001" (referred to as "job 001" hereinafter) by making SOAP calling for the state acquisition method (getPrintStatus) with the job ID "001" as input information (argument) therefor, for example.

Referring to the job management table 190 in Step S52, calling the state acquisition method in Step S53, or so, is made based on the definition (FIG. 7 and FIG. 8) of the page information file 195. That is, an instruction to acquire display information with reference to the job management table 195 is defined as the display content definition file for the bottom block (requestJobs.xml; FIG. 8, description 1963), and the path name of the job management table 195 to be referred to, and the user ID or user name of the relevant user are specified in the description 1964 (FIG. 8) as parameter information.

In Step S54 following Step S53, the printer server 30*a* asks the printer 50 a state of the job 001, for which acquisition of the processing state is thus requested, i.e., a state of printing processing concerning the document data "AAA" is requested, by calling the state acquisition method. The printer 50 takes out the information concerning the printing state of the document data "AAA" currently held as mentioned above, and transmits it to the printer server 30*a*.

In Step S55 following Step S54, the printer server 30*a* then transmits the processing state of the job 001 to the Web server 10. When the printing processing has been already completed, the printer server 30*a* transmits "Complete" as a return value of the state acquisition method. In case of defining the processing state more finely, such as, "waiting for printing", "on rasterizing", "on standby", or so, other than simple "completion" or "not yet completion", a relevant value identifying each of these states may be transmitted as the return value of the state acquisition method, instead, or in addition to.

In Step S56 following Step S55, when the return value of the state acquisition method is in agreement with the value "Complete" already managed by the job management table 190 as the completion status of the job 001, the portal page module 181 recognizes that the job 001 has been already completed, and the record of the job 001 is deleted from the job management table 190. However, since it is necessary to ask the printer server 30*a* the state of the job 001 again upon receiving an updating request for the page etc. after that in case the return value is not "Complete", the portal page module 181 does not delete the record of the job 001.

In case another processing request, such as a job 002, is registered in the job management table 190, the portal page module 181 asks the processing state by calling the state acquisition method to the SOAP server specified by the above-mentioned service requested URL for the job on request as in Steps S53–S55.

In Step S57 following Step S56, the portal page module 181 generates the portal page in which information collected in Step S51 and information of the state of the printing processing acquired in Step S55 are arranged according to the page information file 195.

In Step S58 following Step S57, the Web server 10 transmits the thus generated portal page to the Web client 20.

In Step S59 following Step S58, the Web browser 21 of the Web client 20 displays the portal page which is thus received to the user.

Figure 17:
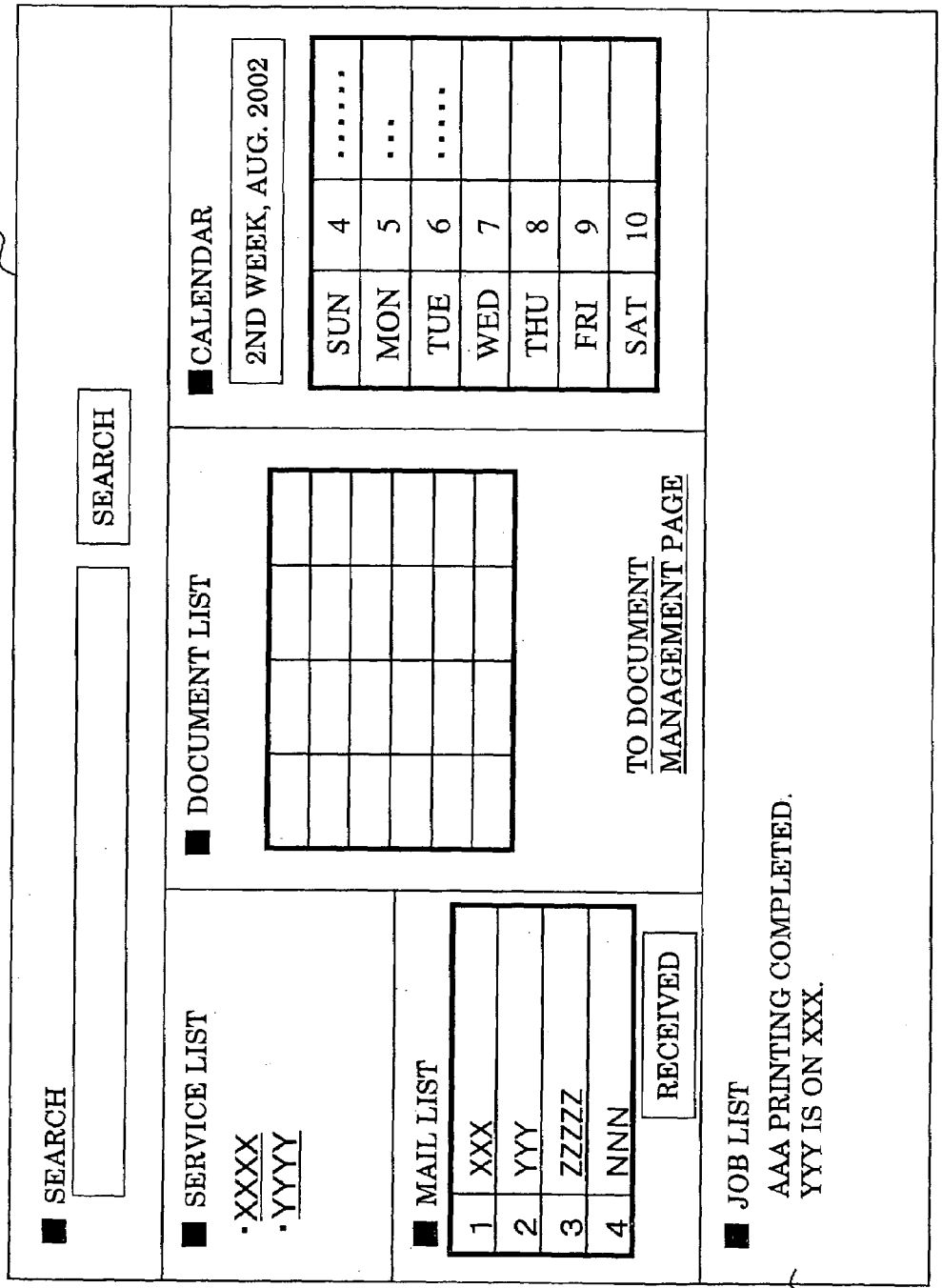
FIG. 17 shows an example of the portal page by which the job list is updated according to the embodiment of the present invention.

FIG. 17 shows the portal page in which the job list is updated. The processing state message showing that the printing processing is completed ("AAA PRINTING COMPLETED."), and the processing state message for other processing ("YYY IS ON XXX.") are displayed on the job list area 206 of the portal page 200 of FIG. 17.

In case the printing processing is not yet completed, namely, when a value other than "Complete" is transmitted as the return value from printer server 30a in Step S55 of FIG. 16, the processing state message such as "on standby" or so indicating the relevant state is displayed there.

Further, it is possible to provide a configuration such as to enable specifying a plurality job IDs as input information (argument information) of the state acquisition method, and collectively inquiring the printer server 30a processing states for printing requests made also from other Web clients at a time, in Step S53 of FIG. 16. In this case, information concerning the processing states inquired collectively is held for the respective jobs on request in the Web server 10. Then, upon receiving a transmitting request for a portal page from the other Web client, the Web server 10 generates the jog list area 206 based on the already held information. Accordingly, it becomes not necessary for the Web server 10 to inquire the printer server 30a a processing state each time each other Web client requests, and, thus, it becomes possible to effectively reduce the communications load between the Web server 10 and printer server 30a.

The job management table 190 may be mounted in a database such as an RDB, a CSV file or so, or may be mounted in XML data. Recently, since various types of software which deals with XML data has spread, in case the job management table 190 is mounted in XML data, a load to develop the page module and so forth needed for dealing therewith can be effectively reduced.

Thus, in the Web server 10 according to the first embodiment of the present invention, in case a request for asynchronous processing such as printing request is made by the Web client 20, and some accessing operation is made by the Web client after that, the Web server 10 returns the Web page to the Web server 20 indicating the state of the asynchronous processing. In other words, the Web server 10 makes a response to the Web client 20 without waiting for the completion of the relevant processing, and, thus, makes a response asynchronously with respect to the completion of the relevant processing. Accordingly, the user of the Web client 20 can easily know the state of the asynchronous processing which the user requested execution beforehand.

The state of the asynchronous processing may be displayed in a message box instead of in the Web page. In this case, not only in a case where an access is made to the portal page 200, but also upon a transmitting a request for any other Web page, the Web server 10 may execute the processing in Steps S53 through S56 in FIG. 16, and, thus, cause the Web client 20 to display the message box indicating the relevant processing state together with transmitting the requested Web page.

Next, an example of improving the operationality of the above-mentioned job list area 206 will be described as a second embodiment of the present invention.

Figure 18:
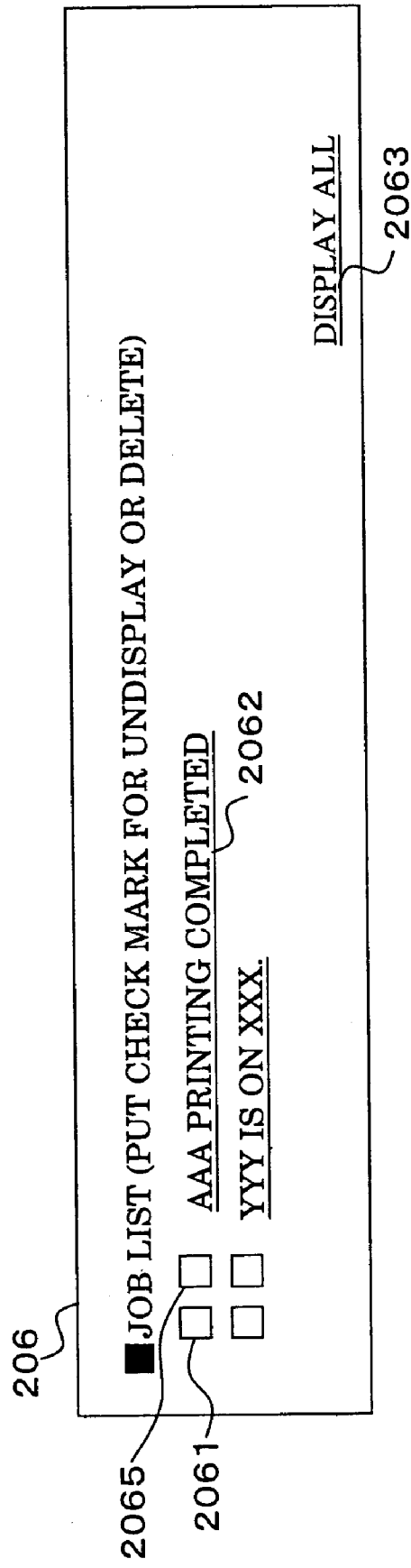
FIG. 18 shows a job list area according to a second embodiment of the present invention.

FIG. 18 shows the job list area in the second embodiment of the present invention. The job list area 206 in FIG. 18 shows only the job list area 206 in the portal pages 200 of FIG. 17. In the second embodiment, the processing state message may be made hidden by putting a check mark in a check button 2061, and also, the relevant record of job on request can be deleted from the job management table by putting a check mark in a check button 2065 in the job list area 206 of FIG. 18. Moreover, a link is provided for each processing state message, and, thus, for example, when the processing state message 2062 is clicked by the user, detailed information of the printing processing of the document data "AAA" can be made to be displayed. Furthermore, all the processing state messages can be made to be displayed by clicking a link description 2063 ("DISPLAY ALL") even after the display is made hidden as mentioned above.

In order to realize these functions provided by the user interface of the job list area 206 shown in FIG. 18, the job management table 190 is modified as shown in FIG. 19.

FIG. 19 shows an example of the job management table in the second embodiment of the present invention. The job management table 191 of FIG. 19 includes an item of "display flag" which indicates whether or not the processing state message is displayed in the job list area 206, and an item of "detailed information" which is a data item storing detailed information of the processing state of the job on request, in addition to the job management table 190 according to the first embodiment described above. There, all the default values of the display flag item may be set as "ON" (to display), or may be set one by one for each user.

In order for the portal page module 181 to generate the Web page in which the job list area 206 shown in FIG. 18 is displayed, in Step S57 of FIG. 16 mentioned above, the display flag for the job on request stored in the job management table 191 is referred to, and the processing state message for each job for which the display flag is set "ON" is arranged in the job list area 206. Further, a link is provided for each processing state message, a check button and so forth are arranged therefor, and thus, the portal page is generated.

Moreover, according to the second embodiment, even when the processing state of job on request agrees with the completion status ("Complete") which is received in Step S55, the record of the job on request is not deleted from the job management table 191 in Step S56 so that detailed information can be displayed when the processing state message 2062 is clicked later. Furthermore, in Step S55, detailed information for the printing processing is also received from the printer server 30a together with the return value of the state acquisition method, and is stored in the above-mentioned item of detailed information in the job management table 191.

Figure 20:
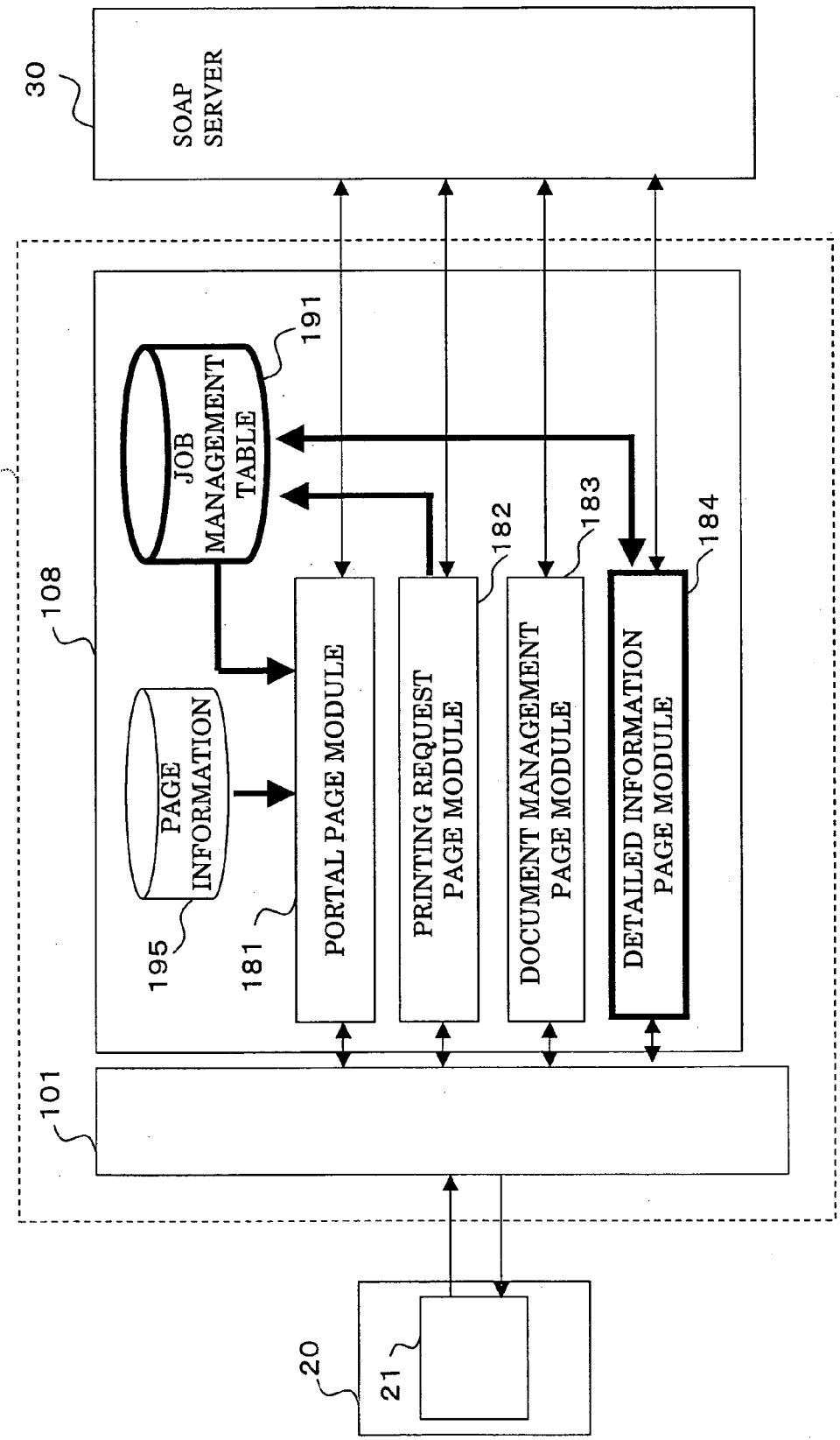
FIG. 20 shows an example of functional configuration of a Web server according to the second embodiment.

Next, an example of functional configuration of the Web server 10 in the second embodiment of the present invention will be described. FIG. 20 shows an example of functional configuration of the Web server in the second embodiment of the present invention. The Web server 10 of FIG. 20 includes a detailed information page module 184 in addition to the Web server 10 of FIG. 4. In FIG. 20, the same reference numeral is given to the same portion as that in FIG. 4, and the duplicate description thereof is omitted.

The detailed information page module 184 is started by the Web server program 101 according to a transmitting request for a Web page (henceforth referred to as a "detailed information page") which shows detailed information of job on request, transmitted from the Web browser 21 when the processing state message 2062 on the job list area 206 is clicked by the user, and it generates the detailed information page for the relevant job on request.

In addition, in the second embodiment of the present invention, a configuration of the Web system including the Web server 10 is the same as that of the Web system 1 of FIG. 1 in the first embodiment. Moreover, since a hardware configuration and a software configuration of the Web server 10 are also the same as those of FIGS. 2 and 3 for the first embodiment, the duplicate descriptions thereof are omitted.

Processing executed at a time of making the processing state message un-displayed, and processing executed at a time of displaying detailed information page, mentioned above, executed by the Web server 10 which has the functional configuration shown in FIG. 20, will be described.

Figure 21:
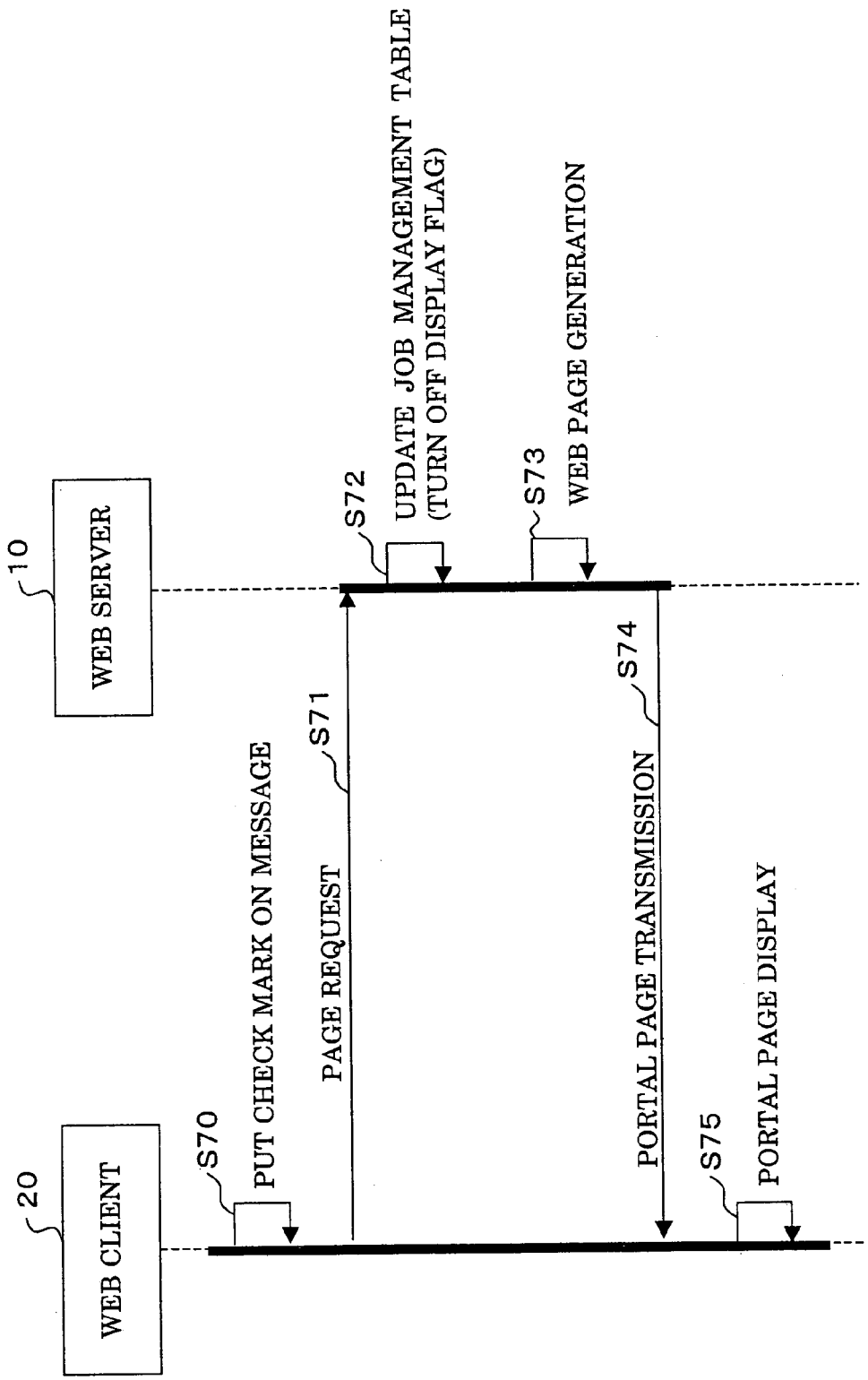
FIG. 21 illustrates processing performed at a time of setting non-display of a processing state message according to the embodiment of the present invention.

FIG. 21 is a sequence diagram illustrating processing executed at a time of making processing state message un-displayed. In Step S70, the user of the Web client 20 puts a check mark in the check button 2061 of the processing state message 2062 of the job list area 206.

Figure 22:
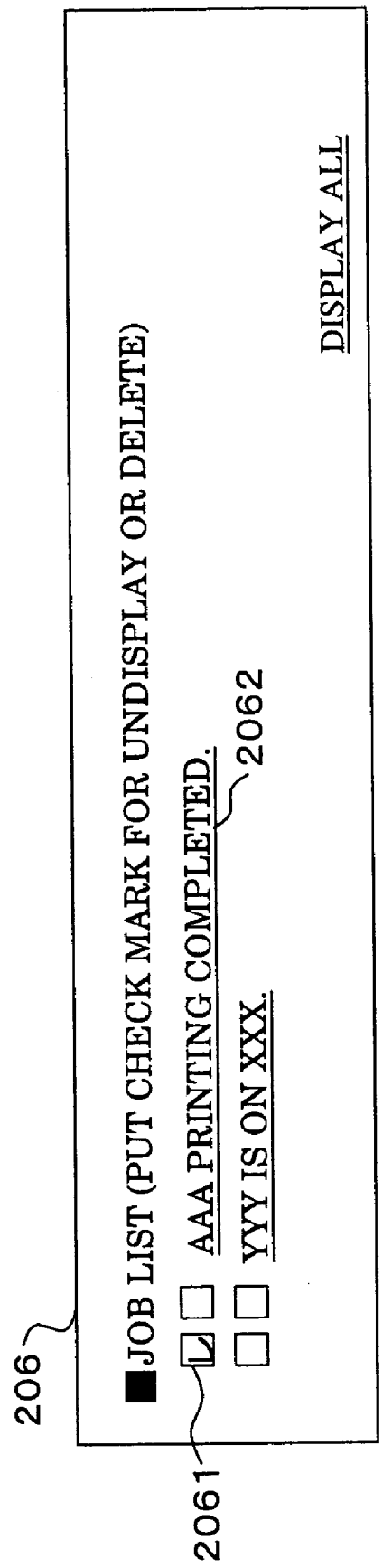
FIG. 22 shows a job list area occurring at a time of checking a check button of a processing state message according to the embodiment of the present invention.

FIG. 22 shows the job list area at a time of the check mark being thus put in the check button of the processing state message. In FIG. 22, the state where the check mark is put in the check button 2061 of the processing state message 2062 ("AAA PRINTING COMPLETED.") is shown.

In Step S71 following Step S70, the Web browser 21 transmits a transmitting request for a portal page to the Web server 10 according to an input from the user. The Web browser 21 also transmits information indicating that the check mark is thus put in the check button 2061. There, the above-mentioned input from the user may occur in a situation that, for example, the portal page 200 currently displayed is updated; the update button 207 of FIG. 10 is clicked for updating the mail list on the portal page, or so. Then, when also a check mark is put in the check button 2065 (FIG. 18), information indicating that the check mark is put in the check button 2065 is also transmitted in Step S71.

In Step S72 following Step S71, the portal page module 181 of the Web server 10 sets the display flag for the relevant job on request into "OFF" (un-displaying) in the job management table 191 according to the check mark being put in the check button 2061 in the job list area 206. In addition, as the check mark is also put in the check button 2065 as mentioned above, in Step S72, the record for the relevant job on request is deleted.

In Step S73 following Step S72, the portal page module 181 determines that the processing state message is to be displayed in the job list area 206 for the job on request for which the display flag is set "ON" in the job management table 191, and, then, generates the portal page. The same processing as that in Steps S51 through S56 of FIG. 16 is performed before Step S73, and the duplicated description is omitted.

In Step S74 following Step S73, the Web server 10 transmits the portal page thus generated to the Web client 20.

In Step S75 following Step S74, the Web browser 21 of the Web client 20 displays the portal page which is thus received.

FIG. 23 shows an example of the job list area at the time of the processing state message being made un-displayed as mentioned above. In the job list area 206 of FIG. 23, the processing state message 2062 for which the check mark is put in the job list area 2061 of FIG. 22 is made hidden.

In addition, in order to again display the once-hidden processing state message 2062, the user should click the link description 2063 of FIG. 23. A processing sequence in this case is the same as that of Steps S71 through S75 of FIG. 21 except that, in Step S72 of FIG. 21, the display flags of all the jobs on request are made turned "ON" according to the user's clinking in the job management table 191 on the Web client 20.

Next, processing executed at a time of displaying detailed information of job on request in the state in which the processing state message is displayed in the job list area 206 will be described.

Figure 24:
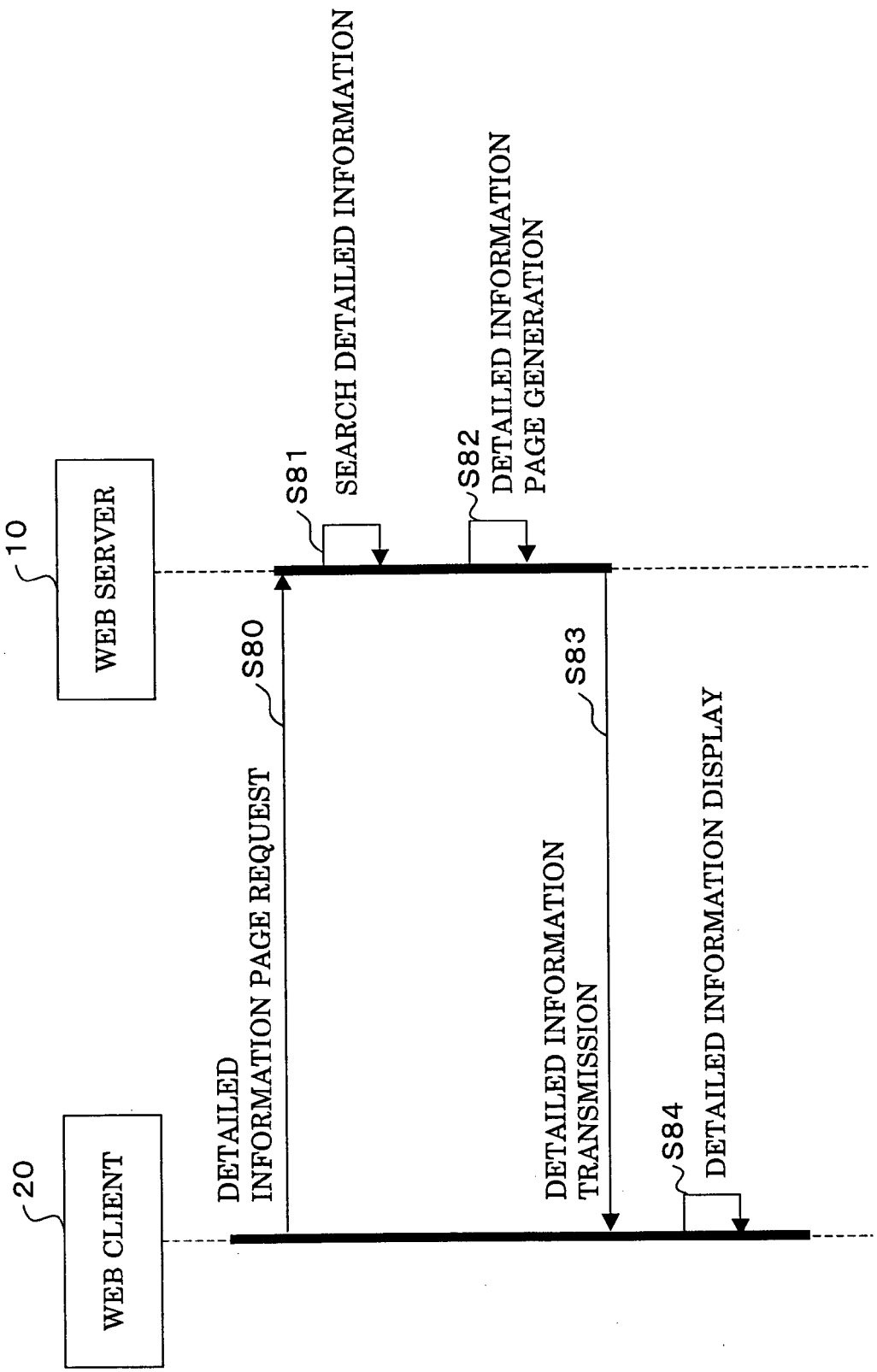
FIG. 24 shows a sequence diagram illustrating processing at a time of displaying detailed information according to the embodiment of the present invention.

FIG. 24 is a sequence diagram illustrating processing executed at the time of displaying the detailed information. It is assumed that the job list area 206 shown in FIG. 18 is already displayed by the Web browser 21 of the Web client 20 in an initial state of FIG. 24. In addition, a link to the detailed information page module 184 of the Web server 10 is provided from the processing state message 2062, and the job ID of the job on request relevant to the processing state message 2062 is set as a link parameter therefor.

When a user of the Web client 20 clicks the processing state message 2062 in Step S80, the Web browser 21 transmits a transmitting request for the detailed information page of the job on request to the Web server 10 with the job ID specified as the link parameter relevant to the processing state message 2062. In Step S81 following Step S80, the detailed information page module 184 of the Web server 10 searches for the detailed information of the job on request from the job management table 191 of FIG. 19 for the job ID specified as the parameter of the transmitting request for the detailed information page.

In Step S82 following Step S81, the detailed information page module 184 generates a detailed information page based on the detailed information thus searched for and obtained from the job management table 191, and transmits it to the Web client 20 (S83). In case a display of the detailed information page is required only once, the record of the job on request may be deleted from the job management table 191 after that, in Step S82.

In Step S84 following Step S83, the Web browser 21 of the Web client 20 which has received the detailed information page displays the detailed information page accordingly.

FIG. 25 shows an example of the detailed information page. In the example of FIG. 25, a printing printer name, a document name, a printing number of sheets, a printing size, etc. are displayed. However, information displayed in the detailed information page is not limited thereto, and various matters may be displayed according to the contents of detailed information received as a return value of the state acquisition method from the SOAP server, or according to a way of mounting of the detailed information page module 184.

Thus, according to the Web server 10 in the second embodiment of the present invention, when a display of the processing state message 2061 is unnecessary, a check mark may be put in the check button 2061 of the job list display area 206, and, thus, it is possible that the processing state message 2062 is made hidden in the display of the portal page 200 by the Web browser 21 after that. Moreover, when the processing state message 2061 is clicked, the detailed information page for the relevant job on request is displayed. Accordingly, the user can check easily the detailed information on the state of asynchronous processing wherever the user wishes.

In the above-described configuration, as an example, a case one unit of asynchronous processing is performed by the SOAP server 30 based on one request from the Web client 20 has been described. However, according to the present invention, it is not necessary that a request from a Web client and asynchronous processing performed by a SOAP server 30 have a one-to-one correspondence. Other than this, the present invention may also be applied to a case where the above-mentioned relationship becomes one-to-many correspondence, for example.

Then, according to a third embodiment of the present invention, a case a Web server 10 requires execution of a plurality of units of asynchronous processing by respective SOAP servers 30 based on one page request made by a Web client 20 will be described.

Figure 26:
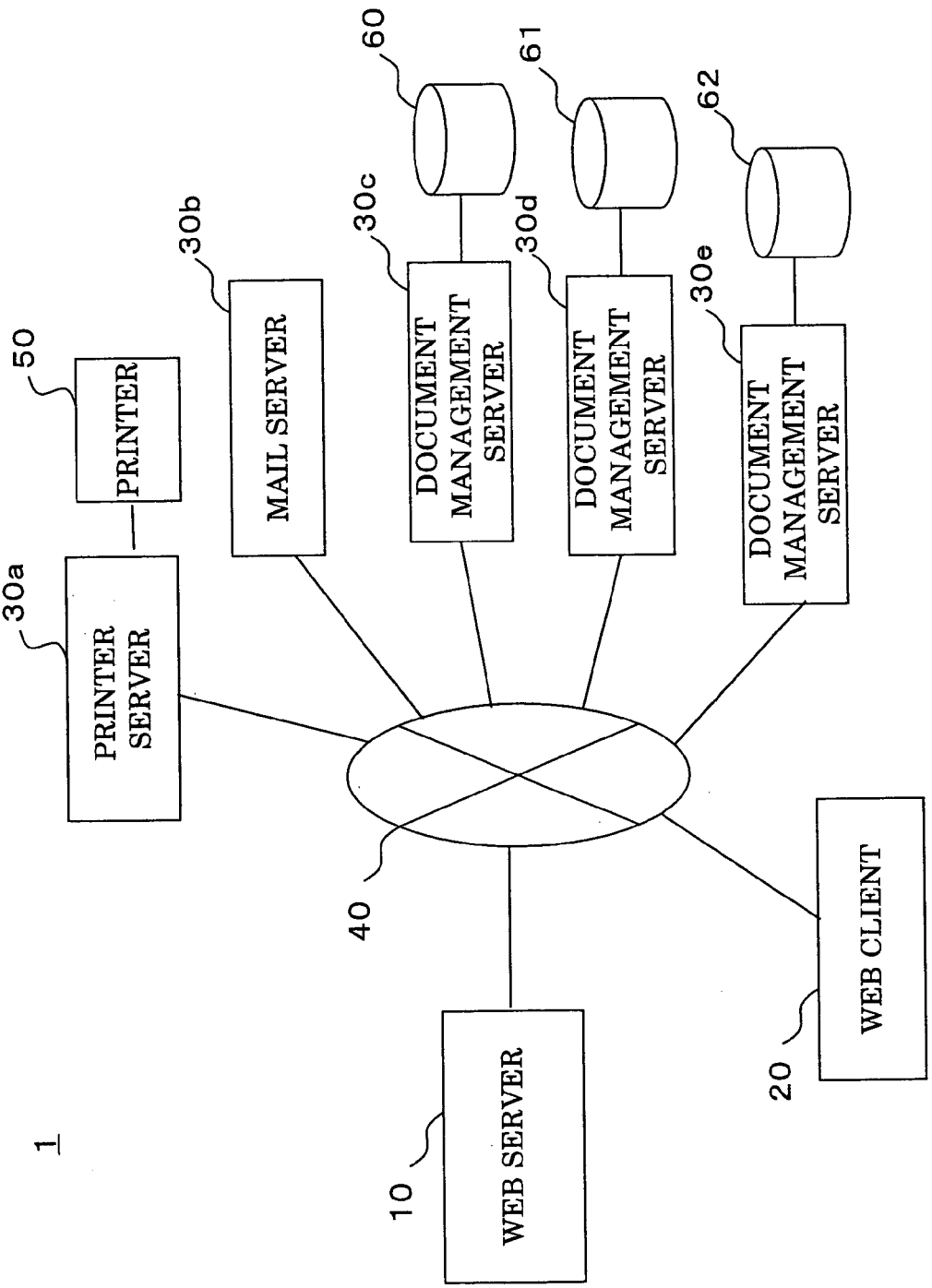
FIG. 26 shows a general configuration of a Web system according to a third embodiment of the present invention.

FIG. 26 shows a general configuration of an example of a Web system according to the third embodiment. As for the Web system 1 of FIG. 26, document management servers 30d and 30e are further connected to the network 40 in addition to the Web system 1 of FIG. 1. The document management servers 30d and 30e are SOAP servers each of which has the same function as that of the above-mentioned document management server 30c, and have document DBs 61 and 62, respectively. In FIG. 26, the same reference numerals are given to the same portions as those in FIG. 1, and the duplicated descriptions are omitted.

Figure 27:
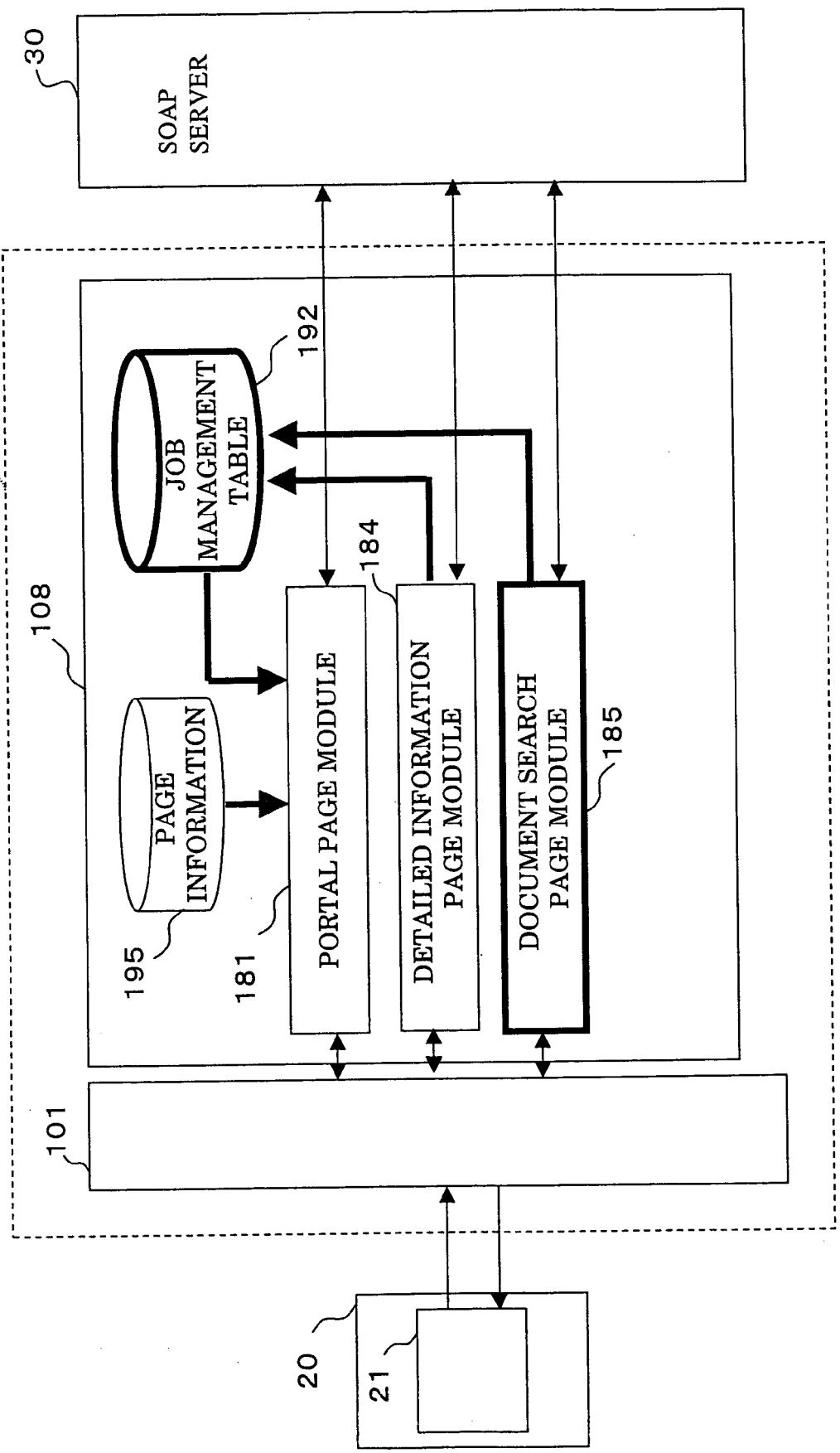
FIG. 27 shows an example of a functional configuration of a Web server according to the third embodiment.

FIG. 27 shows an example of functional configuration of the Web server in the third embodiment. In the Web server 10 of FIG. 27, a document reference page module 184 is added to the example of functional configuration of the Web server 10 in the second embodiment shown in FIG. 4. In FIG. 27, the same reference numerals are given to the same portions as those FIG. 4, and duplicated descriptions thereof are omitted. Moreover, indication of the printing request page module 182 and document management page module 183 are omitted in FIG. 27.

Since hardware configuration and software configuration of the Web server 10 are the same as those of FIGS. 2 and 3 in the first embodiment, respectively, those descriptions are also omitted.

Processing performed by the Web server 10 having the functional configuration shown in FIG. 27 at a time of requesting asynchronous processing to each of the document management servers 30c, 30d, and 30e based on a single request from the Web client 20 will now be described.

Figure 28:
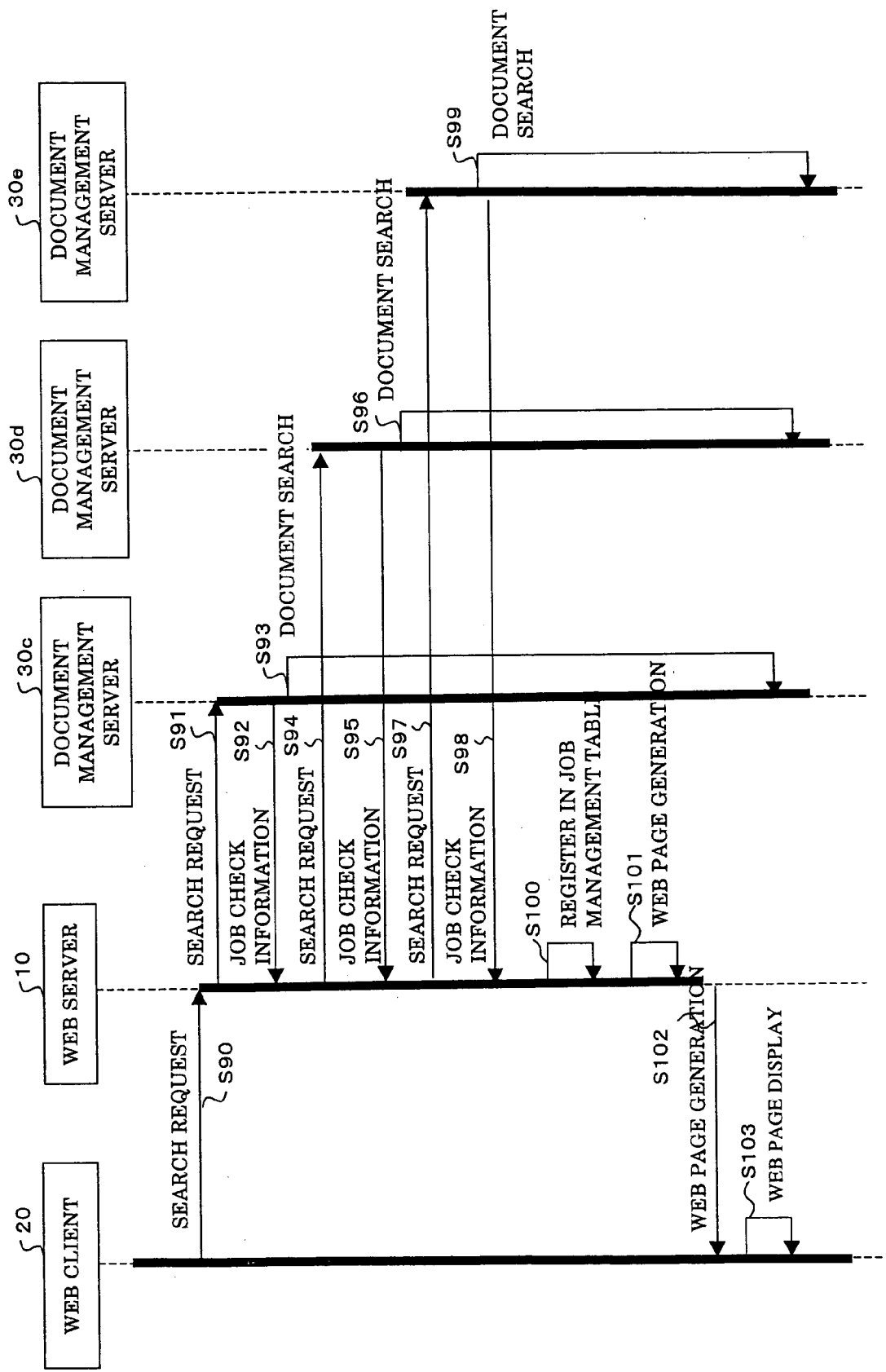
FIG. 28 shows a sequence diagram illustrating processing at a time of searching for document data from a plurality of document management servers according to the embodiment of the present invention.

FIG. 28 shows a sequence diagram illustrating processing executed at a time of searching for document data from plurality document management servers.

Figure 29:
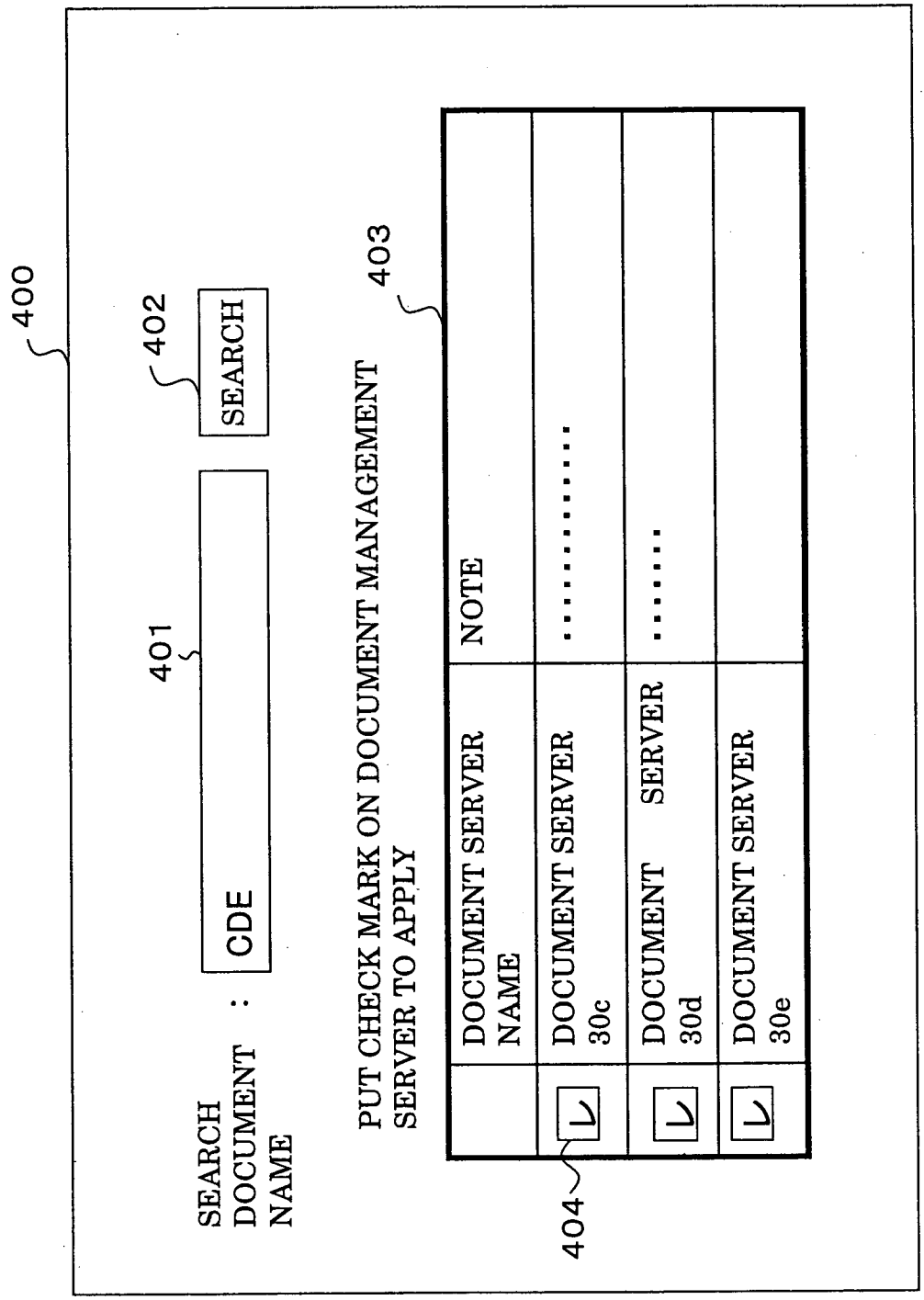
FIG. 29 shows an example of a document search service page according to the embodiment of the present invention.

In Step S90, the Web browser 21 of the Web client 20 transmits a search request for document data to the Web server 10 based on an input from a user in a document search service page 400 shown in FIG. 29.

FIG. 29 shows an example of the document search service page. The document search service page 400 of FIG. 29 is a Web page with which a user can request execution of search for specific document data to plurality document management servers. For example, by clicking a link description 2021 for document management service in the portal page 200 of FIG. 10, the page of FIG. 29 is displayed on the screen of the Web client 20 for a user.

As shown, the document management servers 30c, 30d, and 30e in FIG. 26 are displayed in a document management server list 403 as a list of the document management servers which can be used as a search range. The document management server which a user wishes to use as a search range is selected as the user puts a check mark in a check button 404 therefor. Then, a name of document data for which a search is made is input into a search document name input area 401 by the user, and a search button 401 is clicked. Thereby, the Web browser 21 transmits a search request for the document data to the Web server 10. A case is assumed that the document management servers 30c, 30d, and 30 are specified by the user as search ranges, and document data "CDE" is specified as a target of search.

In Step S91 following Step S90, the document search page module 185 of the Web server 10 transmits a search request for the document data "CDE" to the document management server 30c specified as one in the search ranges.

In Step S92 following Step S91, the document management server 30c transmits job check information to the Web server 10, before performing actual search processing. The job check information is the same as that in the first embodiment shown in FIG. 13, and includes interface information for externally asking the document management server 30c a processing state of processing and so forth.

In Step S93 following Step S92, the document management server 30c starts a search operation for the document data "CDE" requested from the Web server 10. As the document management server 30c thus makes a response to the Web server 10 without waiting for the completion of the actual search (S92), search processing is regarded as asynchronous processing, seen from the Web server 10 and the Web client 20.

In Steps S94 through S99 following Step S93, the same search request for the document data "CDE" is made also to each of the document management servers 30d and 30e, respectively, and, thus, search processing is performed as asynchronous processing by each thereof.

In Step S100 following Step S99, the document reference page module 185 stores the job check information received from the document management servers 30c, 30d, and 30e in a job management table 192 shown in FIG. 30. This operation may be performed each time when job check information is received from each document management server.

FIG. 30 shows an example of the job management table in the third embodiment. The job management table 192 of FIG. 30 includes an item of "request ID" to the job management table 191 in the second embodiment of the present invention shown in FIG. 19. This item is for identifying whether or not the processing requests made to the respective document management servers 30a, 30b, and 30c are based on the same request from the Web client 20.

Namely, the request ID is assigned to each request made by the Web client according to a one-to-one correspondence, while the job ID is assigned to each request for asynchronous processing relevant made to each of a plurality of SOAP servers according to one-to-one correspondence. By assigning the common request ID to the respective jobs on request relevant to asynchronous processing units requested respectively to the plurality SOAP servers based on the same request made from the Web client 20, the Web server 10 can integrate states of the processing units in the plurality SOAP servers performed based on the same request from the Web client 20 to one unit of information, and can show it to the user via the Web client 20 in an integrated manner as will be described later.

In the job management table 192, the common request ID "1" is assigned for the respective jobs requested to the document management servers 30a, 30b, and 30c. However, the different job IDs "001", "002", and "003" are assigned therefor, respectively, and, thereby, the respective jobs on request can be identified.

In Step S101 following Step S100, the document search page module 185 generates a Web page in which a message of "SEARCH FOR DOCUMENT "CDE" ACCEPTED" or so is displayed, and transmits the Web page to the Web client 20 (S102).

In Step S103 following Step S102, the Web browser 21 of the Web client 10 displays the Web page which is thus received.

Figure 31:
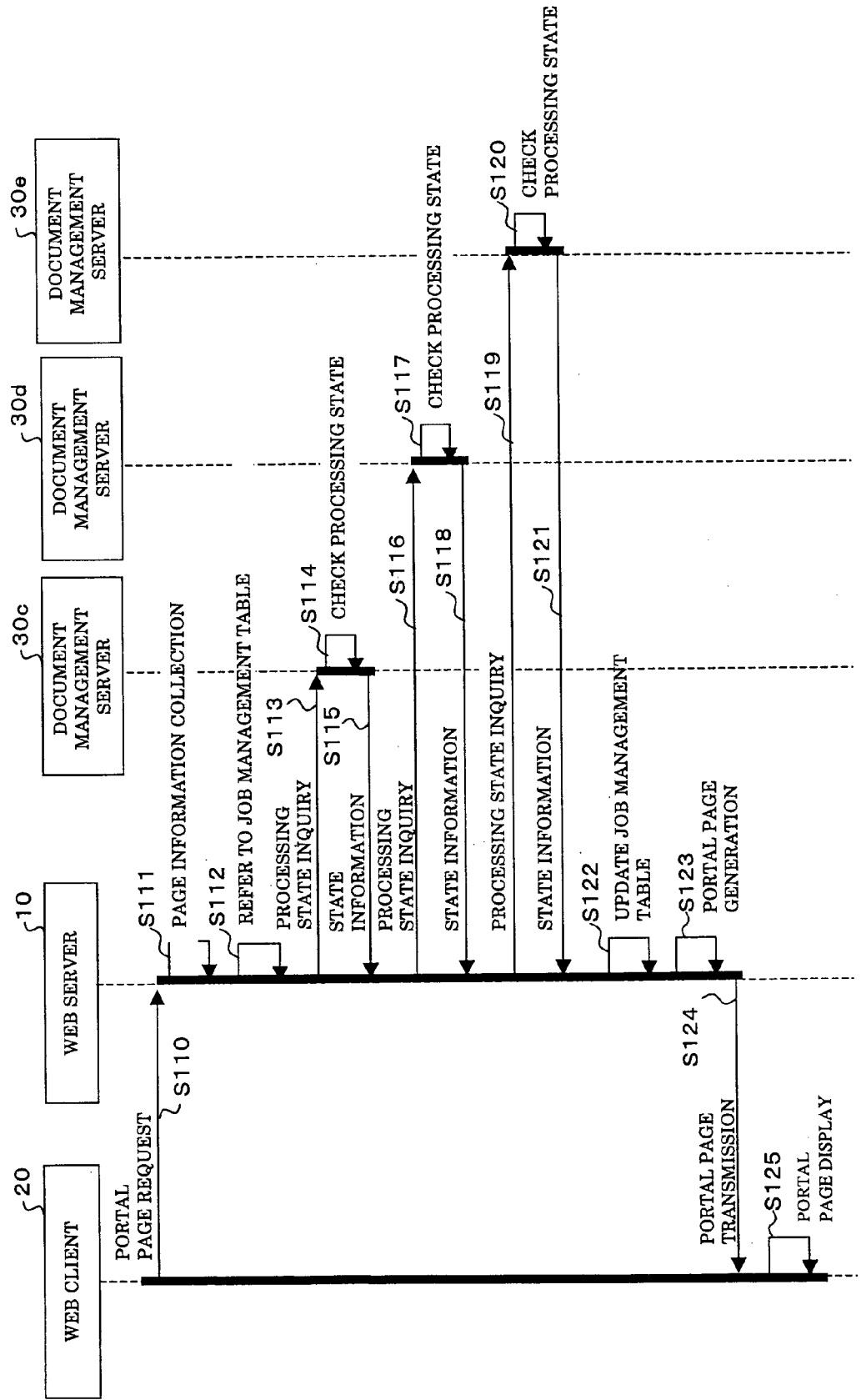
FIG. 31 shows a sequence diagram illustrating inquiry processing for a state of document data search processing according to the embodiment of the present invention.

Next, in the above-described system according to the third embodiment, processing for the user of the Web client 20 to check a state of document data search processing, i.e., processing executed at a time of checking a state of the job on request will be described. FIG. 31 is a sequence diagram illustrating inquiry processing for a state of document data search processing.

In Step S110, the Web browser 21 of the Web client 20 transmits a transmitting request for a portal page to the Web server 10 according to an input from a user. A specific operation corresponding to the input from a user may be one in Step S50 of FIG. 16 in the first embodiment. That is, this may be a case where a portal page 200 is newly displayed from the document management page 210; the Web browser 21 is re-started and thus the portal page is made displayed; the portal page 200 currently displayed is updated; the update button 207 of FIG. 10 is clicked that for updating the mail list on the portal page, or so.

In Step S111 following Step S110, the portal page module 181 of the Web server 10 collects information to be displayed on the portal page in the same procedure as that of Steps S11 through S17 of FIG. 6 in the first embodiment.

In Step S112 following Step S111, the portal page module 181 searches for job on request with reference to the job management table 192, which job has the request user ID same as the user ID specified by the transmitting request for portal page. For example, when the user ID is "ABC", the records on the first through third lines, i.e., the records of document data search processing units to the respective document management servers 30a, 30b, and 30c, are extracted from the job management table 192 of FIG. 30.

In Step S113 following Step S112, the portal page module 181 performs SOAP calling for the state acquisition method (getSearchStatus) with the job ID as an input (argument) thereof to the document management server 30c based on the information of jobs on request thus extracted from the job management table 192, and thus inquires a search state.

In Step S114 following Step S113, the document management server 30c checks and obtains a state of the search processing corresponding to the specified job ID, i.e., search processing for the document data "CDE."

In Step S115 following Step S114, the document management server 30c transmits the thus-obtained state information and detailed information on the search processing as a response to the Web server 10 (S115). The state of search processing is "Complete", when the search processing is completed. Another value is transmitted when it has not been completed yet. However, in case a display function for detailed information described above for the second embodiment of the present invention is not mounted in the third embodiment, the document management server 30c does not need to transmit the detailed information.

In Steps S116 through S121 following Step S115, the same operation of inquiry for the state of search processing for the document data "CDE" is also performed on each of the document management servers 30d and 30e.

In Step S122 following Step S121, the portal page module 181 registers into the job management table 192 the detailed information thus received as the return value of state acquisition method from each document management server. The portal page module 181 recognizes that the search processing has been completed on the document management server having a processing state which agrees with the predetermined completion status "Complete". In the case where the display function for detailed information described for the second embodiment of the present invention is not mounted, and it has recognized that processing is completed, the record of the relevant job may be deleted from the job management table 192 upon recognition of the processing completion.

In Step S123 following Step S122, the portal page module 181 generates the portal page. In this case, as the request ID is common throughout the jobs requested to the document management servers 30c, 30d and 30e, it is determined that these jobs are ones for the same request made from the Web client 10. Then, the portal page module 181 generates a processing state message in such a manner that the processing states of these jobs are displayed in the job list area of the portal page in a manner such that it can be seen that these processing states are included in a unit of information. Namely, the indication is made not showing messages of "Completion", "Under search", or so separately for each of the processing units of the respective document management servers, but showing "Under search for document data CDE (⅓ completion)" or so in case the search of one of these three document management servers is already completed. Further, in case the display function for detailed information described for the second embodiment of the present invention is mounted, the portal page module 181 provides a link to the detailed information display module 184 from the relevant processing state message. Furthermore, when the function of making processing state message un-displayed is mounted, a check button for specifying the un-display function is disposed at a top of each processing state message, and, thus, the portal page is generated.

In Step S124 following Step S123, the Web server 10 transmits the portal page generated to the Web client 20.

In Step S125 following Step S124, the Web browser 21 of the Web client 20 displays the portal page which is thus received.

FIG. 32 shows an example of the job list area where the search processing state is shown. One search processing state message 2063 thus integrated is displayed on the job list area 206 of FIG. 32 as "Under search for document data CDE (⅓ completion)" as a combined processing state message for the search request for the document data executed by the three document management servers. Similar to the case in the above-mentioned second embodiment, a check mark may be put in a check box 2064 so that the relevant message may be made un-displayed, and, also, the processing state message 2063 may be clicked so that detailed information thereof may be displayed.

Thus, according to the Web server 10 according to the third embodiment, execution of asynchronous processing is requested to the plurality SOAP servers in response to one request from the Web client 10. Accordingly, it becomes possible to provide execution of the plurality of asynchronous processing units as one service to the Web client 20. Further, as the job list area is produced in such a manner that information concerning the states of the plurality of jobs on request are integrated into a unit of state information, it becomes possible to provide the states of the plurality of asynchronous processing units in an easily understandable manner to the user of the Web client 20.

Figure 33:
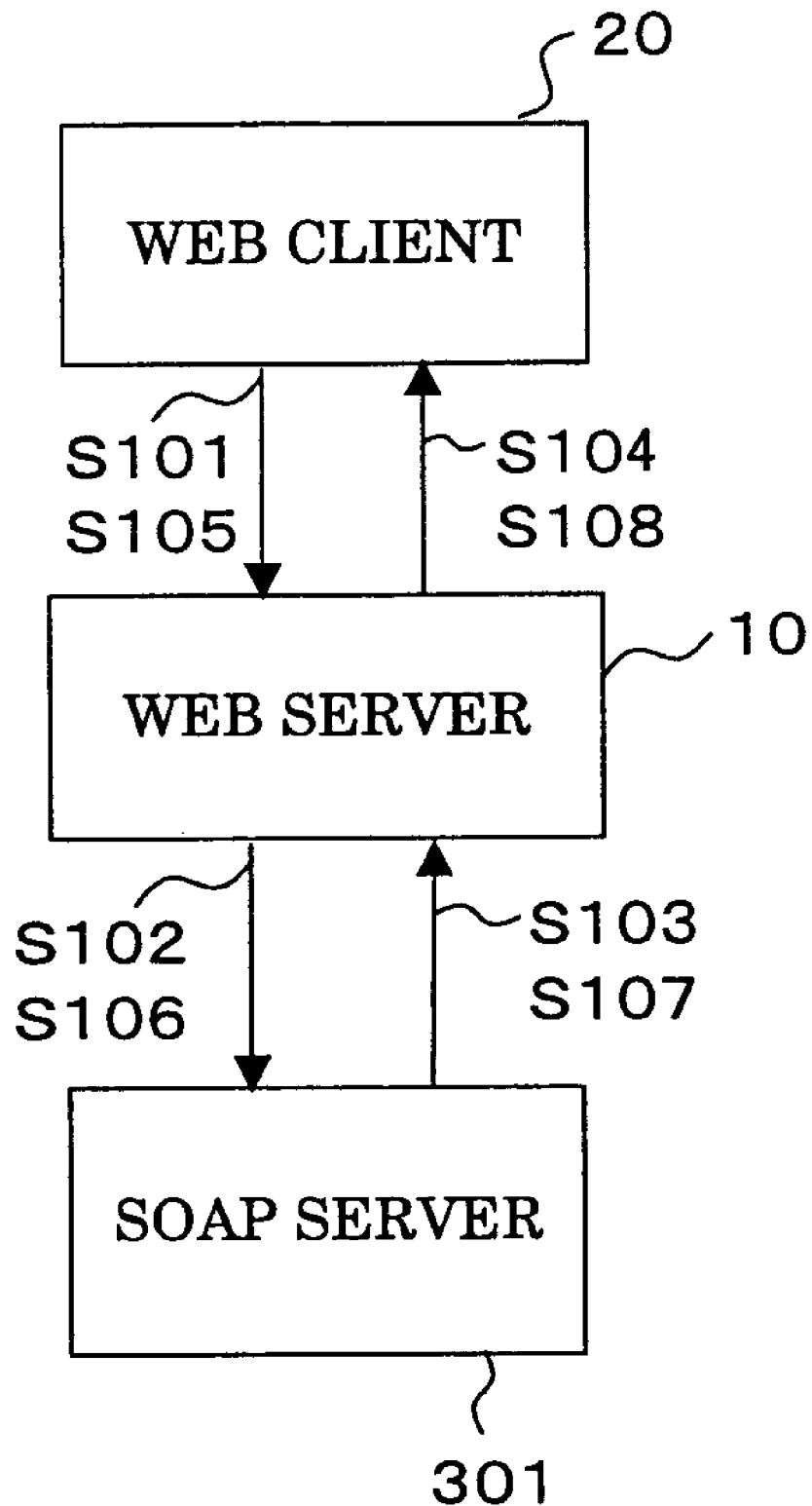
FIG. 33 illustrates a first interaction between the Web server and a SOAP server according to the present invention.

Next, other various embodiments will be described in a viewpoint of interaction between the Web server 10 and SOAP server 30. First, for the purpose of clear comparison from the other examples, an interaction manner in the above-mentioned embodiments will be described as a first interaction manner. FIG. 33 shows one example of the first interaction manner between the Web server and SOAP server.

In FIG. 33, when the Web server 10 receives a request for asynchronous processing from the Web client 20 (S101), the Web server 10 requires execution of the asynchronous processing to the SOAP server 301 relevant to this request (S102). The SOAP server 301 transmits job check information 31 to the Web server, without waiting for the completion of the requested processing (S103). The Web server 10 registers the job check information 31 thus received in the job management table 190, and transmits a response (HTML) to the Web client 20 (S104).

The Web server 10 then asks a processing state on the job on request to the SOAP server 301 according to the job check information 31 thus registered in the job management table 190 (S106), if a transmitting request for a Web page displaying a processing state is received from the Web client 20 (S105). The SOAP server 301 transmits the processing state of the specified job to the Web server 10 (S107). The Web server 10 then transmits the Web page including the information on the processing state to the Web client 20 (S108).

Figure 34:
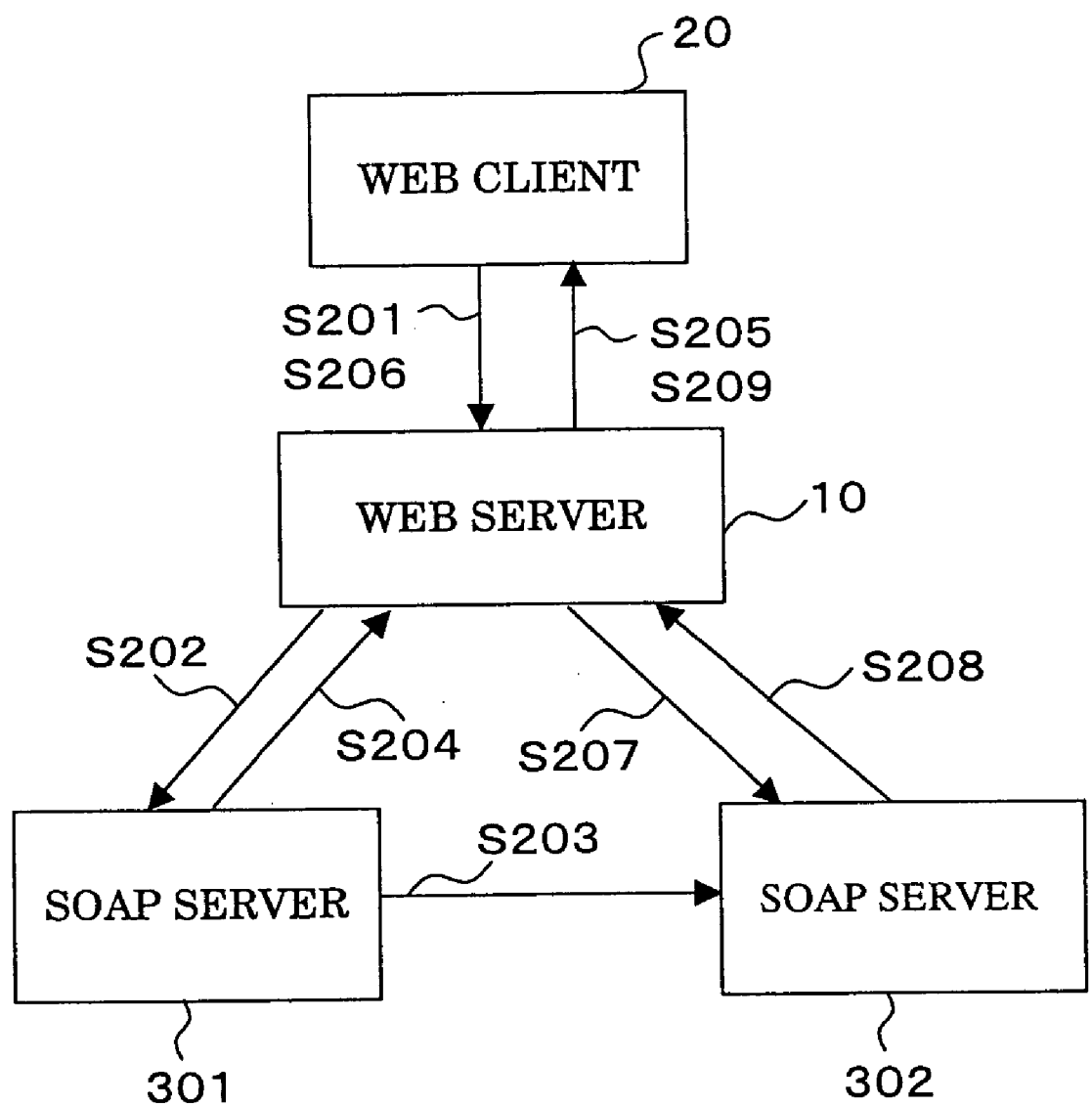
FIG. 34 illustrates a second interaction between the Web server and SOAP server according to the present invention.

Next, another manner of interaction between the Web server and SOAP server will be described in case where the SOAP server to which a request is made is different from the SOAP server to which an inquiry for processing state relevant to the request is made. FIG. 34 illustrates one example of this second manner of interaction. In FIG. 34, the reference numerals are given to the same portions in FIG. 33, and duplicated descriptions are omitted.

In FIG. 34, when the Web server 10 receives a request for asynchronous processing from the Web client 20 (S201), the Web server 10 then requires an execution of the asynchronous processing to the relevant SOAP server 301 (S202). The SOAP server 301 then requests taking over of the requested processing to the other SOAP server 302 (S203), and transmits job check information to the Web server 10 (S204). However, the requested processing is thus taken over to the other SOAP server 302, and, thus the SOAP server 301 cannot know a processing state thereof directly. Accordingly, the SOAP server 301 transmits to the Web server 10 the job check information including an URL of the SOAP server 302, wherewith the processing state can be inquired.

Figure 35:
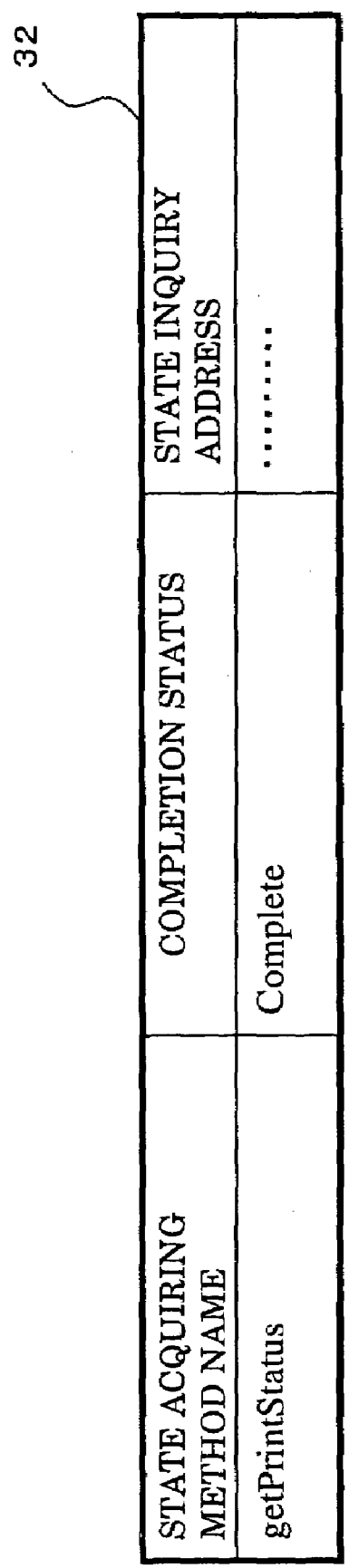
FIG. 35 illustrates jog check information in the second interaction.

FIG. 35 shows an example of the job check information applicable to the above-mentioned second manner of interaction. The job check information 32 of FIG. 35 includes a "state inquiry address" where an URL with which the processing state is to be inquired later on is stored in addition to the job check information 31 of FIG. 13.

The Web server 10 registers the job check information 32 thus received in the job management table 190, and transmits a Web page to the Web client 20 (S205). In this case, the Web server 10 registers, as a "service requested URL" of the job management table 190, not the URL of the SOAP server 301 but the URL of the SOAP server 302 URL stored in the "state inquiry address" of the job check information 31.

The Web server 10 then asks a processing state of the job on request to the SOAP server 302 according to the "service requested URL" registered in the job management table 190 as mentioned above (S207), when receiving a transmitting request for a Web page displaying processing state from the Web client 20 (S206). The SOAP server 302 then transmits the processing state of the specified job to the Web server 10 in response (S208). The Web server 10 transmits the Web page including the thus-obtained information on the processing state to the Web client 20 (S209).

Thus, according to the second manner of interaction, the Web server 10 can determine the address with which a state of job on request is inquired, based on the indication of the state inquiry address in the job check information 32 sent from the SOAP server 301. Accordingly, even in a case where asynchronous processing is taken over to a SOAP server (302) which is different from a SOAP server (301) to which the relevant request is originally made, the Web server can properly inquire the processing state thereof to the SOAP server which has finally taken over the job.

Figure 36:
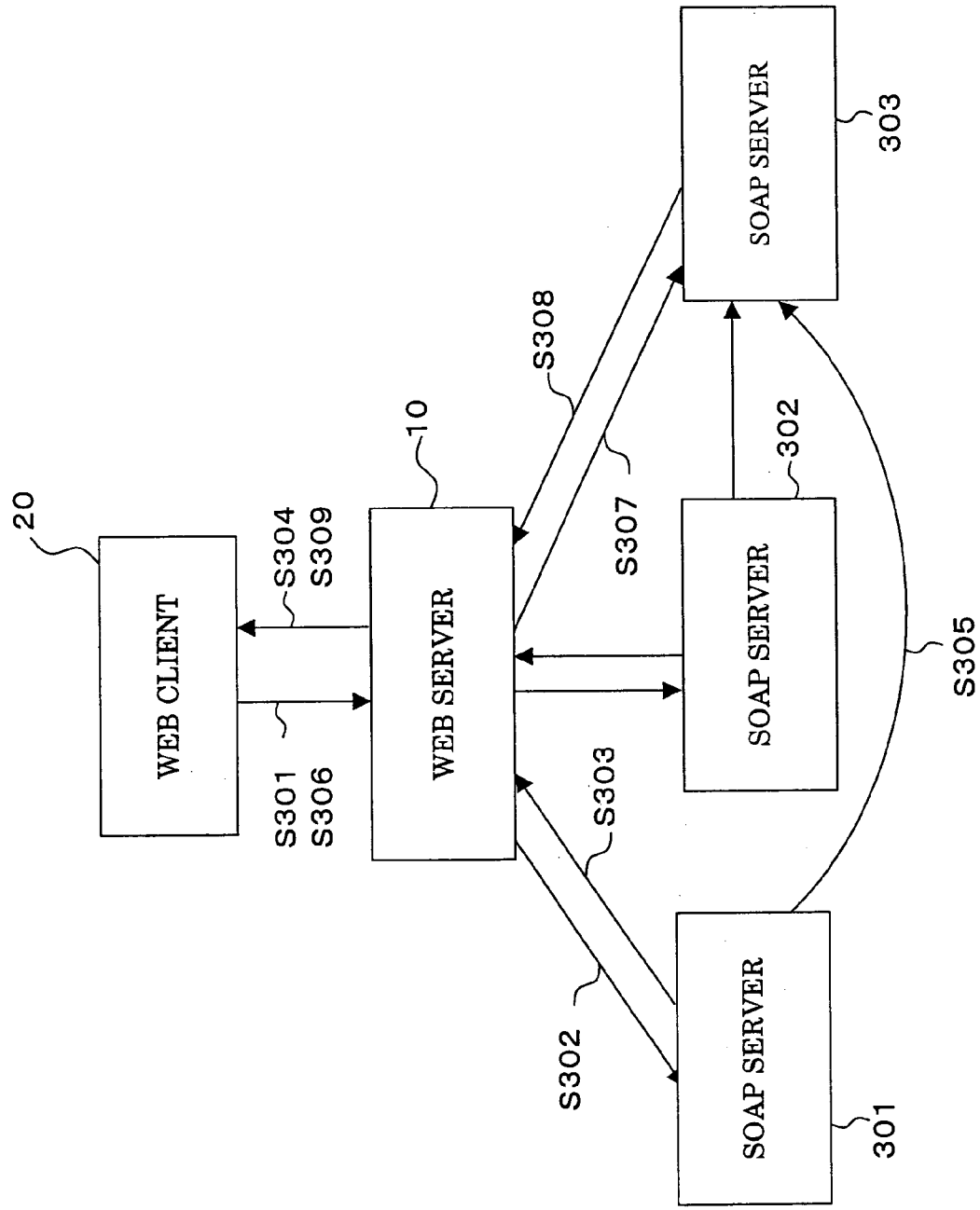
FIG. 36 illustrates a third interaction between the Web server and SOAP server according to the present invention.

Next, a third manner of interaction will be described. The third manner of interaction between the Web server and SOAP server assumes that information of processing states of SOP servers is collected by a single specific single SOAP server (303). FIG. 36 illustrates the third manner of interaction between the Web server and SOAP server. In FIG. 36, same reference numerals are given to the same portions as those of FIG. 33, and duplicated descriptions are omitted.

In FIG. 36, when the Web server 10 receives a request for asynchronous processing from the Web client 20 (S301), the Web server 20 requires execution of the asynchronous processing to the relevant SOAP server 301 (S302). The SOAP server 301 transmits job check information 31 of FIG. 13 to the Web server, without waiting for the completion of the requested processing (S303). The Web server 10 registers the job check information 31 thus received in the job management table 190, and transmits a Web page to the Web client 20 (S304).

In the meantime, when the requested processing is completed, the SOAP server 301 notifies the SOAP server 303 of this matter with the relevant job ID, (S305).

The Web server 10 asks a processing state of the job on request to the SOAP server 303 according to the job check information 3131 registered in the job management table 190 (S307), upon receiving a transmitting request for a Web page displaying a processing state, from the Web client 20 (S306). Thus, according to the third manner of interaction, each of the SOAP servers 301 and 302 transmits a its own state of processing for a job requested thereto to the SOAP server 303 as a fixed manner, the Web server 10 can obtain the state of processing of any SOAP server from the fixed SOAP server 303. Thereby, it is possible to statically fix an address with which a state of processing is inquired by the Web server 10.

The SOAP server 303 transmits a processing state of a job on request notified by the SOAP server 301 to the Web server 10 (S308). The Web server 10 transmits a Web page including the information on the processing state thus received, to the Web client 20 (S309).

As mentioned above, according to the third manner of interaction, the address with which inquiry for a processing state is made is fixed to the SOAP server 303. In other words, the Web server 10 does not need to inquire a processing state to any of the other Web servers 301 and 302. Accordingly, it is possible to effectively reduce the communications load between the Web server 10 and SOAP servers 301 and 302. Thereby, it is possible to easily improve the response performance in inquiry for processing state.

Figure 37:
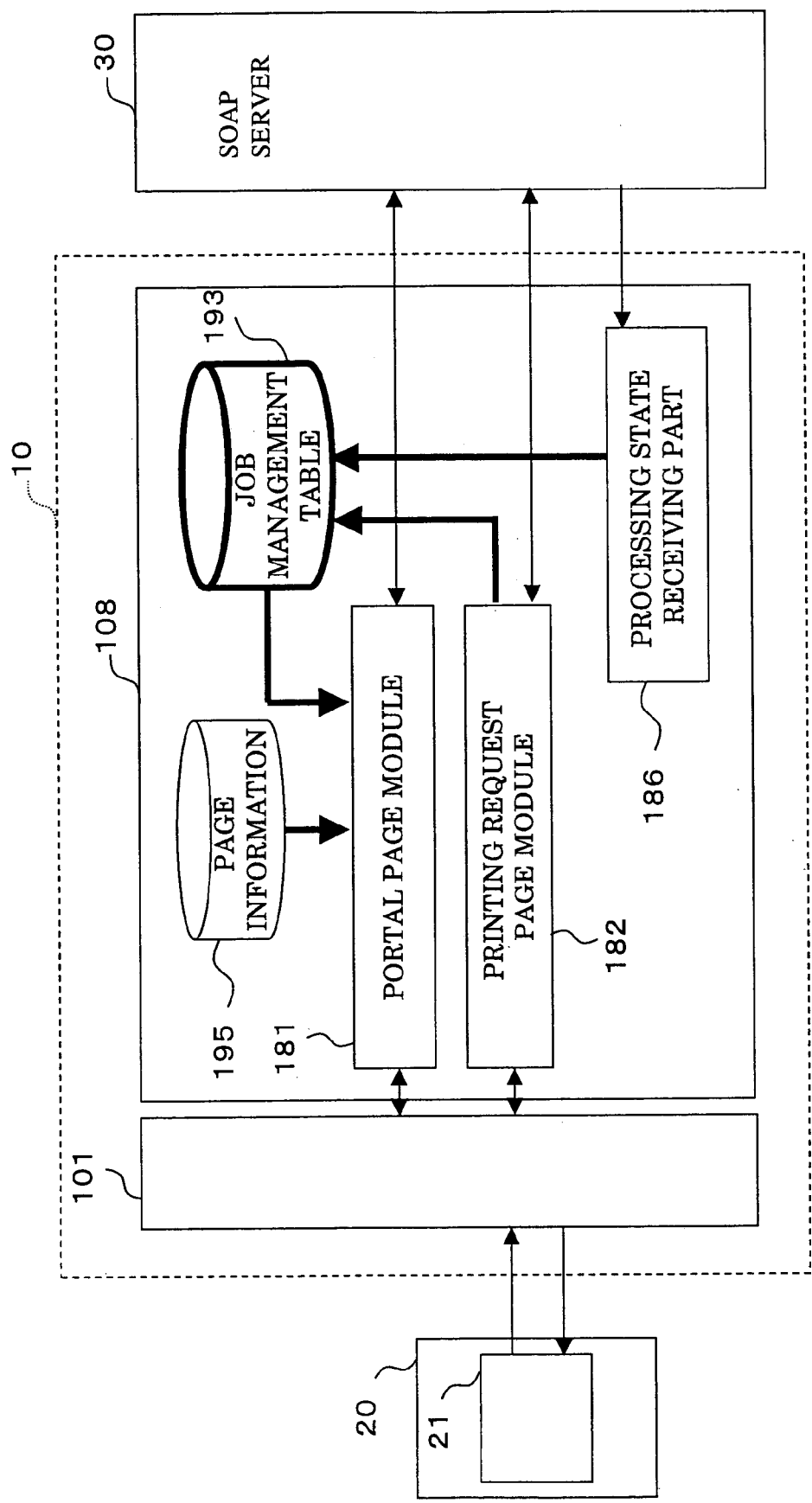
FIG. 37 shows an example of functional configuration of the Web server in a fourth interaction according to the present invention.

Next, a fourth manner of interaction between the Web server and SOAP server will be described. The fourth manner of interaction assumes that a processing state is notified according to a 'push' manner. FIG. 37 illustrates the fourth manner of interaction according to the present invention.

As for the Web server 10 of FIG. 37, a processing state receiving part 186 is provide in addition to the Web server 10 of FIG. 4. In FIG. 37, same reference numerals are given to same portions in FIG. 4, and duplicated descriptions are omitted.

The processing state receiving part 186 receives a processing state from the SOAP server 301, and normally enters a reception waiting state. In this embodiment, the processing state receiving part 186 is mounted as a SOAP server, and has a method (putStatus) for processing state reception.

Figure 38:
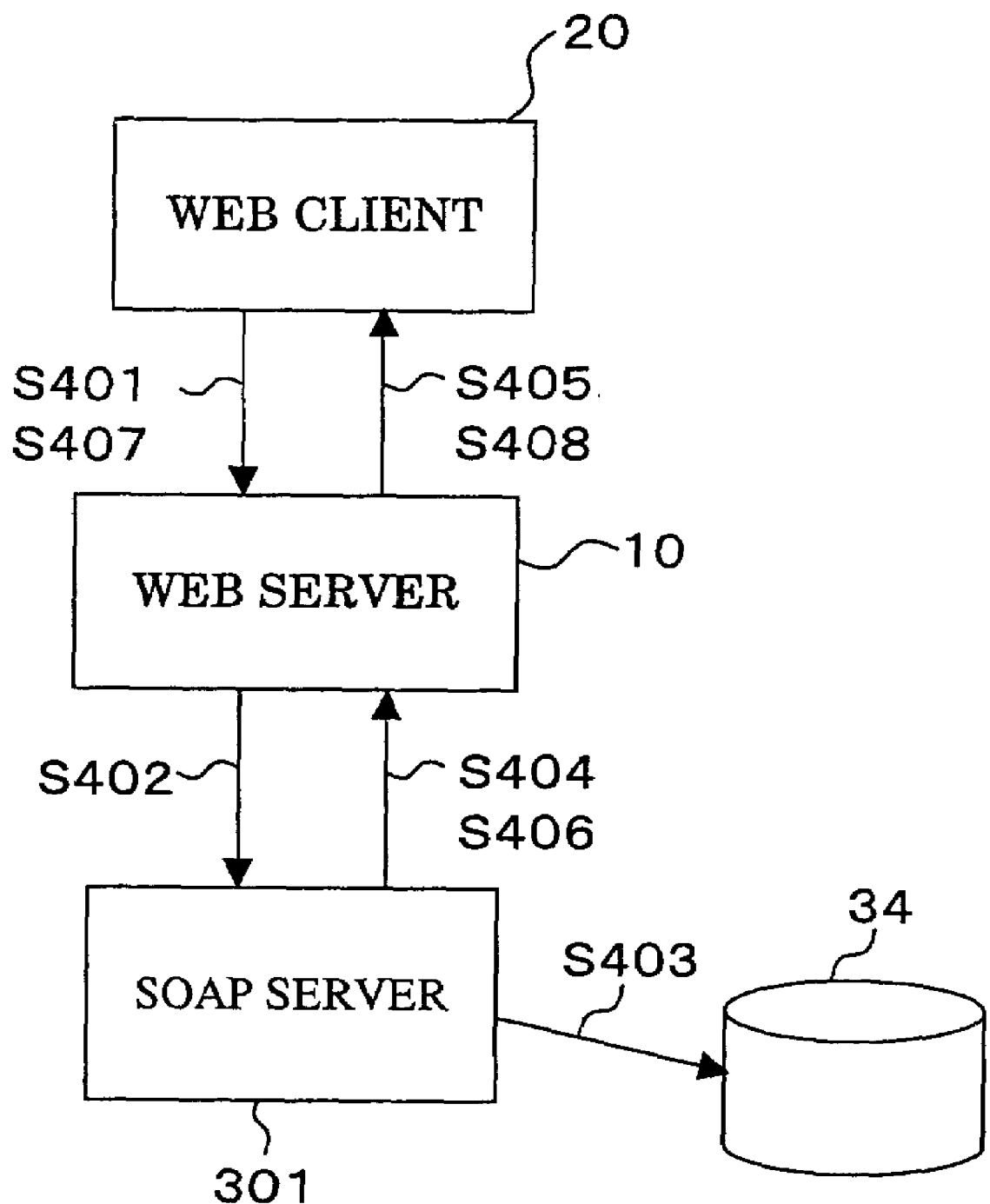
FIG. 38 illustrates the fourth interaction between the Web server and SOAP server.

FIG. 38 illustrates one example of the above-mentioned fourth manner of interaction. In FIG. 38, the same reference numerals are given to the same portions of FIG. 33, and duplicated descriptions are omitted.

In FIG. 38, when the Web server 10 receives a request for asynchronous processing from the Web client 20 (S401), the Web server 10 requires execution of the asynchronous processing to a relevant SOAP server 301 (S402). The Web server 10 also transmits interface information for a notice of a processing state with the above-mentioned execution request for processing, in order to later on have a processing state notified from the SOAP server 301.

The SOAP server 301 which has thus received the processing request registers the interface information for the notice of a processing state thus received from Web server 10 in a processing state notice information management table 34 shown in FIG. 39 wherewith a processing state can be notified to the Web server 10 later (S403).

FIG. 39 shows an example of the processing state notice information management table. The processing state notice information management table 34 includes three data items, i.e., "job ID" identifying requested processing, "state notification URL" storing an URL of a node which originally requested the job and should receive the processing state notice later one, and "state notification method" which is interface information which the Web server 10 has for the purpose of notifying the processing state to the Web server 10 externally, as shown. As these data items, i.e., "job ID", "state notification URL" and "state notification method", relevant interface information which is transmitted from the Web server 10 together with a relevant processing request is registered.

Furthermore, the SOAP server 301 transmits job check information 33 in a form shown in FIG. 40, without waiting for the completion of the requested processing, to the Web server 10 (S404).

FIG. 40 illustrates an example of the job check information applicable to the above-mentioned fourth manner of interaction. The data item "state acquisition method" is removed from the job check information 31 of FIG. 13, as shown, and the job check information 34 of FIG. 40 has a data item of "completion status". The item "state acquisition method" is unnecessary in this case, as will be described, since it is not necessary for the Web server 10 to inquire the SOAP server 301, according to the fourth manner of interaction.

The Web server 10 which has thus received the job check information 34 registers the received information in the job management table 193 shown in FIG. 41, and transmits a Web page to the Web client 20 (S405).

FIG. 41 illustrates an example of the job management table according to the fourth manner of interaction. The data items of "the service requested URL" and "state acquisition method" are removed from the job management table 190 of FIG. 15, and, in the job management table 193 in this case, a data item of "state information" in which information of processing state of a relevant job is stored is added. In Step S405, "job ID", "request user ID", and "completion status" are registered. The data item "completion status" registered in this case is one transmitted as the job check information 34 from the SOAP server 301.

According to the fourth manner of interaction, the SOAP server 301 actively transmits its own processing state of the processing specified with the job ID to the Web server 10, when the state of processing requested changes (S406). This is the reason that this manner of notification is referred to as a 'push' manner. The meaning of "actively" is that, not being externally triggered by a request from the Web server 10, but the SOAP server 301 by itself detects a change of its own processing state, and notifies it to the Web server 10.

The processing state receiving part 186 of the Web server 10 receives the processing state transmitted by the SOAP server, and registers the state as the item of "state information" of the job management table 193.

When receiving a transmitting request for a Web page displaying a processing state from the Web client 20 (S407), the Web server 10 generates a Web page including a state of the requested processing based on the "state information" of the job management table 195, and transmits it to the Web client 20 (S408).

In order to achieve the above described fourth manner of interaction, the SOAP server 301 makes SOAP calling to the Web server 10 in Step S405, and therefor, the Web server 10 should have software which is needed to act as a SOAP server installed therein. Furthermore, the SOAP server 301 should have software which is needed to act as a SOAP client installed therein.

As described above, according to the fourth manner of interaction, communications are made from the SOAP server 301 to the Web server 10 only when the state of asynchronous processing changes. Accordingly, it is possible to effectively reduce the communications load between the Web server 10 and SOAP server 301.

In recent years, there is provided a so-called incorporate apparatus which is specialized for a special function and also has an information processing function similar to that of a general computer. For example, an image-processing apparatus such as a so-called fusion machine or a so-called composite machine which has a plurality of applications for performing processing which is unique to a composite service such as a printing service, a copying service, a facsimile service or so, corresponds to such an incorporate apparatus. A recent image-processing apparatus has a function as a Web server, and, also, has a document management function of storing copied information or information received via facsimile, as document data.

Accordingly, it is possible to apply the present invention to a Web system which applies such an image-processing apparatus.

Figure 42:
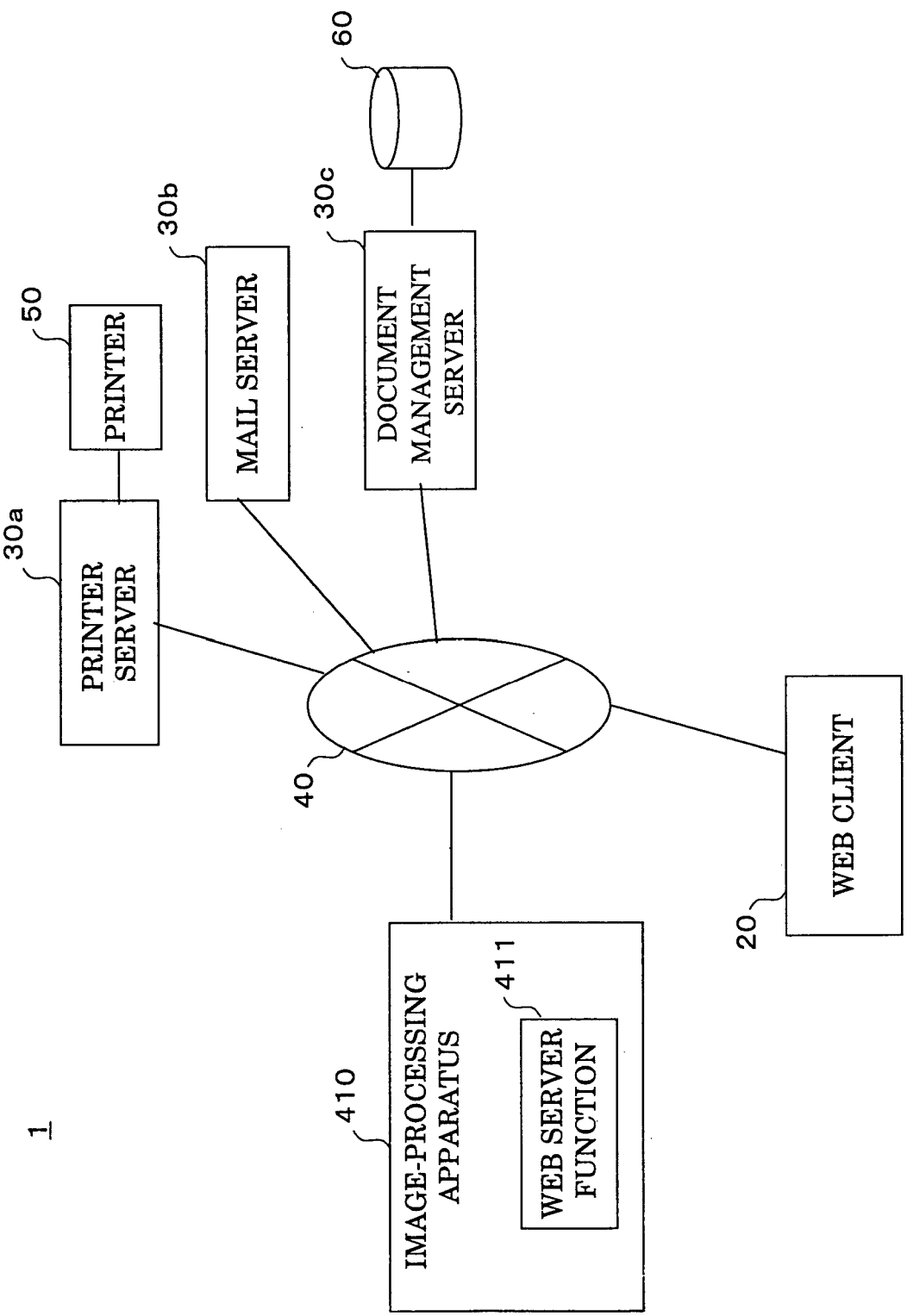
FIG. 42 shows an example of a general configuration of a Web system in which an image-processing apparatus is applied as a Web server according to the present invention.

For example, FIG. 42 shows an example of configuration of a Web system which applies an image-processing apparatus as a Web server. In FIG. 42, the same reference numerals are given to the same portions of FIG. 1, and duplicated descriptions are omitted. When FIG. 42 is compared with FIG. 1, the image-processing apparatus 410 in FIG. 42 acts as the Web server 10 of FIG. 1, in the Web system 1 of FIG. 42.

In the image-processing apparatus 410, a function (Web server function) mounted in the above-mentioned Web server 10, i.e., the Web server program 101, various types of page modules and so forth are incorporated. Accordingly, the image-processing apparatus 410 functions as the Web server 10.

Figure 43:
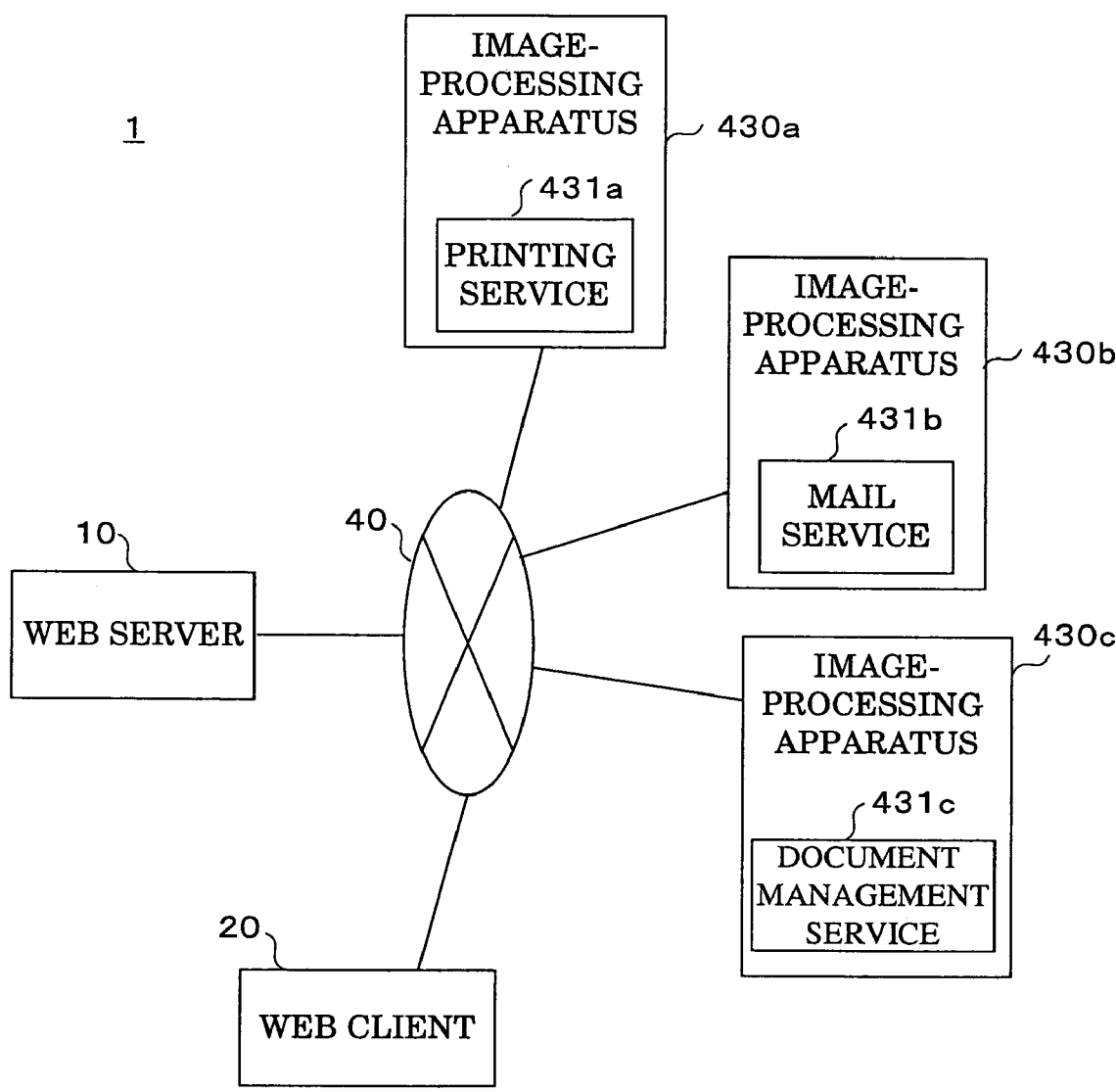
FIG. 43 shows an example of a general configuration of a Web system in which an image-processing apparatus is applied as each SOAP server according to the present invention.

FIG. 43 shows another example of a configuration of a Web system in which an image-processing apparatus is used as each SOAP server such as that mentioned above. In FIG. 43, the same reference numerals are given to the same portions, and duplicated descriptions are omitted. When FIG. 43 is compared with FIG. 1, an image-processing apparatus 430a, an image-processing apparatus 430b, and an image-processing apparatus 430c are provided in the Web system 1 of FIG. 43 instead of the above-mentioned printer server 30a, mail server 30b, and document management server 30c.

A printing service 431a, a mail service 431b, and a document management service 431c are included in these image-processing apparatus 430a, 430b, and 430c, respectively, and thus have the functions same as those mounted in the above-mentioned printer server 30a, mail server 30b, and document management server 30c, respectively, Therefore, the image-processing apparatus 430a functions as the printer server 30a; the image-processing apparatus 430b functions as the mail server 30b; and the image-processing apparatus 430c functions as the document management server 30c.

Figure 44:
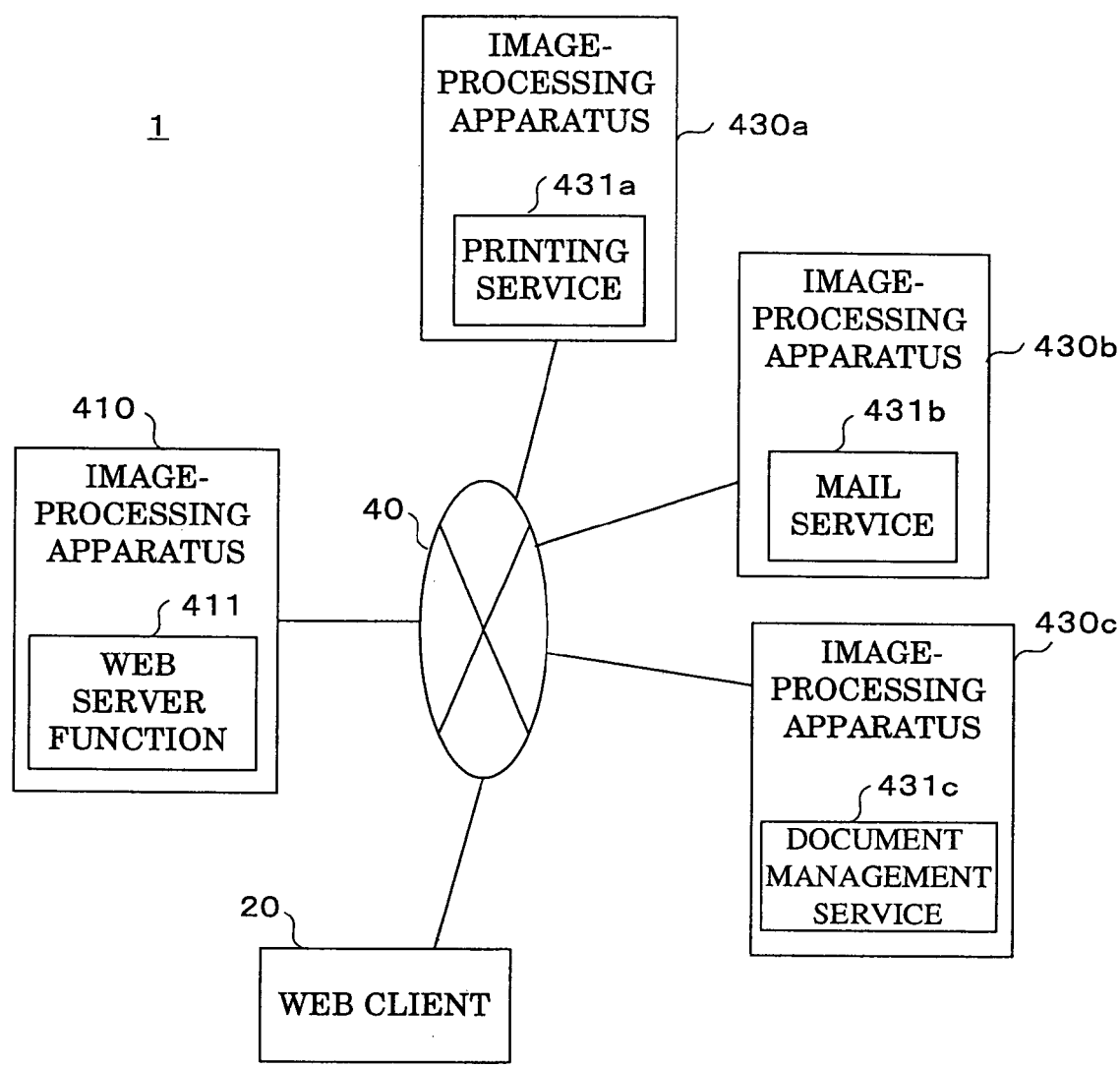
FIG. 44 shows an example of a general configuration of a Web system in which image-processing apparatuses are applied as a Web server and each SOAP server according to the present invention.

FIG. 44 shows another example of a configuration of a Web system in which respective image-processing apparatuses act as the above-mentioned Web server and each SOAP server. In FIG. 44, the same reference numerals are given to the same portions of FIG. 1, FIG. 42, or FIG. 43, and duplicated descriptions are omitted.

In FIG. 44, image-processing apparatuses 410, 430a, 430b and 430c will function as the above-mentioned Web server 10, printer server 30a, mail server 30b, and document management server 30c, respectively.

Figure 45:
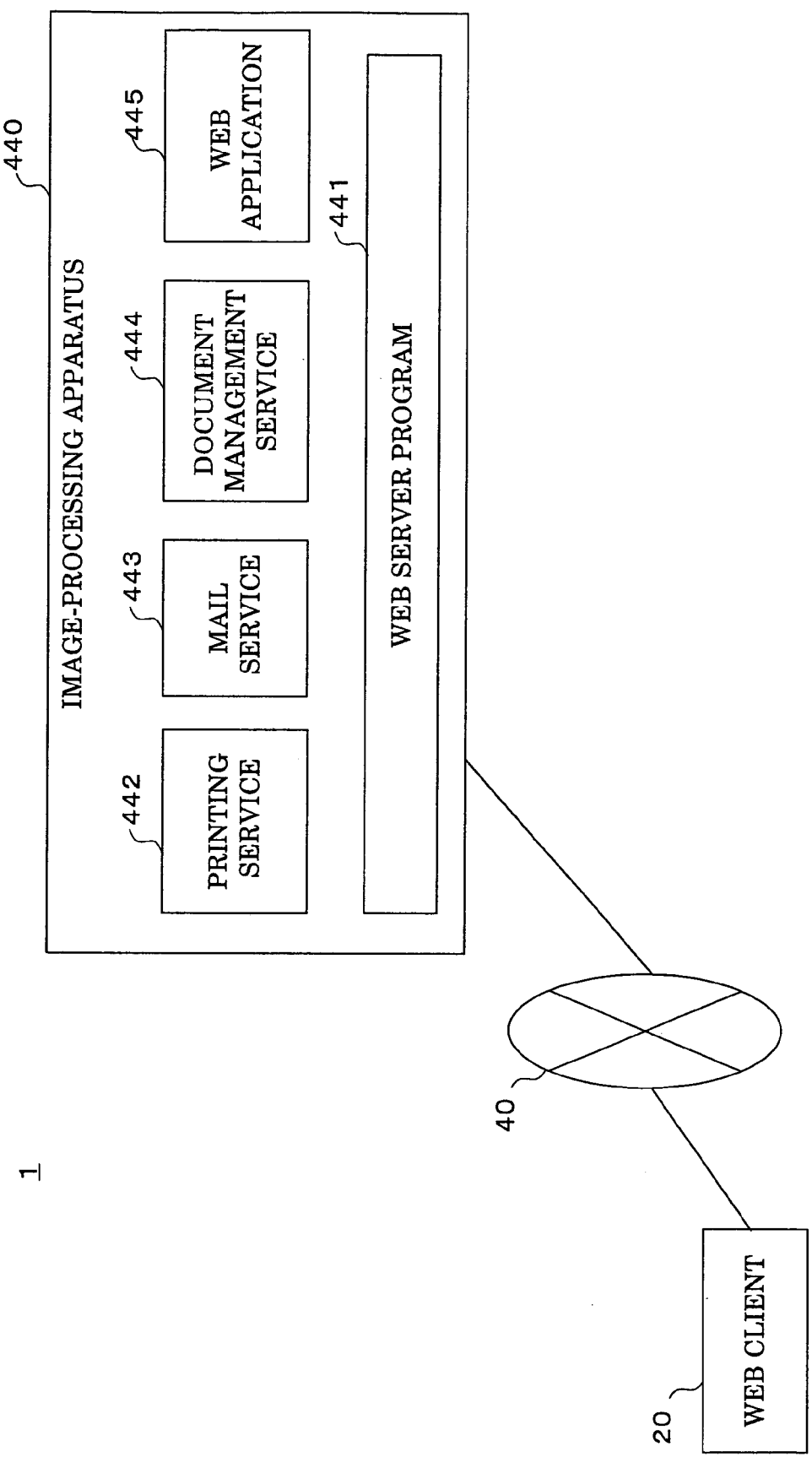
FIG. 45 shows an example of a general configuration of a Web system in which constituted functions of a Web server and each SOAP server are embodied in one set of image-processing apparatus according to the present invention.

FIG. 45 shows another example of a configuration of a Web system in which the respective functions of the Web server and respective SOAP servers are incorporated into a single image-processing apparatus. In FIG. 45, the same reference numerals are given to the same portions of FIG. 1, and duplicated descriptions are omitted.

An image-processing apparatus 440 in FIG. 45 has the above-mentioned Web server program 441, printing service 442, mail service 443, document management service 444, and Web application 445 and so fourth, incorporated therein. The Web server program 441 is same as the Web server program 101 in the Web server 10. The printing service 442, mail service 443, and document management service 444 are same as those of the services provided as Web services in the above-mentioned printer server 30a, mail server 30b, and document management server 30c, respectively. The Web application 445 has a function corresponding to those of various page modules in the Web server 10. Thus, it is possible that the single image-processing apparatus 440 functions as the Web server 10, printer server 30a, mail server 30b, and document management server 30c.

Further, the present invention is not limited to the above-described embodiments, and variations and modifications may be made without departing from the basic concept of the present invention recited in the following claims.

The present application is based on Japanese priority application No. 2002-275986, filed on Sep. 20, 2002, the entire contents of which are hereby incorporated by reference.

What is claimed is:

1. An information processing apparatus which causes a predetermined service providing apparatus which provides a predetermined service, to execute processing concerning a service providing request made by a terminal via a network, said information providing apparatus comprising:
   a responding part configured to cause the service providing apparatus to execute a plurality of processing units as the processing based on a single service providing request made by said terminal;
   a processing state obtaining part which obtains respective processing states of the plurality of processing units concerning the service providing request from said predetermined service providing apparatus; and
   a Web page generating part which, in response to a Web page display request made by said terminal, generates a Web page to display the processing states of the plurality of processing units by displaying the states of the plurality of processing units obtained via said processing state obtaining part, and transmits the thus-produced Web page to said terminal without waiting for respective completions of processing by the plurality of processing units, wherein:
      said Web page generating part generates the Web page in which the state of at least one of the plurality of processing units can be omitted from the Web page display of the states of the plurality of processing units according to a request made by the terminal.

2. The information processing apparatus as claimed in claim 1, further comprising a processing information managing part which manages identification information of the processing concerning the service providing request, wherein:
   said responding part registers the identification information of the processing in said processing information managing part, and
   said processing state obtaining part obtains the processing states of the plurality of processing units for which the identification information is registered in said processing information managing part.

3. The information processing apparatus as claimed in claim 2, wherein:
   said processing information managing part further manages information concerning a position of the service providing apparatus which is caused to execute the processing concerning the service providing request, and information concerning a method for obtaining the processing states of the plurality of processing units.

4. The information processing apparatus as claimed in claim 3, wherein:
   said processing state obtaining part obtains the processing states of the plurality of processing units from the service providing apparatus based on the information managed by said processing information managing part in response to the Web page display request made from said terminal.

5. The information processing apparatus as claimed in claim 1, wherein:
   said responding part causes the service providing apparatus to execute the processing by transmitting a request for execution of processing concerning the service providing request, to the service providing apparatus.

6. The information processing apparatus as claimed in claim 5, wherein:
   said responding part obtains information concerning a method for obtaining the processing states of the plurality of processing units from the service providing apparatus as a response to the request for execution of the processing concerning the service providing request; and said processing state obtaining part obtains the processing states of the plurality of processing units based on the information concerning the method for obtaining the processing states of the plurality of processing units obtained via the responding part.

7. The information processing apparatus as claimed in claim 6, wherein:

in case a plurality of methods for obtaining the processing states of the plurality of processing units obtained by the responding part are managed in a processing information managing part, said processing state obtaining part obtains the plurality of processing states based on the respective ones of the plurality of methods for obtaining the processing states of the plurality of processing units.

8. The information processing apparatus as claimed in claim 5, wherein:

said processing state obtaining part transmits a processing state sending request to a processing state providing apparatus which provides the processing states of the plurality of processing units which the service providing apparatus is caused to execute, and receives the processing states of the plurality of processing units sent by the processing state providing apparatus in response to the processing state sending request.

9. The information processing apparatus as claimed in claim 5, further comprising a processing state receiving part receiving the processing states of the plurality of processing units from the service providing apparatus, wherein said Web page generating part generates the Web page displaying the processing states of the plurality of processing units received via the processing state receiving part.

10. The information processing apparatus as claimed in claim 6, wherein:

said processing state obtaining part transmits a processing state sending request to the service providing apparatus, and receives the processing states of the plurality of processing units sent from the service providing apparatus in response to the sending request.

11. The information processing apparatus as claimed in claim 6, wherein:

the information concerning the method for obtaining the processing states of the plurality of processing units comprises information concerning a position of a processing state providing apparatus which provides the processing states of the plurality of processing units; and said processing state obtaining part transmits a processing state sending request to the processing state providing apparatus specified by the position information, and receives the processing states of the plurality of processing units sent by said processing state providing apparatus in response to the sending request.

12. The information processing apparatus as claimed in claim 2, wherein:

said processing information managing part manages information concerning the position of the service providing apparatus which is caused to execute each of the plurality of processing units, the information concerning the method for obtaining the processing state for each of the plurality of processing units, and also, request identification information assigning a common value for the plurality of processing units to be executed based on the common service providing request made by the terminal.

13. The information processing apparatus as claimed in claim 12, wherein:

said processing state obtaining part identifies processing based on the common service providing request made by the terminal based on the above-mentioned request identification information, and, thus, obtains the respective processing states of the plurality of processing units based on the common service providing request based on the information managed by said processing information managing part.

14. The information processing apparatus as claimed in claim 1, wherein:

said responding part causes a plurality of respective service providing apparatuses to execute the respective ones of the plurality of processing units.

15. The information processing apparatus as claimed in claim 1, wherein:

said Web page generating part generates the Web page displaying in an integration manner the respective processing states of the processing units based on the common service providing request obtained via the processing obtaining part.

16. The information processing apparatus as claimed in claim 1, further comprising a detailed information page generating part which generates the Web page displaying detailed information of the processing states of the plurality of processing units in response to a request made by the terminal.

17. The information processing apparatus as claimed in claim 1, wherein:

said Web page generating part obtains predetermined information from a plurality of service providing apparatuses based on a request made by the terminal, and generates the Web page displaying the obtained information in respective ones of a plurality of divisional areas of the page.

18. The information processing apparatus as claimed in claim 17, further comprising a page information managing part which manages a structure defining display contents with eXtensible Markup Language for respective ones of the plurality of divisional areas of the Web page for each user, wherein said Web page generating part generates the Web page based on the structure.

19. The information processing apparatus as claimed in claim 18, wherein:

said Web page generating part generates the Web page in a manner such that the processing states of the plurality of processing units concerning the service providing request is displayed in one of the plurality of divisional areas.

20. A service providing apparatus which executes processing concerning the service providing request sent from the information processing apparatus claimed in claim 1, comprising:

a processing state obtaining information sending part sending, to the information processing apparatus, processing state obtaining information which enables obtaining a completion notification and processing states of the plurality of processing units, before the completion of the processing, wherein, in response to an obtaining request made by the information processing apparatus requesting the processing states of the plurality of processing units concerning the service providing request based on the processing state obtaining information, the service providing apparatus sends the processing states of the plurality of processing units to the information processing apparatus.

21. The service providing apparatus as claimed in claim 20, wherein:
the processing state obtaining information comprises information which enables, for the information processing apparatus, obtaining the processing state of the processing which is executed by another service providing apparatus.

22. The service providing apparatus as claimed in claim 20, wherein:
the processing state obtaining information sending part sends the processing state obtaining information in a form of a structure in which the processing state obtaining information is described with eXtensible Markup Language as an element thereof.

23. The service providing apparatus as claimed in claim 22, wherein:
said processing state obtaining information comprises identification information for identifying the processing concerning the service providing request and information concerning a method for obtaining the processing states of the plurality of processing units executed by the service providing apparatus.

24. A service providing method for a service providing apparatus which executes processing concerning the service providing requested sent from the information processing apparatus claimed in claim 1, comprising:
a processing state obtaining information sending step of sending, to the information processing apparatus, processing state obtaining information which enables obtaining a completion notification and processing states of the plurality of processing units, before the completion of the processing; and
a processing state sending step of, in response to an obtaining request made by the information processing apparatus requesting the processing state of the processing concerning the service providing request based on the processing state obtaining information, sending the processing states of the plurality of processing units to the information processing apparatus.

25. The service providing method as claimed in claim 24, wherein:
the processing state obtaining information comprises information which enables obtaining, for the information processing apparatus, the processing states of the plurality of processing units executed by another service providing apparatus.

26. The service providing method as claimed in claim 24, wherein:
the processing state obtaining information sending step comprises a step of sending the processing state obtaining information in a form of a structure in which the processing state obtaining information is described with eXtensible Markup Language as an element thereof.

27. The service providing method as claimed in claim 26, wherein:
said structure comprises identification information for identifying the processing concerning the service providing request and information concerning a method for obtaining the processing states of the plurality of processing units executed by the service providing apparatus.

28. A service providing program provided on a computer readable recording medium, said information processing program causing a service providing apparatus which executes processing concerning the service providing request made by the information processing apparatus claimed in claim 1, to perform:
a processing state obtaining information sending step of sending, to the information processing apparatus, processing state obtaining information which enables obtaining a completion notification and processing states of the plurality of processing units, before the completion of the processing; and
a processing state sending step of, in response to an obtaining request made by the information processing apparatus requesting the processing state of the processing concerning the service providing request based on the processing state obtaining information, sending the processing states of the plurality of processing units to the information processing apparatus.

29. An information processing method for an information processing apparatus which causes a predetermined service providing apparatus which provides a predetermined service, to execute processing concerning a service providing request made by a terminal via a network, said information providing method comprising:
a responding step of causing the service providing apparatus to execute a plurality of processing units based on a single service providing request made by said terminal;
a processing state obtaining step of obtaining respective processing states of the plurality of processing units concerning the service providing request from said predetermined service providing apparatus; and
a Web page generating step of, in response to a Web page display request made by said terminal, generating a Web page to display the processing states of the plurality of processing units by displaying the states of the plurality of processing units obtained in said processing state obtaining step, and transmitting the thus-produced Web page to said terminal without waiting for respective completions of processing by the plurality of processing units, wherein:
said Web page generating step generates a Web page in which the state of at least one of the plurality of processing units can be omitted from the Web page display of the states of the plurality of processing units according to a request made by the terminal.

30. The information processing method as claimed in claim 29, wherein:
said responding step comprises a step of registering identification information of the processing in a processing information managing part managing identification information of the processing concerning the service providing request, and
said processing state obtaining step comprises a step of obtaining the processing states of the plurality of processing units for which the identification information is registered in said processing information managing part.

31. The information processing method as claimed in claim 30, wherein:
said processing information managing part further manages information concerning a position of the service providing apparatus which is caused to execute the processing concerning the service providing request, and information concerning a method for obtaining the processing states of the plurality of processing units.

32. The information processing method as claimed in claim 31, wherein:
said processing state obtaining step comprises a step of obtaining the processing states of the plurality of processing units from the service providing apparatus based on the information managed by said processing information managing part in response to the Web page display request made from said terminal.

33. The information processing method as claimed in claim 29, wherein:
said responding step comprises a step of causing the service providing apparatus to execute the processing, by transmitting a request for execution of processing concerning the service providing request, to the service providing apparatus.

34. The information processing method as claimed in claim 33, wherein:
said responding step comprises a step of obtaining information concerning a method for obtaining the processing states of the plurality of processing units from the service providing apparatus as a response to the request for execution of processing concerning the service providing request; and
said processing state obtaining step comprises a step of obtaining the processing states of the plurality of processing units based on the information concerning the method for obtaining the processing states of the plurality of processing units obtained in the responding step.

35. The information processing method as claimed in claim 34, wherein:
said processing state obtaining step comprises a step of, in case a plurality of methods for obtaining the processing states of the plurality of processing units obtained in the responding step are managed by a processing information managing part, obtaining the plurality of processing states of the plurality of processing units based on the respective ones of the plurality of methods for obtaining the processing states of the plurality of processing units.

36. The information processing method as claimed in claim 33, wherein:
said processing state obtaining step comprises a step of transmitting a processing state sending request to a processing state providing apparatus which provides the processing states of the plurality of processing units which the service providing apparatus is caused to execute, and receiving the processing states of the plurality of processing units sent by the processing state providing apparatus in response to the processing state sending request.

37. The information processing method as claimed in claim 33, further comprising a processing state receiving step of receiving the processing states of the plurality of processing units from the service providing apparatus, wherein
said Web page generating step includes generating the Web page displaying the processing states of the plurality of processing units received in the processing state receiving step.

38. The information processing method as claimed in claim 34, wherein:
said processing state obtaining step comprises a step of transmitting a processing state sending request to the service providing apparatus, and receiving the processing states of the plurality of processing units sent from the service providing apparatus in response to the sending request.

39. The information processing method as claimed in claim 34, wherein:
the information concerning the method for obtaining the processing states of the plurality of processing units comprises information concerning a position of the processing state providing apparatus which provides the processing states of the plurality of processing units; and
said processing state obtaining step comprises a step of transmitting a processing state sending request to the processing state providing apparatus specified by the position information, and receiving the processing states of the plurality of processing units sent by said processing state providing apparatus in response to the sending request.

40. The information processing method as claimed in claim 30, wherein:
said processing information managing part manages information concerning the position of the service providing apparatus which is caused to execute each of the plurality of processing units, the information concerning the method for obtaining the processing state for each of the plurality of processing units, and also, requested identification information assigning a common value for the plurality of processing units to be executed based on the common service providing request made by the terminal.

41. The information processing method as claimed in claim 40, wherein:
said processing state obtaining step comprises a step of identifying processing based on the common service providing request made by the terminal based on the above-mentioned requested identification information, and, thus, obtaining the respective processing states of the plurality of processing units based on the common service providing request based on the information managed by said processing information managing part.

42. The information processing method as claimed in claim 29, wherein:
said responding step comprises a step of causing a plurality of respective service providing apparatuses to execute the respective ones of the plurality of processing units.

43. The information processing method as claimed in claim 29, wherein:
said Web page generating step comprises a step of generating the Web page displaying in an integration manner the respective processing states of the processing units based on the common service providing request obtained in the processing obtaining step.

44. The information processing method as claimed in claim 29, further comprising a detailed information page generating step of generating a Web page displaying detailed information of the processing states of the plurality of processing units in response to a request made by the terminal.

45. The information processing method as claimed in claim 29, wherein:
said Web page generating step comprises a step of obtaining predetermined information from a plurality of service providing apparatuses based on a request made by the terminal, and generating the Web page displaying the obtained information in respective ones of a plurality of divisional areas of the page.

46. The information processing method as claimed in claim 45, further comprising a page information managing step of managing a structure defining display contents with eXtensible Markup Language for respective ones of the plurality of divisional areas of the Web page for each user, wherein said Web page generating step comprises a step of generating Web page based on the structure.

47. The information processing method as claimed in claim 45, wherein:

said Web page generating step comprises a step of generating the Web page in a manner such that the processing states of the plurality of processing units concerning the service providing request is displayed in one of the plurality of divisional areas.

48. An information processing program provided on a computer readable recording medium, said information processing program causing an information processing apparatus which causes a predetermined service providing apparatus which provides a predetermined service, to execute processing concerning a service providing request made by a terminal via a network, to perform:

a responding step of causing the service providing apparatus to execute a plurality of processing units based on a single service providing request made by said terminal;

a processing state obtaining step of obtaining respective processing states of the plurality of processing units concerning the service providing request from said predetermined service providing apparatus; and a Web page generating step of, in response to a Web page display request made by said terminal, generating a Web page to display the processing states of the plurality of processing units by displaying the states of the plurality of processing units obtained in said processing state obtaining step, and transmitting the thus-produced Web page to said terminal without waiting for respective completions of processing by the plurality of processing units, wherein:

said Web page generating step generates a Web page in which the state of at least one of the plurality of processing units can be omitted from the Web page display of the states of the plurality of processing units according to a request made by the terminal.

49. The information processing program provided on a computer readable recording medium as claimed in claim 48, wherein:

said responding step comprises a step of causing the service providing apparatus to execute the processing, by transmitting a request for execution of processing concerning the service providing request, to the service providing apparatus.

* * * * *